United States Patent [19]

Saito et al.

[11] Patent Number: 5,557,412
[45] Date of Patent: Sep. 17, 1996

[54] IMAGE FORMING METHOD AND APPARATUS FOR COUNTERFEIT PROTECTION USING IMAGE SYNTHESIS ACCOUNTING FOR FORMING CONDITIONS

[75] Inventors: Rie Saito; Nobuatsu Sasanuma, both of Yokohama; Tetsuya Atsumi, Tokyo, all of Japan

[73] Assignee: Canon Kabushiki Kaisha, Tokyo, Japan

[21] Appl. No.: 125,809

[22] Filed: Sep. 24, 1993

[30] Foreign Application Priority Data

| Sep. 28, 1992 | [JP] | Japan | 4-258203 |
| Sep. 28, 1992 | [JP] | Japan | 4-258211 |
| Sep. 28, 1992 | [JP] | Japan | 4-258698 |
| Sep. 28, 1992 | [JP] | Japan | 4-258699 |

[51] Int. Cl.⁶ .................. G03G 21/00; H04N 1/21; H04N 1/41
[52] U.S. Cl. .................. 358/296; 358/462; 355/201
[58] Field of Search .................. 358/400, 401, 358/296, 404, 298, 406, 434, 448, 444; 355/202, 254, 209, 201, 204; 400/76, 692

[56] References Cited

U.S. PATENT DOCUMENTS

| 4,506,974 | 3/1985 | Sugiura et al. | 355/14 R |
| 4,739,377 | 4/1988 | Allen | 355/133 |
| 4,888,636 | 12/1989 | Abe | 358/80 |
| 5,148,218 | 9/1992 | Nakane et al. | 355/208 |
| 5,257,119 | 10/1993 | Funada et al. | 358/438 |
| 5,453,773 | 9/1995 | Hattori et al. | 347/129 |

FOREIGN PATENT DOCUMENTS

| 276107 | 7/1988 | European Pat. Off. . |
| 500134 | 8/1992 | European Pat. Off. . |
| 506332 | 9/1992 | European Pat. Off. . |
| 526238 | 2/1993 | European Pat. Off. . |
| 535891 | 4/1993 | European Pat. Off. . |

Primary Examiner—Peter S. Wong
Assistant Examiner—Gregory J. Toatley, Jr.
Attorney, Agent, or Firm—Fitzpatrick, Cella, Harper & Scinto

[57] ABSTRACT

An image forming apparatus includes an input unit for inputting image data representing an image, a synthesizing unit for synthesizing a predetermined information with the image represented by the image data, a forming unit for forming an image in accordance with the image data, a detecting unit for detecting a condition relating to an image forming by the forming unit, and a controlling unit for controlling the synthesis by the synthesizing unit based on the detection result of the detecting unit. An image forming method is also disclosed.

18 Claims, 49 Drawing Sheets

FIG. 16

| CNO SIGNAL | PRINT OUTPUT |
|---|---|
| 0 | MAGENTA (M) |
| 1 | CYAN (C) |
| 2 | YELLOW (Y) |
| 3 | BLACK (BK) |

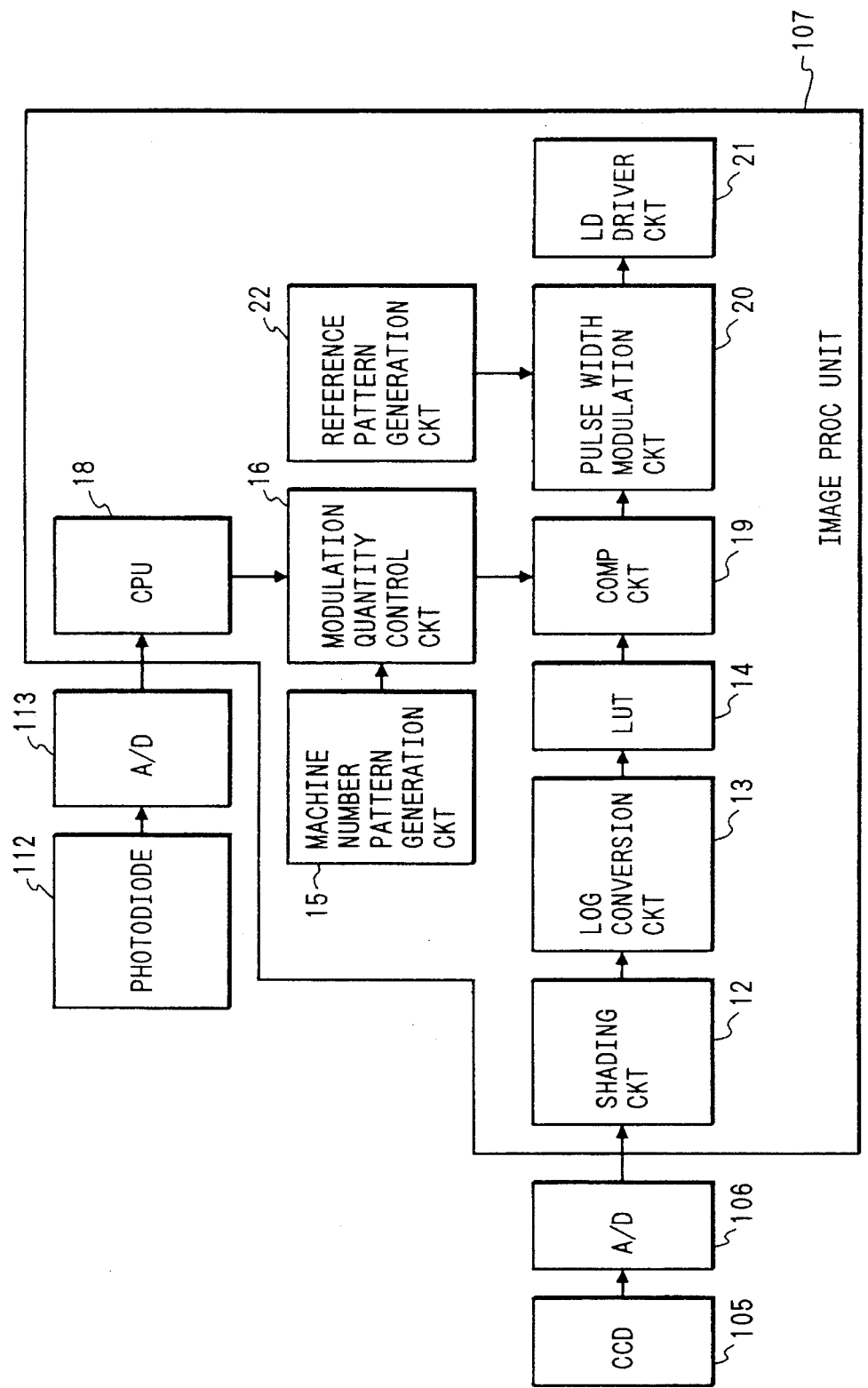

IMAGE FORMING METHOD AND APPARATUS FOR COUNTERFEIT PROTECTION USING IMAGE SYNTHESIS ACCOUNTING FOR FORMING CONDITIONS

BACKGROUND OF THE INVENTION

1. Field of the Invention

The present invention relates to an image forming apparatus having a function of adding a predetermined pattern to a color image.

2. Related Background Art

Various countermeasures have been proposed to prevent counterfeits of securities and the like. As one of the techniques, the present applicant proposed a method of superposing a machine number unique to an image forming apparatus on an image in an almost unnoticeable color so as to specify an image forming apparatus used (U.S. patent application Ser. No. 08/009735).

Assume that a counterfeit of securities is formed using an image forming apparatus having a superposing function. In this case, when the machine number unique to this image forming apparatus is read from the counterfeit, the image forming apparatus used can be specified. This can serve as a good evidence to track down a counterfeiter.

When the image forming characteristics of the image forming apparatus vary depending on environmental changes, the machine number unique to the image forming apparatus, which is superposed on an image, cannot be read, or an image abnormality may occur.

For example, under a high-temperature, high-humidity condition, when the image reproduction capacity of the image forming apparatus may be decreased and high image quality tends not to be obtained, the superposed machine number unique to the image forming apparatus cannot be reproduced or read.

To the contrary, under a condition in which the image reproduction capacity of the image forming apparatus can be increased, the superposed machine number unique to the image forming apparatus is visually noticed on the image, thereby resulting in poor image quality.

According to the conventional technique described above, when the image forming apparatus is used for a long period of time to degrade the durability of a photosensitive body or the durability of a developer, the superposed machine number unique to the image forming apparatus cannot be read or identified or may be visually noticeable.

In the above method, a signal unique to the image forming apparatus is uniformly superposed regardless of types of images to be generally formed on recording media. For example, a color image is often formed on a film-like material (recording medium) such as an OHP film and is projected using a projector. Conventionally, a signal (superposition signal) to be superposed is a signal suitable for a reflective recording medium such as PPC paper, thermal paper, or coated paper. The recorded signal cannot be visually observed with a naked eye by normal reflected light. The recorded signal can be read by only a specific reader. However, a material such as an OHP film is projected using light transmitted therethrough, and a superposition portion becomes a shade and is clearly observed on a screen, resulting in inconvenience.

A machine number is also greatly influenced by the color of the background of a material on which a color image is formed. A yellow superposition signal which is unnoticeable on white paper is easily noticed on paper having a color complementary to yellow, often resulting in image defects.

SUMMARY OF THE INVENTION

The present invention has been made in consideration of the above situation, and has as its object to properly synthesize predetermined information with an input image.

In order to achieve the above object according to the present invention, there is disclosed an image forming apparatus comprising:

input means for inputting image data representing an image;

synthesizing means for synthesizing a predetermined information with the image represented by the image data;

forming means for forming an image in accordance with the image data;

detecting means for detecting a condition relating to an image forming by the forming means; and controlling means for controlling the synthesis by the synthesizing means based on the detection result of the detecting means.

It is another object of the present invention to realize both optimization of an image forming condition and optimization of the above-mentioned synthesis.

In order to achieve this object according to the present invention, there is disclosed an image forming apparatus comprising:

input means for inputting image data representing an image;

correcting means for correcting the image data and outputting corrected image data;

forming means for forming an image in accordance with the corrected image data;

detecting means for detecting the image formed by the forming means;

synthesizing means for synthesizing a predetermined information with the image represented by the image data; and controlling means for controlling the correction by the correcting means and the synthesis by the synthesizing means in accordance with the detection result of the detecting means.

It is still another object of the present invention to realize synthesis of predetermined information in accordance with features of a medium.

In order to achieve this object according to the present invention, there is provided an image forming apparatus comprising:

input means for inputting image data representing an image;

synthesizing means for synthesizing a predetermined information with the image represented by the image data;

forming means for forming an image on a medium in accordance with the image data;

detecting means for detecting characteristic of the medium; and controlling means for controlling the synthesis by the synthesizing means based on the detection result of the detecting means.

The above and other objects, features, and advantages of the present invention will be apparent from the following detailed description and the appended claims in conjunction with the accompanying drawings.

BRIEF DESCRIPTION OF THE DRAWINGS

FIG. 16 is a table showing the relationship between CNO signals and print outputs according to the first embodiment;

FIG. 26 is a block diagram showing the fifth embodiment of the present invention;

DETAILED DESCRIPTION OF THE PREFERRED EMBODIMENTS

Preferred embodiments of the present invention will be described in detail with reference to the accompanying drawings.

An embodiment exemplifying a full color image forming apparatus of an electrophotographic scheme will be described below. However, the present invention is also applicable to an image forming apparatus of a sliver salt photographic scheme, a thermal transfer scheme, or a sublimation scheme.

<First Embodiment>

[General Description of Apparatus]

Figure 2:
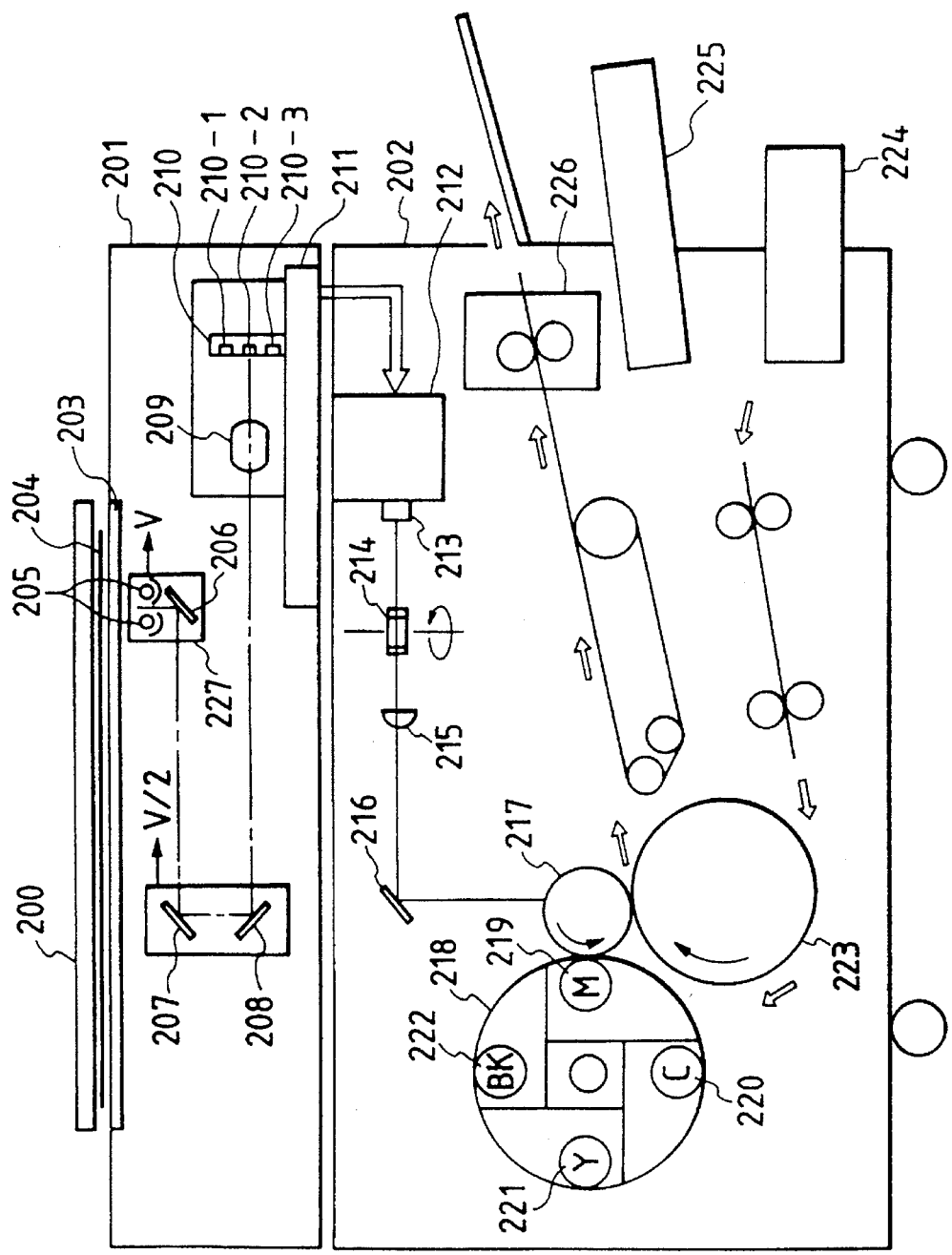
FIG. 2 is a side sectional view showing the arrangement of a copying machine according to the first embodiment of the present invention.

FIG. 2 is a side sectional view showing the arrangement of a copying machine according to the first embodiment of the present invention. Referring to FIG. 2, an image scanner 201 reads an original at a resolution of 400 dpi (dots/inch) and processes digital signals. A printer 202 prints out a full color image, corresponding to the original image read by the image scanner 201, on a sheet at a resolution of 400 dpi.

The image scanner 201 includes a mirror surface press plate 200. An original 204 on an original glass table (platen) 203 is irradiated with lamps 205. Light reflected by the original 204 is guided to mirrors 206, 207, and 208 and is focused by a lens 209 on a three-line sensor (CCD) 210. The read image signals are sent as full color information, i.e., red (R), green (G), and blue (B) components to a signal processing unit 211. Note that a carriage 227 for fixing the lamps 205 and the mirror 206 is mechanically moved at a speed v and the mirrors 207 and 208 are mechanically moved at a speed ($\frac{1}{2}$)v in a direction perpendicular to an electrical scan (main scan) direction of the line sensor, thereby scanning (subscanning) the entire surface of the original.

The signal processing unit 211 electrically processes the read image signals and separates the image signals into magenta (M), cyan (C), yellow (Y), and black (Bk) components. These components are then sent to the printer 202. One of the M, C, Y, and Bk components is sent to the printer 202 every original scan cycle of the image scanner 201. One print is obtained by four original scan cycles.

The M, C, Y, and Bk image signals sent from the image scanner 201 are sent to a laser driver 212. The laser driver 212 modulates and drives a semiconductor laser 213 in accordance with the input image signals. A laser beam scans a photosensitive drum 217 through a polygon mirror 214, an f-θ lens 215, and a mirror 216. A rotary developing assembly 218 is constituted by a magenta developing unit 219, a cyan developing unit 220, a yellow developing unit 221, and a black developing unit 222. The four developing units are sequentially brought into contact with the photosensitive drum 217 to develop a latent image on the photosensitive drum with toners. A transfer drum 223 winds a paper sheet fed from a paper cassette 224 or 225 around the outer circumferential surface thereof to transfer the image developed on the photosensitive drum to the paper sheet.

In this manner, when the four colors, i.e., M, C, Y, and Bk are sequentially transferred to the paper sheet, the paper sheet passes through a fixing unit 226. The toners are fixed on the paper sheet, and then the sheet is exhausted outside the copying machine.

[Image Scanner]

Figure 1:
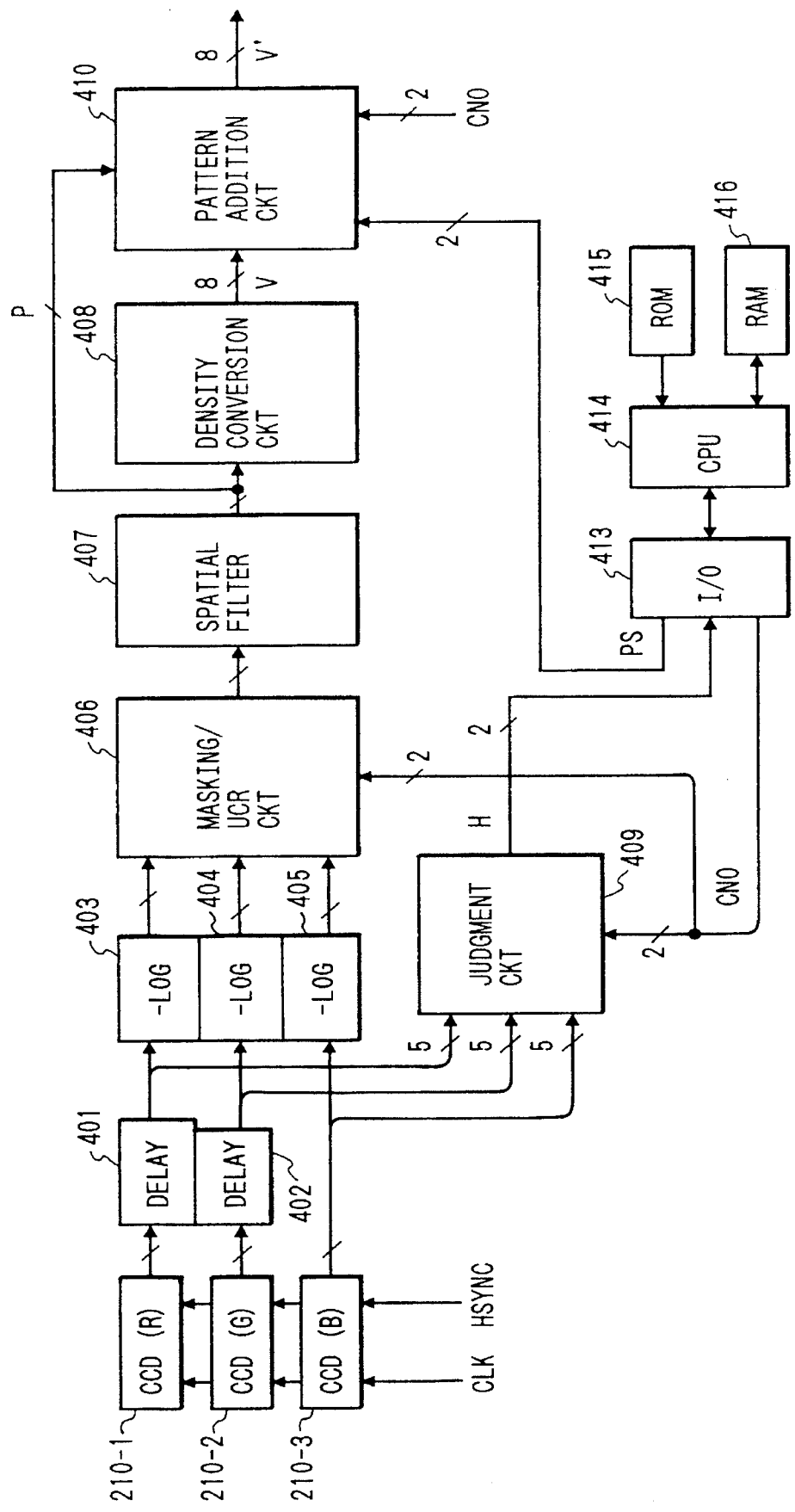
FIG. 1 is a block diagram showing the arrangement of an image scanner 201 according to the first embodiment of the present invention.

FIG. 1 is a block diagram showing the arrangement of the image scanner 201 according to the first embodiment. Referring to FIG. 1, CCD (solid-state image pickup element) line sensors 210-1, 210-2, and 210-3 have red (R), green (G), and blue (B) spectral sensitivity characteristics, respectively. After the input data are A/D-converted, they are output as 8-bit signals each representing a value falling within the range of 0 to 255.

The CCD line sensors 210-1, 210-2, and 210-3 used in this embodiment are spaced apart from each other at a predetermined interval, and their spatial shifts are corrected by delay elements 401 and 402.

LOG converters 403, 404, and 405 comprise look-up table ROMs or RAMs and convert a luminance signal into a density signal. A masking/UCR (undercolor removal) circuit 406 is a known circuit, and a detailed description thereof will be omitted. Every time the magenta (M), cyan (C), yellow (Y), and black (Bk) signals are read using the three input signals, signals are output in a predetermined bit length, e.g., 8 bits in accordance with a surface sequential scheme.

A known spatial filter circuit 407 performs correction of the spatial frequency characteristics (MTF) of the output signal. A density conversion circuit 408 corrects the density characteristics of the printer 202 and is constituted by a ROM or RAM as in the LOG converters 403 to 405.

On the other hand, a microcomputer (to be referred to as a CPU hereinafter) 414 controls the overall operation of the apparatus. A ROM 415 stores programs for operating the CPU 414. A RAM 416 is used as a work area for executing each program. An input/output port (to be referred to as an I/O port hereinafter) 413 is connected to the CPU 414. A Judgment circuit 409 judges a specific original.

The specific original judgment circuit 409 judges a possibility that an original placed on the original table is at least one of a plurality of specific originals. A judgment signal H is output as a multivalued 2-bit signal. More specifically, if a possibility of loading at least one of the plurality of specific originals is high, the judgment circuit 409 outputs H="3". If, however, the possibility is low, the judgment circuit 409 outputs H="0". The judgment circuit 409 comprises a thinning circuit 301 and a frequency division circuit 310 (both will be described in detail with reference to FIG. 3) and performs thinning of the input R, G, and B signals.

A CNO signal is a 2-bit surface sequential signal which serves as a control signal representing the order of four read operations (scan operations) for printing Y, M, C, and Bk color images. FIG. 16 shows the relationship between the CNO signals and the print outputs according to the first embodiment. The CNO is generated by the CPU 414 through the I/O port 413 to switch the operating condition of the masking/UCR circuit 406. In addition, the surface sequential signal CNO is also input to the judgment circuit 409 to judge different specific originals in the four read operations by switching the judgment reference.

A pattern addition circuit 410 is a circuit part for adding a pattern unnoticeable to the human eye to the copy image in accordance with a 2-bit pattern level selection signal PS designated by the CPU 414. A pattern to be added is produced from an image signal P read by a reader.

[Timing Chart]

Figure 4:
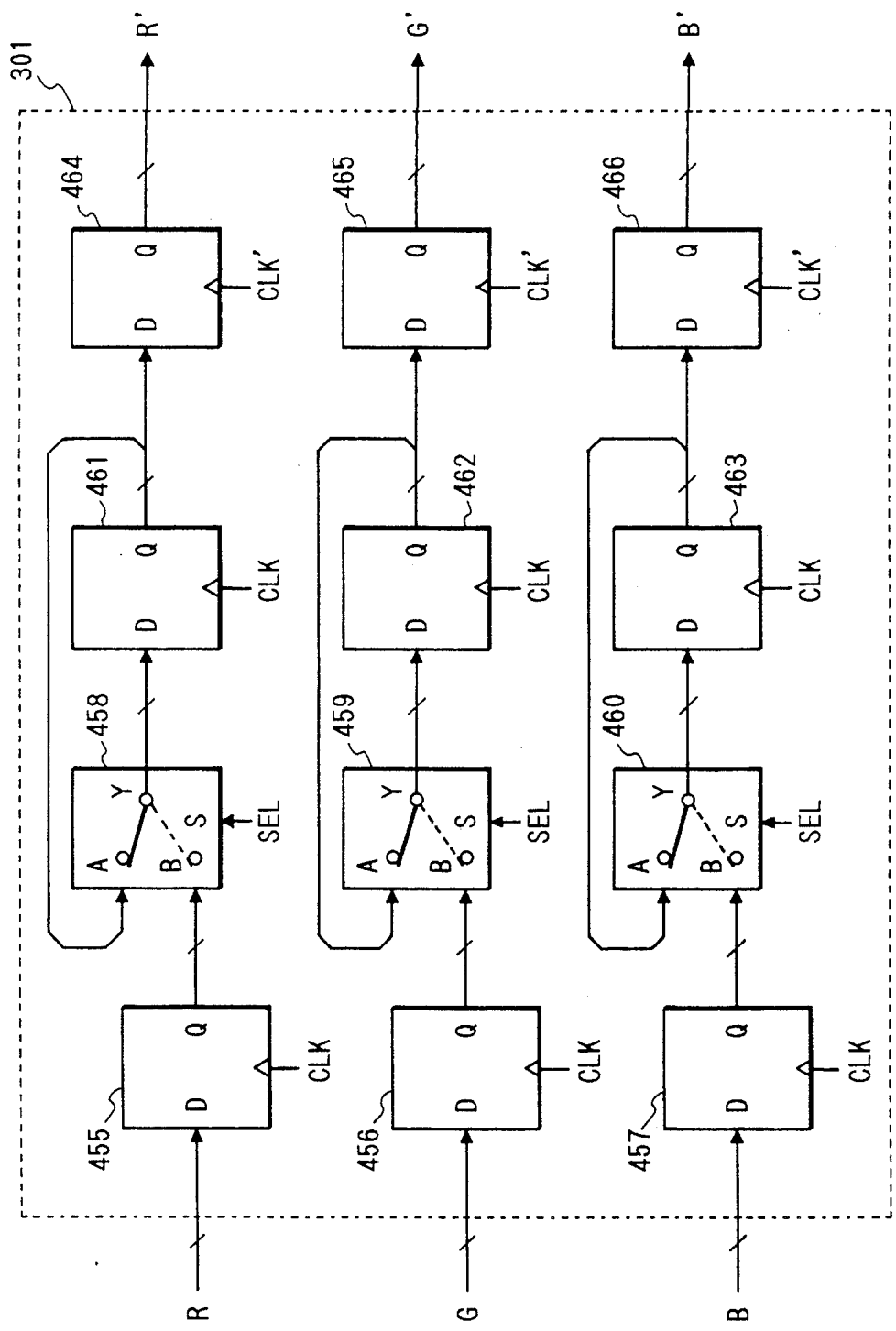
FIG. 4 is a circuit diagram showing the arrangement of a thinning circuit according to the first embodiment.
Figure 5:
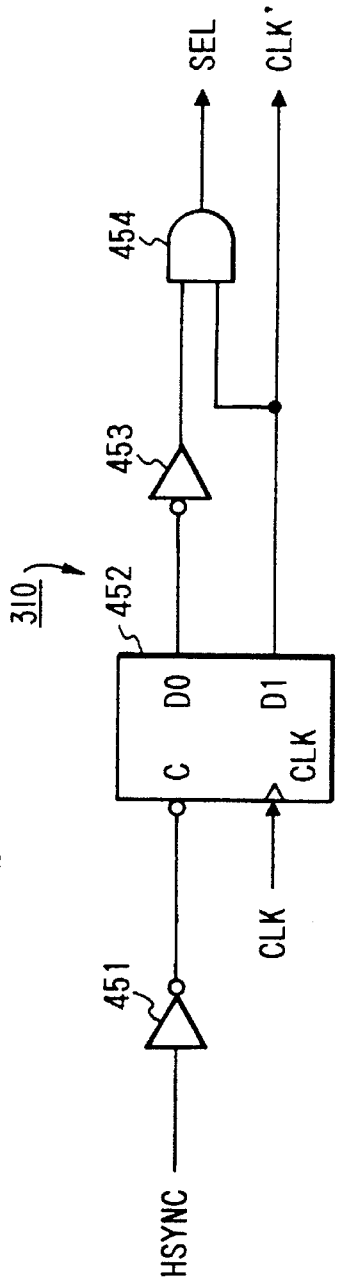
FIG. 5 is a circuit diagram showing the arrangement of a frequency division circuit according to the first embodiment.
Figure 7:
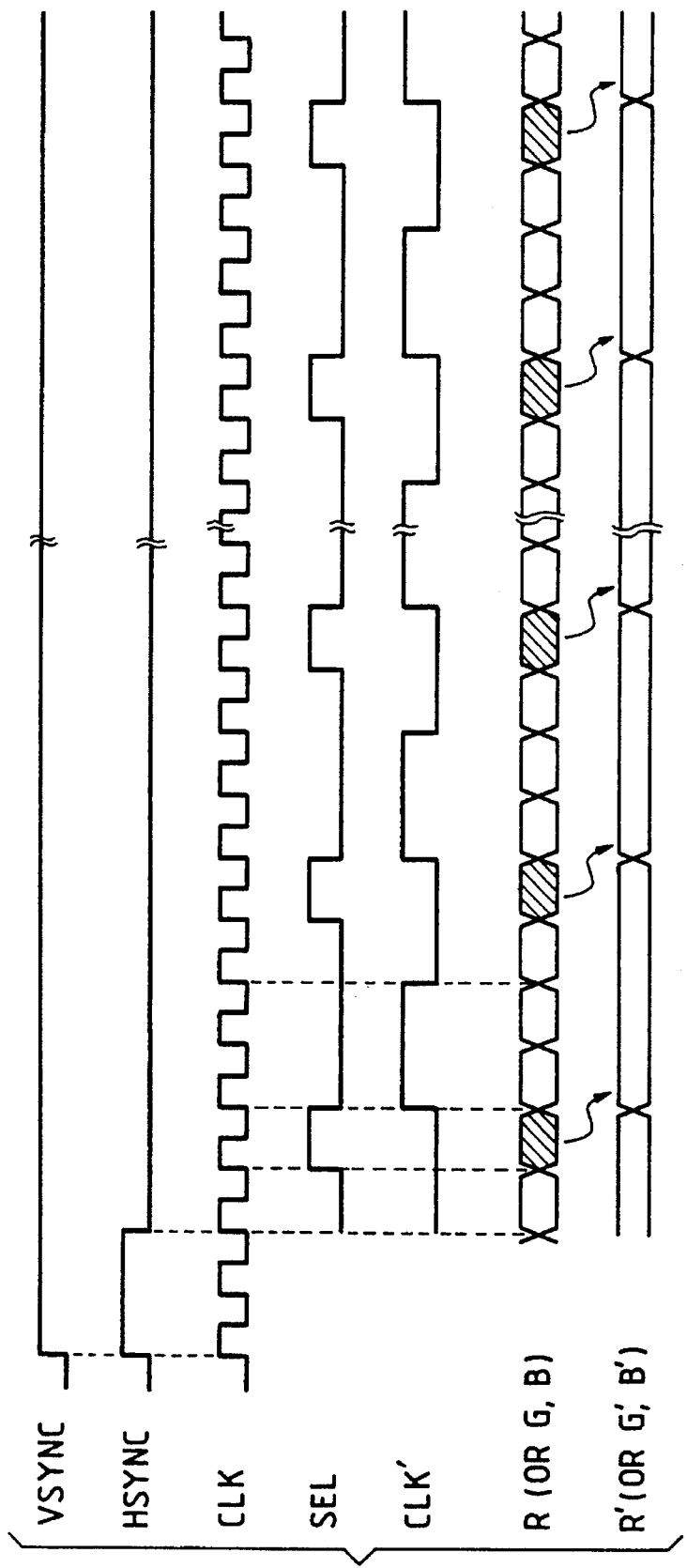
FIG. 7 is a timing chart of signals in a main scan direction according to the first embodiment.

FIG. 4 is a circuit diagram showing the arrangement of the thinning circuit according to the first embodiment, and FIG. 5 is a circuit diagram showing the arrangement of the frequency division circuit according to the first embodiment. FIG. 7 is a timing chart of signals in the main scan direction according to the first embodiment.

A VSYNC signal is a sub scan interval signal which serves as a signal representing a sub scan image output interval. An HSYNC signal is a main scan sync signal which serves as a signal for synchronizing the start of main scan. A CLK signal serves as an image transfer clock which serves as a fundamental clock in various image processes according to the first embodiment.

A CLK' signal is a signal obtained by ¼-dividing the CLK signal. The CLK' signal serves as a fundamental clock in the Judging circuit 409. A SEL signal is a timing signal used in the thinning circuit 301. The CLK' and SEL signals are generated by the frequency division circuit 310 shown in FIG. 5.

The thinning circuit 310 and the frequency division circuit 310 will be described below.

The thinning circuit 301 in FIG. 4 includes flip-flops 455 to 457 and 461 to 466, and selectors 458 to 460. The frequency division circuit 310 in FIG. 5 includes inverters 451 and 453, a 2-bit counter 452, and an AND gate 454.

The flip-flops 455, 456, and 457, and the flip-flops 461, 462, and 463, and the selectors 458, 459, and 460 hold data at the CLK timings, and the flip-flops 464, 465, and 466 hold data in response to the CLK' signal.

In the frequency division circuit 310, the 2-bit counter 452 cleared (initialized) in response to the HSYNC signal serving as the main scan sync signal counts the CLK signal and outputs a 2-bit count value (D0 and D1). The upper bit D1 is output as the CLK' signal, and an AND signal of the upper bit D1 and the inverted signal of the lower bit D0 is output as the SEL signal.

AS shown in FIG. 7, at the rate of ¼, the thinning circuit 301 thins the R (G or B) signal transferred by the CLK signal to obtain an R' (G' or B') signal synchronized with the CLK' signal.

[Judgment Circuit]

Figure 3:
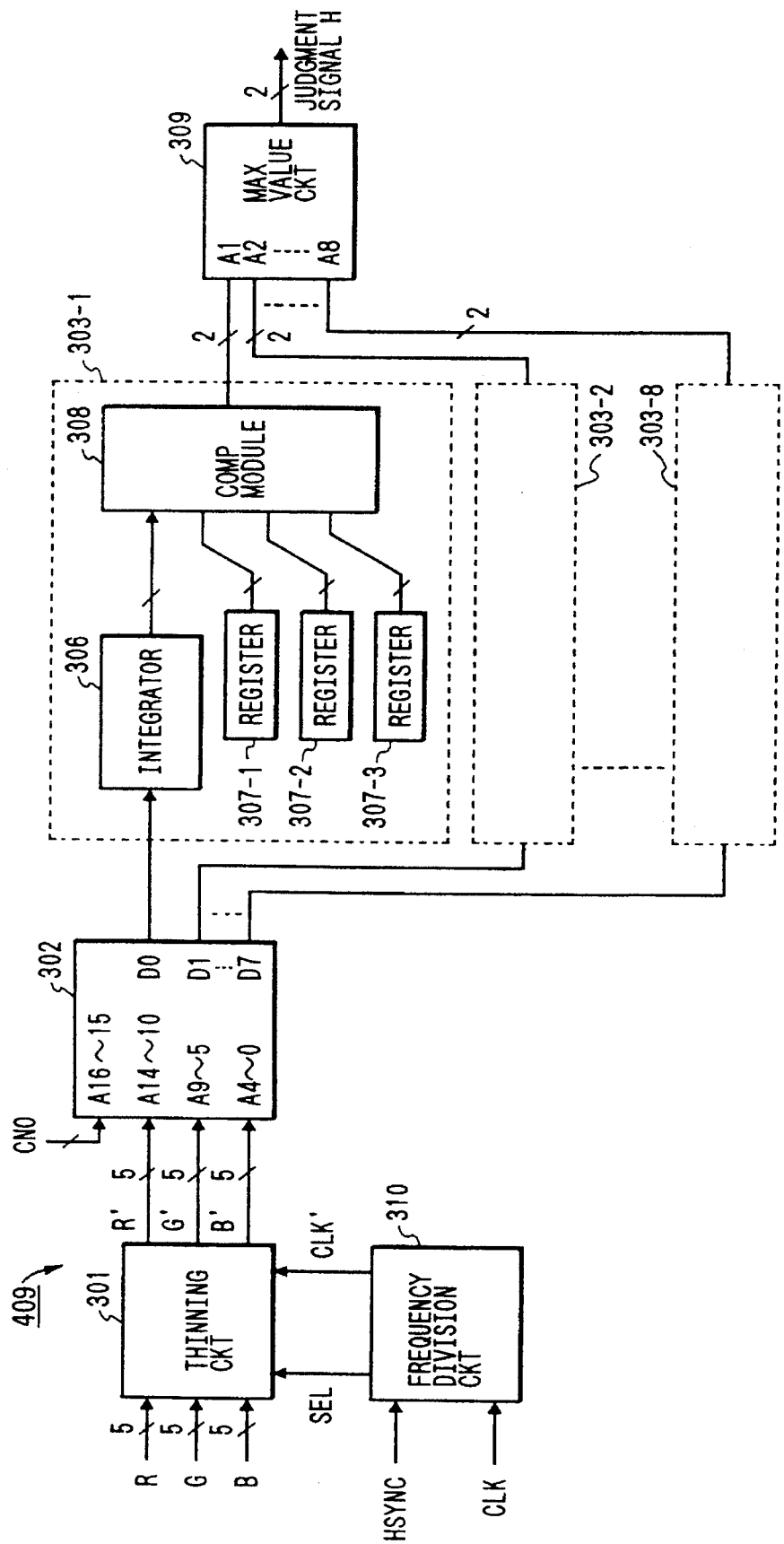
FIG. 3 is a block diagram showing the arrangement of a judgment circuit 409 according to the first embodiment.

FIG. 3 is a block diagram showing the arrangement of the judgment circuit 409 according to the first embodiment.

Referring to FIG. 3, the thinning circuit 301 has the arrangement shown in FIG. 4. The thinning circuit 301 thins data to reduce addition of the processing circuit of the judgment circuit 409 itself. A color tone matching look-up table ROM (to be referred to as a color tone matching LUT hereinafter) 302 performs color tone matching between input data and different types of specific originals (e.g., securities and banknotes). The color tone matching LUT 302 checks the color tone distributions of 32 different specific originals in advance and holds, as judgment results, bit information upon noncoincidence with the color tones of the specific originals and bit information upon coincidence with the color tones of the specific originals. The 32 different specific originals represent a total of assignment of eight different originals in four scan operations for forming M, C, Y, and Bk color images.

More specifically, the LUT 302 receives the CNO signal as the surface sequence signal to the upper two bits of the address of the LUT 302 and five bits of each of the thinned R, G, and B image signals to the lower 15 bits of the LUT 302. The values of 0 to 3 of the CNO signals are simultaneously output in correspondence with 8-bit data representing whether the color tone of the pixel of interest coincides with those of eight kinds of specific originals. Therefore, in four read scan cycles, a total of 32 kinds of specific originals are judged.

Color tone judgment circuits 303-1, 303-2, . . . , 303-8 have the same arrangement. Each judgment circuit comprises an integrator 306, registers 307-1, 307-2, and 307-3, and a comparator module 308 and judges a possibility that a specific original is present in an original. The judgment result is output as 2-bit data. A maximum value circuit 309 outputs a maximum value of the judgment result outputs from the color tone judgment circuits 303-1 to 303-8. That is, the maximum value circuit 309 outputs a judgment result corresponding to a specific original having the highest one of the possibilities of all the eight kinds of specific originals.

[Integrator]

Figure 6:
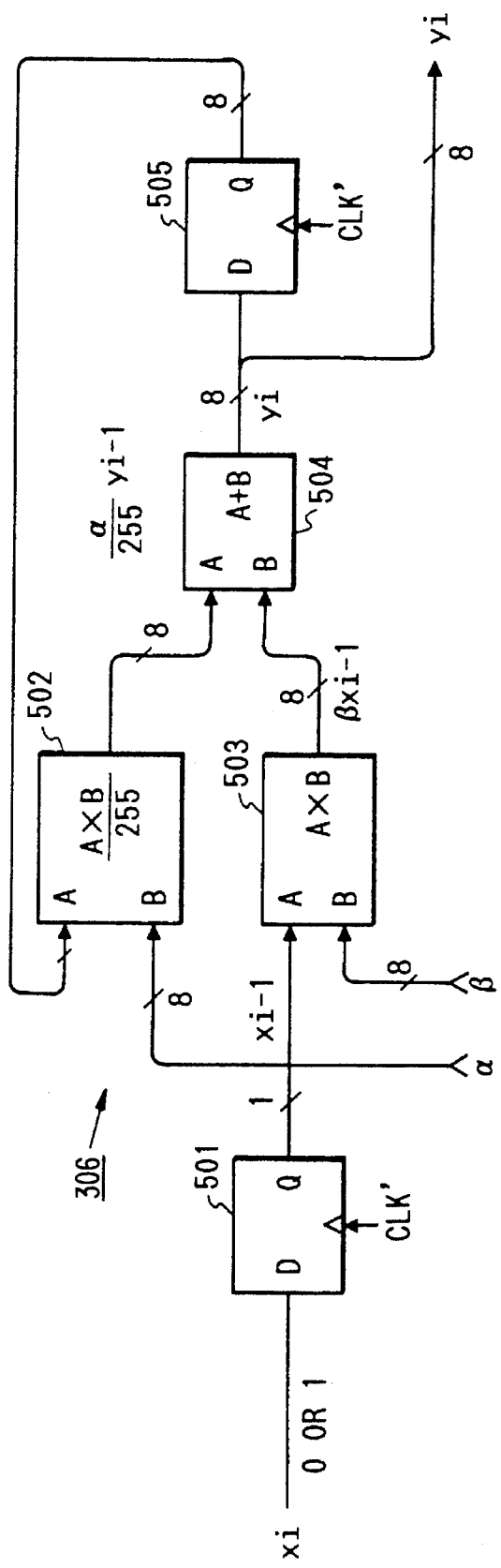
FIG. 6 is a block diagram showing the arrangement of an integrator 306 according to the first embodiment.
Figure 8:
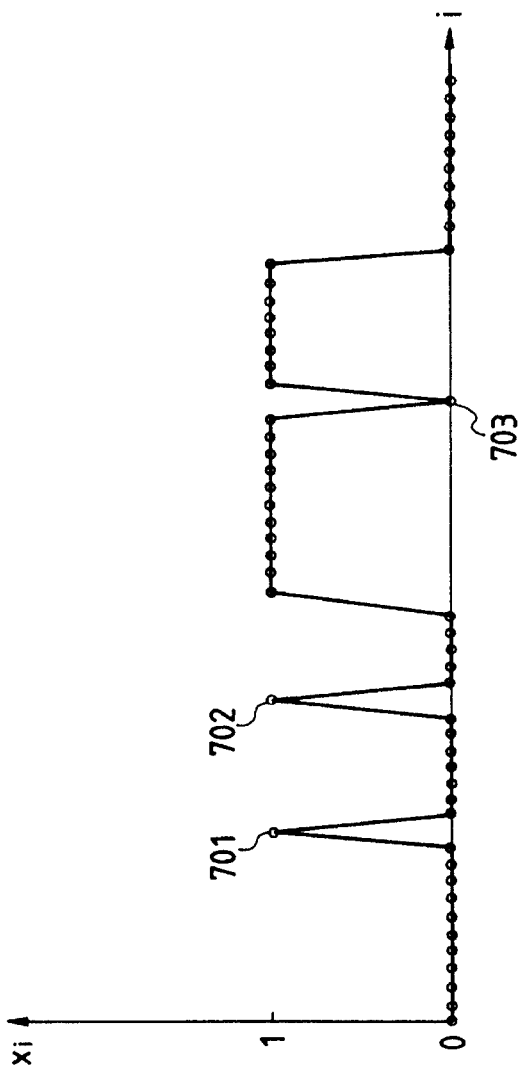
FIG. 8 is a graph showing inputs/outputs with respect to the integrator 306 according to the first embodiment.
Figure 9:
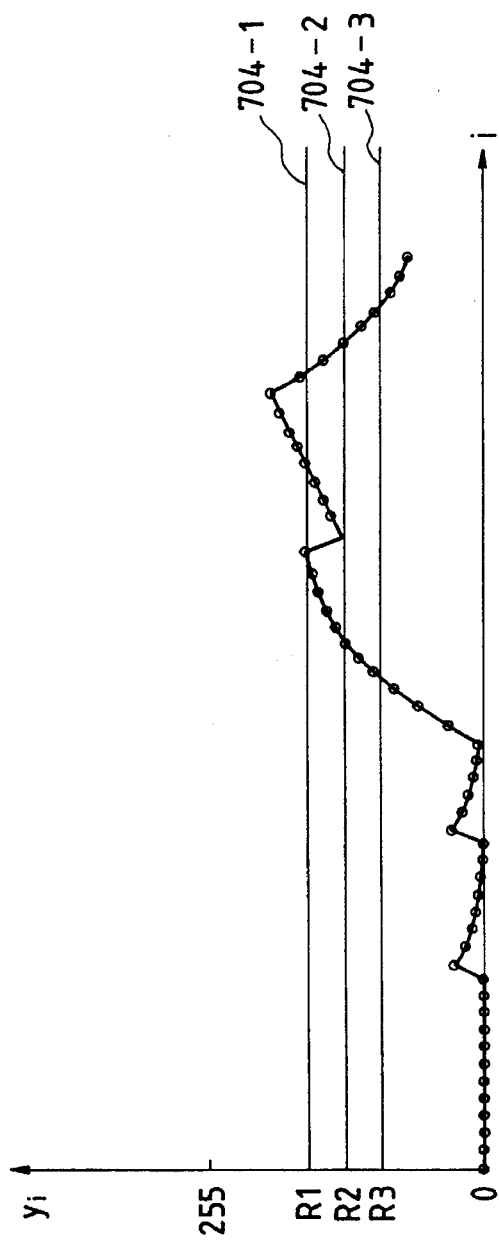
FIG. 9 is a graph showing inputs/outputs with respect to the integrator 306 according to the first embodiment.

FIG. 6 is a block diagram showing the arrangement of the integrator 306 according to the first embodiment, FIGS. 8 and 9 show inputs/outputs with respect to the integrator 306 according to the first embodiment. Referring to FIG. 6, the integrator 306 includes flip-flops 501 and 505 for holding data at the rise timing of the CLK' signal, a multiplier 502 for receiving two 8-bit signals (A and B) and outputting an eight-bit signal (A×B/255) as a product, a multiplier 503 for receiving and multiplying a one-bit input signal (A) and an 8-bit input signal (B) to output an 8-bit output signal (A×B), and an adder 504 for receiving two 8-bit input signals (A and B) and outputting an 8-bit signal (A+B) as a sum.

As a result, in the integrator 306, an 8-bit output signal $y_i$ in response to a binary input signal $x_i$ is represented by equation (1) as follows:

$$y_i = (\alpha/255)y_{i-1} + \beta \cdot x_{i-1} \qquad (1)$$

where $\alpha$ and $\beta$ are predetermined constants. The characteristics of the integrator are determined in accordance with the magnitudes of these constants.

For example, if $\alpha=247$ and $\beta=8$, then an output $y_i$ shown in FIG. 9 is obtained in response to an input $x_{i-1}$ shown in FIG. 8.

Inputs of "1" represented by points 701 and 702 surrounded by points of "0" and an input of "0" represented by a point 703 surrounded by points of "1" are regarded as noise. In this case, appropriate threshold values 704-1 (value R1), 704-2 (value R2), and 704-3 (value R3) are respectively set in the registers 307-1 to 307-3 shown in FIG. 3, and the output $y_i$ from the integrator is binarized using these threshold values to reduce the noise.

[Comparator Module]

Figure 10:
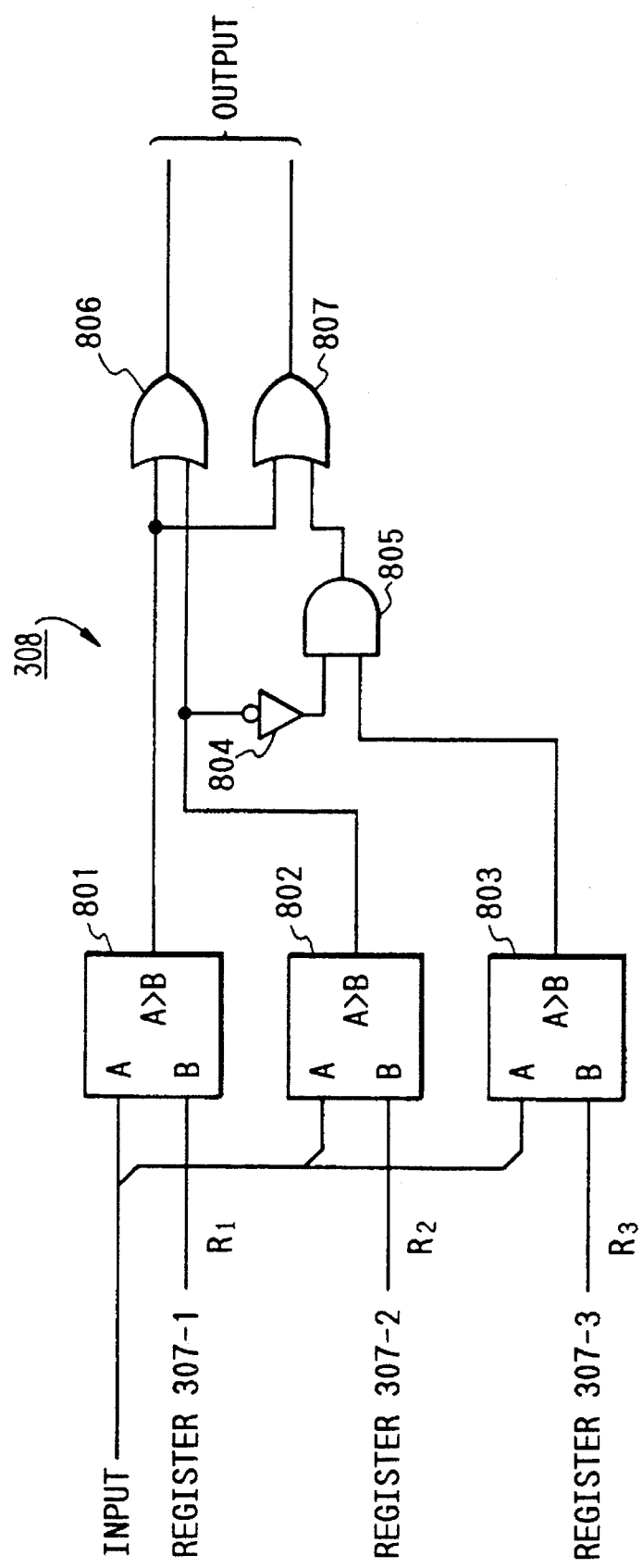
FIG. 10 is a block diagram showing the arrangement of a comparator module 308 according to the first embodiment.

FIG. 10 is a block diagram showing the arrangement of the comparator module 310 according to the first embodiment. Referring to FIG. 10, the comparator module 310 comprises comparators 801, 802, and 803, an inverter 804, an AND gate 805, and OR gates 806 and 807. As described with reference to FIG. 3, the values R1, R2, and R3 are respectively set in the registers 307-1, 307-2, and 307-3 and satisfy condition R1>R2>R3. As a result, a judgment result is quantized and output in the form of 2bits. That is, If R1<(input), 11 (binary notation) is output.

If R2<(input)≦R1, 10 (binary notation) is output.

If R3<(input)≦R2, 01 (binary notation) is output.

If R3<(input)≦R3, 00 (binary notation) is output.

[Pattern Addition Circuit]

Figure 11:
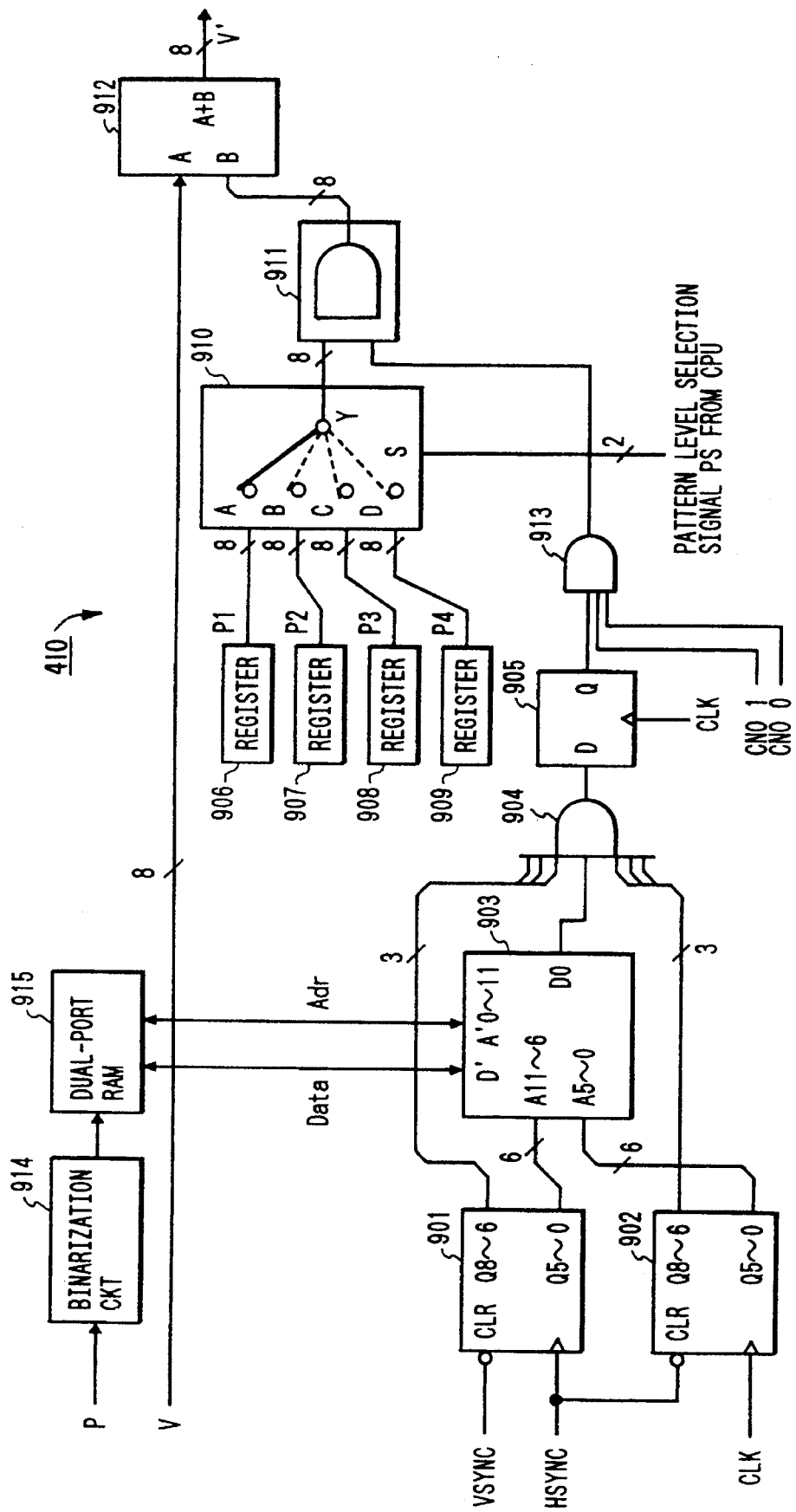
FIG. 11 is a block diagram showing the arrangement of a pattern addition circuit 410 according to the first embodiment.
Figure 14:
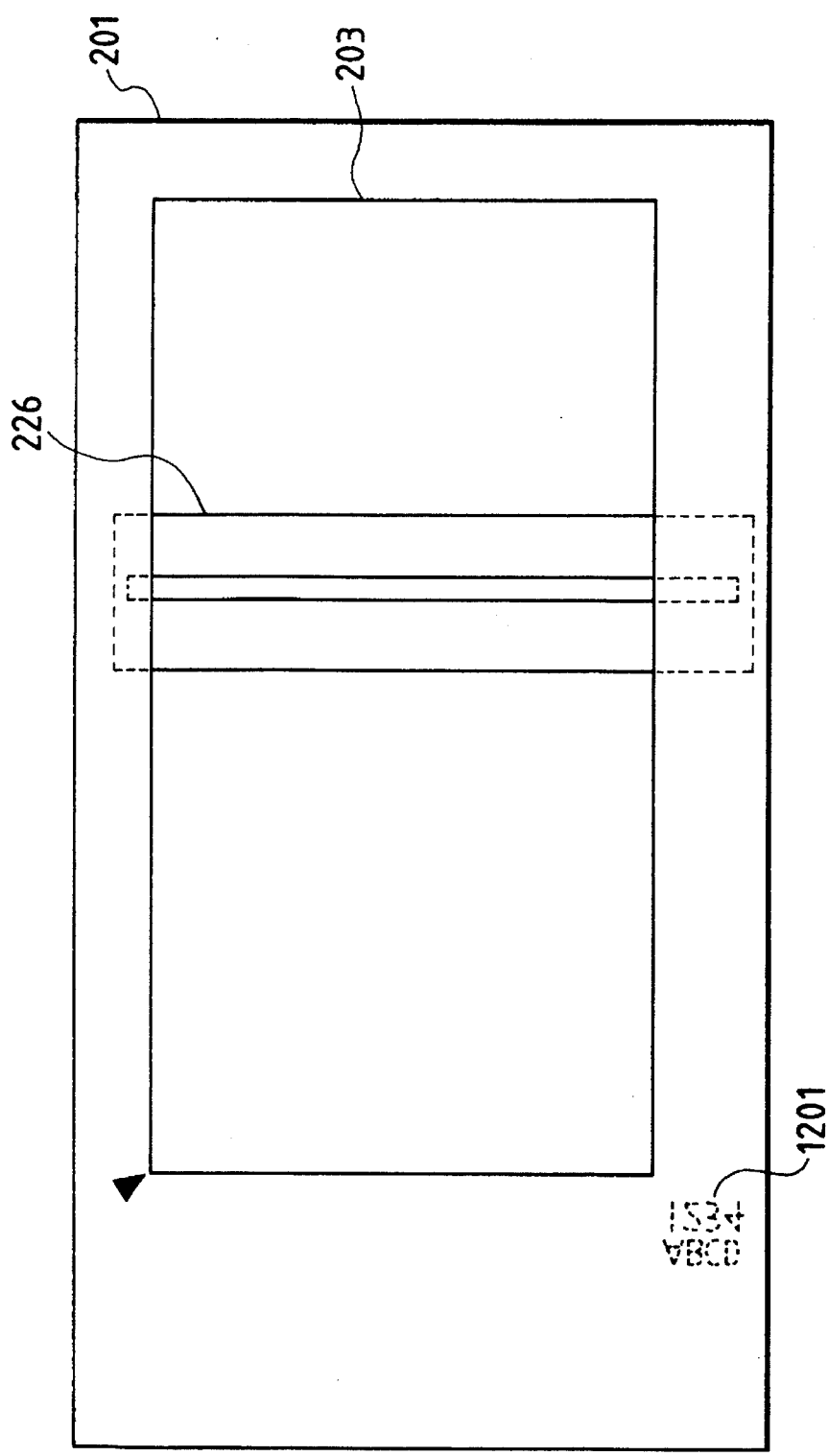
FIG. 14 is a plan view of an original table according to the first embodiment.

FIG. 11 is a block diagram showing the arrangement of the pattern addition circuit 410 according to the first embodiment, and FIG. 14 is a plan view of an original table according to the first embodiment. Referring to FIG. 11, the pattern addition circuit 410 includes a sub scan counter 901, a main scan counter 902, a look-up table RAM (to be referred to as an LUT hereinafter) 903, a flip-flop 905, an AND gate 913, registers 906, 907, 908, and 909, a 4-to-1 selector 910, AND gates 911 and 913, and an adder 912. The pattern addition circuit 410 also includes a binarization circuit 914 for binarizing an image signal P having passed through a spatial filter. If the value of the image signal is larger than a predetermined threshold value, the binarization circuit 914 outputs a signal of "1"; otherwise, the binarization circuit 914 outputs a signal of "0". Binary data output from the binarization circuit 914 is written in a dual-port RAM 915. An image written in dual-port RAM 915 is an image 1201 written in the image scanner 201 at a specific position in FIG. 14. In addition, this image is formed on one of the reader constituent parts, which cannot be easily replaced, e.g., on the lower surface of an upper plate on the outer side (i.e., a portion for supporting glass) of an original glass table (platen glass) 203 within the read range of the image sensor of the carriage 226.

When an image is to be written in the dual-port RAM 915, the CNO signal is set at "0" (recording scan for magenta). That is, the image signal P is controlled so as to be a signal generated most depending on the green (G) signal of the CCD 210. This is because the green signal is closest to the luminance signal of the image among signals which can be easily generated.

The storage contents of the dual-port RAM 915 are read out by the CPU 414 through a data bus Data and an address bus Adr. Similarly, the LUT 903 comprises a dual-port RAM (to be referred to as a RAM hereinafter). The CPU 411 writes the same data read out from the RAM 915 in the-RAM 903 through the data bus Data and the address bus Adr. The above operations will be described below.

Figure 15:
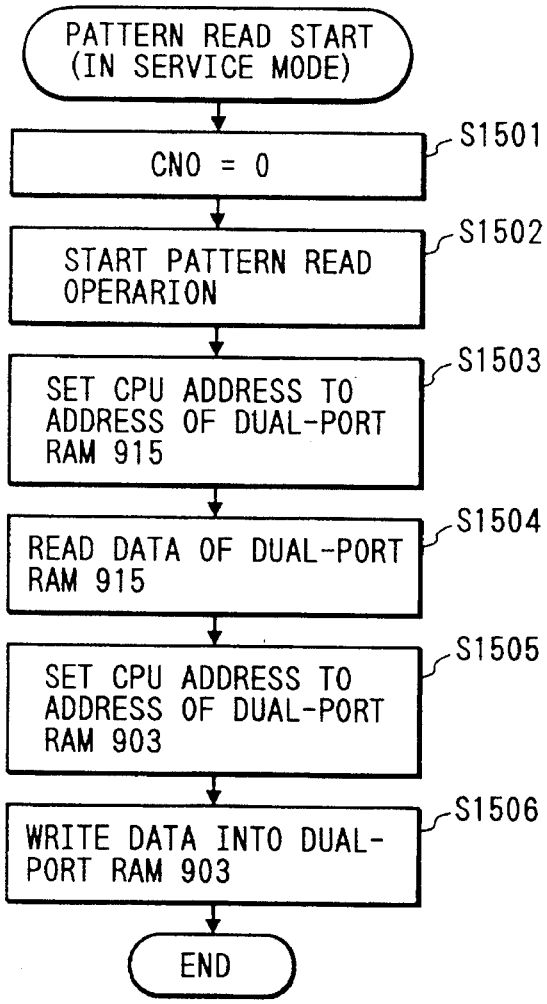
FIG. 15 is a flow chart for explaining a service mode according to the first embodiment.

FIG. 15 is a flow chart showing a service mode according to the first embodiment.

In the service mode, the CPU 414 sets the CNO signal to "0" (step S1501) to start a pattern read operation (step S1502). The CPU 414 sets a CPU address to the address of the dual-port RAM 915 (step S1503) to read the data of the dural-port RAM 915 (step S1504).

The CPU 414 sets the CPU address to the address of the RAM 903 (step S1505) to write data read out from the dual-port RAM 915 in the RAM 903 (step S1506).

As an example, the pattern read operation for adding a machine number unique to each apparatus to a specific original is performed only once during installation of the apparatus in a mode performed by only a serviceman.

The sub scan counter 901 and the main scan counter 902 repeatedly count the main scan sync signal HSYNC and the pixel sync signal CLK, respectively, at a9-bit width, i.e, at the period of 512 pixels. As described above, the RAM 903 stores a pattern to be added. The lower six bits of the count value of each of the sub and main scan counters 901 and 902 are input to the RAM 903.

Only one bit of the output from the RAM 903 is looked up and is logically ANDed with upper three bits of each of the sub and main scan counters 901 and 902 by the AND gate 904. An output from the AND gate 904 is synchronized with the CLK signal by the flip-flop 905. After the 2-bit CNO signal of "0" and the 2-bit CNO signal of "1" are logically ANDed by the AND gate 913, the AND signal is input to the AND gate 911. This signal is CN0=3, i.e., a signal enabled only when printing is currently performed in yellow.

On the other hand, the registers 906, 907, 908, and 909 prestore values P1, P2, P3, and P4. One of the values P1 to P4 is selected in accordance with the pattern level selection signal PS designated by the CPU 414. The selected signal passes through the AND gate 911, and a pattern is added to an input signal V by the adder 912, thereby outputting V'. Therefore, if CNO=2, i.e., if printing is currently performed in yellow, the pattern held in the RAM 903 is repeatedly read and is added to a signal to be output.

The values P1, P2, P3, and P4 satisfy condition P1<P2 <P3 <P4. The selector 910 performs the operations in accordance with the following propositions:

if s =00 (binary notation), Y=A, if s =01 (binary notation), Y=B, if s =10 (binary notation), Y=C, and if s =11 (binary notation), Y=D.

For this reason, the patterns are added as follows:

if PS =00 (binary notation), V'=V +P1, if PS =01 (binary notation), V'=V +P2, if PS =10 (binary notation), V'=V +P3, and if PS =11 (binary notation), V'=V +P4.

In this case, a pattern to be added is printed with a yellow toner so as to make it difficult to cause a human eye to identify the pattern. This is because a low identification capability of the human eye for a pattern drawn with a yellow toner is utilized. In addition, when the level of a pattern to be added is set variable in accordance with a possibility of the presence of a specific original in an input image, a pattern on a normal copy is almost unnoticeable. If the possibility of the presence of the specific original is increased, a clear pattern is added.

[Copying Result]

Figure 12:
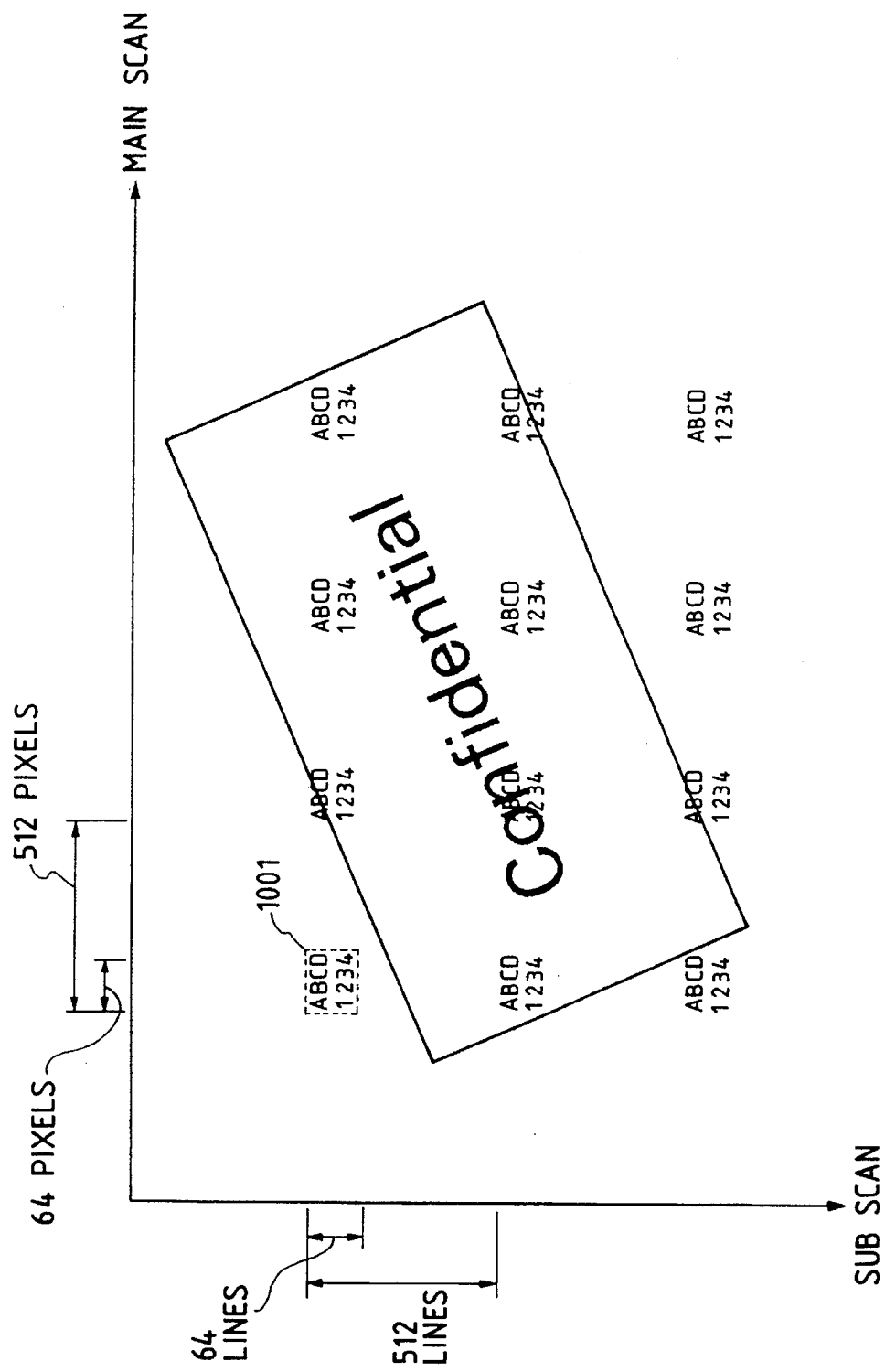
FIG. 12 is a view showing a copying result according to the first embodiment.

FIG. 12 is a view showing a copying result according to the first embodiment. Referring to FIG. 12, a pattern 1001 to be added is a pattern stored in the RAM 903. In FIG. 12, a two-line pattern consisting of "ABCD" and "1234" is added in a pattern of 64 pixels×64 pixels so as to make it difficult to cause the human eye to identify the pattern. This pattern is repeated every 512 pixels in the main scan direction and 512 lines in the sub scan direction. When such a pattern represents a manufacturing number unique to each machine or a code of the manufacturing number, the copy can be checked to specify the machine or apparatus used.

In addition, if a possibility of the presence of a specific original supposed not to be copied is high, a clear pattern with, e.g., a black toner may be added.

In this embodiment, the pitch of the patterns to be added is given as 512 pixels (or lines) in the main (or sub) scan direction. However, a resolution of 400 dpi (dots/inch) is set in this embodiment, and a pattern is formed every about 32.5 mm. On the other hand, the width of a banknote (Bank of Japan note) is about 76 mm. The widths of banknotes of major international countries fall within the range of about 60 mm to 120 mm. If a banknote is copied, the above pattern is always added within the copied banknote. Therefore, even if only a copied banknote portion is cut from a copy and illegally used, the copy can be collated to read the added pattern, thereby specifying information such as the machine number of a copying machine illegally used.

[Flow Chart]

Figure 13:
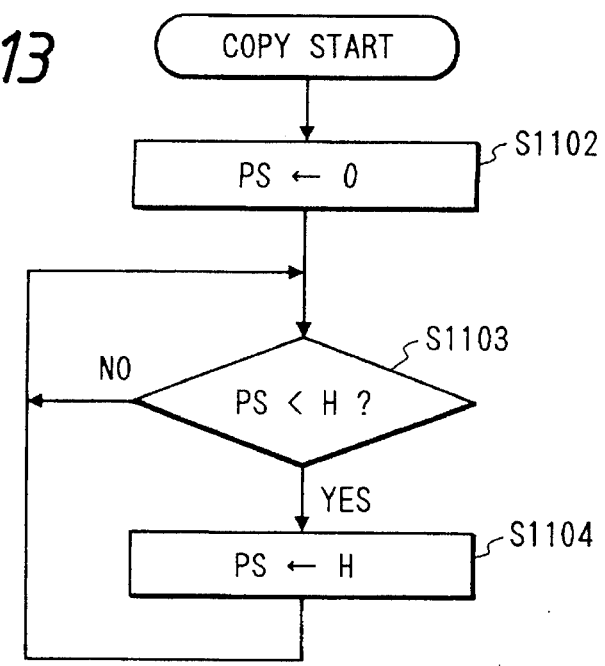
FIG. 13 is a flow chart for explaining a sequence for setting a pattern level selection signal PS by a CPU 414 according to the first embodiment.

FIG. 13 is a flow chart for explaining a sequence for causing the CPU 414 of the first embodiment to set the pattern level selection signal PS.

When copying is started, the pattern level selection signal PS is set to "0" in step S1102. A current judgment level H and the PS value are compared in step S1103. If H is larger than PS, the H value is set in PS in step S1104. Otherwise, the flow returns to step S1103. That is, a maximum value from the start of copy to the current value is set in PS in accordance with the history of the Judgment signal H.

As described above, according to the first embodiment, as a method of specifying an apparatus, a specific pattern which makes it difficult to cause the human eye to identify the pattern is added to a copy. If a specific original (e.g., a banknote) supposed not to be copied is copied, an evidence for specifying the apparatus illegally used can be obtained. In addition, patterns are added at a pitch smaller than the width of the banknote. Even if a copied banknote portion is cut from the copy and illegally used, the copied banknote can be collated to specify the apparatus illegally used or its operator or narrow the possibilities thereof.

<Second Embodiment>

The second embodiment is an improvement of the first embodiment.

First of all, a method of forming a color image will be described.

Figure 18:
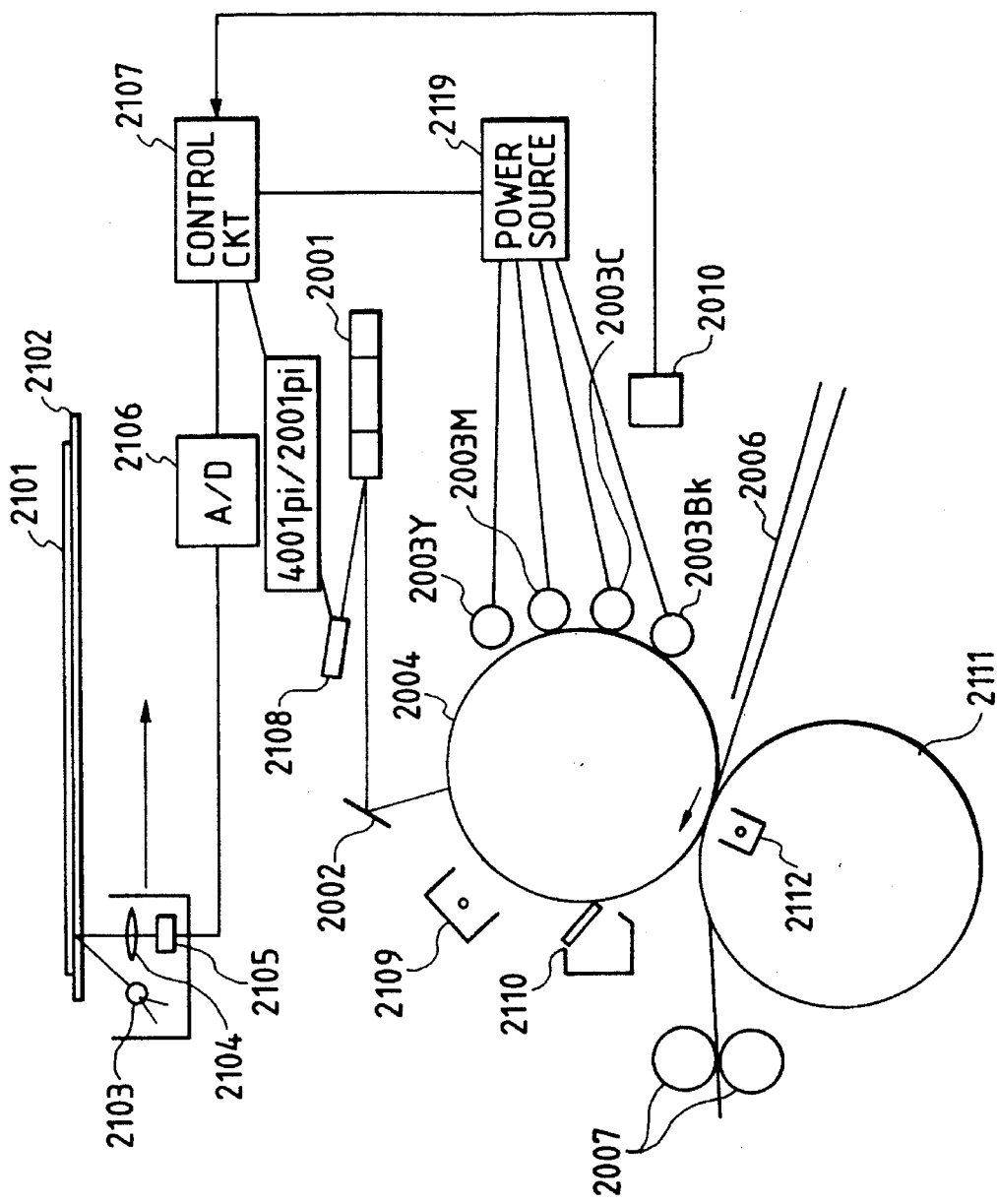
FIG. 18 is a side sectional view showing the arrangement of the main part of the color copying machine according to the second embodiment of the present invention.

FIG. 18 is a side sectional view showing the arrangement of the main part of a color copying machine according to the second embodiment of the present invention.

Referring to FIG. 18, an original 2101 placed on an original glass table 2102 is focused on a CCD 2105 by a light source 2103 and an optical lens 2104 and is converted into an image signal corresponding to an amount of received light.

The image signal is converted into a digital value by an image signal A/D conversion circuit 2106 and is image-processed by a control circuit 2107. The processed image is used to drive a laser light source 108. An emitted laser beam is reflected by a polygon mirror 2001 and a mirror 2002, and the reflected light beam is radiated on a photosensitive drum 2004.

The surface of the photosensitive drum 2004 is cleaned by a cleaning blade 2110 to be free from residual toners. The surface of the photosensitive drum 2004 is uniformly charged with a charger 2109.

First, the photosensitive drum 2004 formed with a latent image upon laser beam scan using a Y (yellow) image signal is rotated in a direction indicated by an arrow in FIG. 18. The latent image is then developed by a developing unit 2003Y.

The photosensitive drum 2004 is further rotated to cause a recording medium 2006 to attract to a transfer drum 2004. At the same time, a toner image formed on the photosensitive drum 2004 is transferred to the recording medium by a transfer charger 2112.

Latent image formation and development using an M (magenta) image signal are performed. At the registered position of the image, the magenta image is superposed on the Y image on the recording medium.

Similarly, C and Bk images are formed and transferred on the preceding color images. The recording medium is then separated from the transfer drum 2111 and is fixed by a fixing roller pair 2007, thereby obtaining a color image print.

In this embodiment, in addition to the above arrangement, an environmental sensor 2010 comprising a temperature sensor and a humidity sensor is arranged at a position where the machine body or internal environment is reflected well. An environmental data signal detected by this environmental sensor 2010 is sent to the control circuit 2107. This copying machine has a power source 2119.

A system for processing an image signal and superposing a pattern on an image according to this embodiment will be described in detail below.

Figure 17:
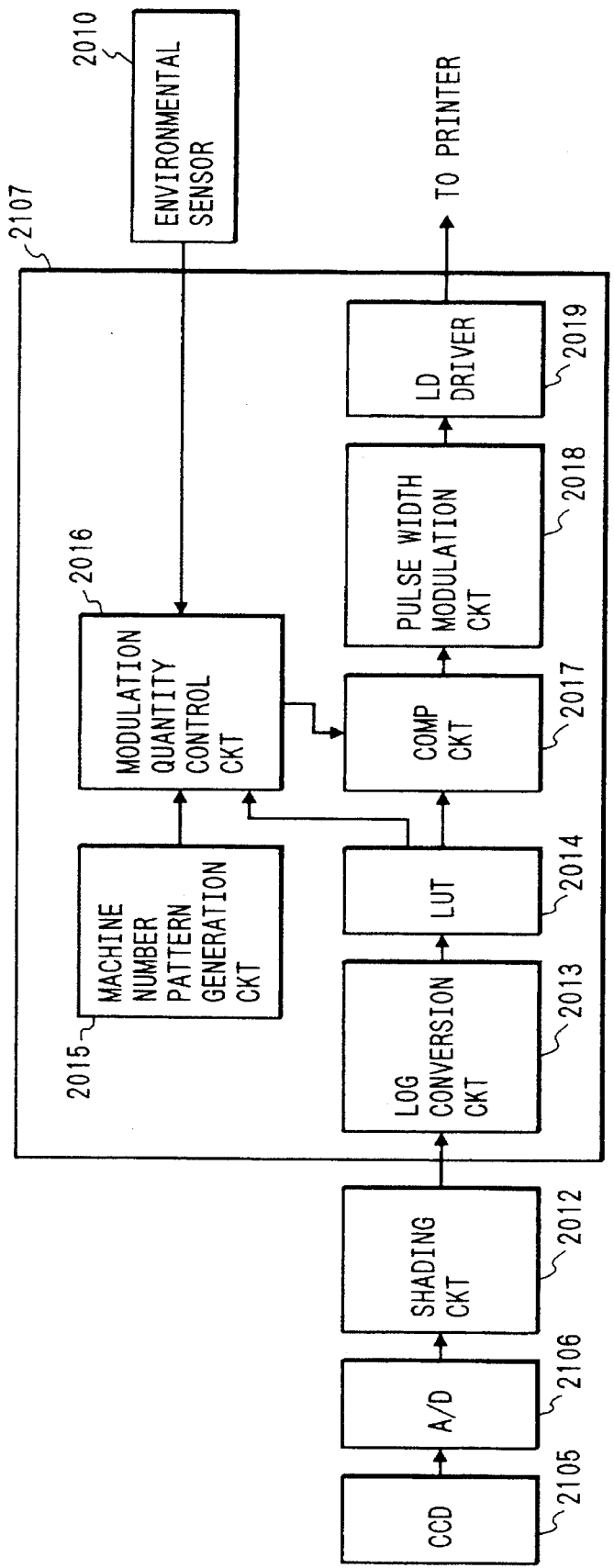
FIG. 17 is a block diagram showing the schematic circuit arrangement of a color copying machine according to the second embodiment of the present invention.

FIG. 17 is a block diagram showing the schematic circuit arrangement of the color copying machine according to the second embodiment. A shading circuit 2012 corrects shading of the digital signal from the A/D conversion circuit 2106. The control circuit 2107 comprises a LOG conversion circuit 2013, an LUT (look-up table) 2014, a machine number pattern generation circuit 2015, a modulation quantity control circuit 2016, a comparator circuit 2017, a pulse width modulation circuit 2018, and an LD driver 2019.

The operation of the above arrangement will be described below.

Figure 19:
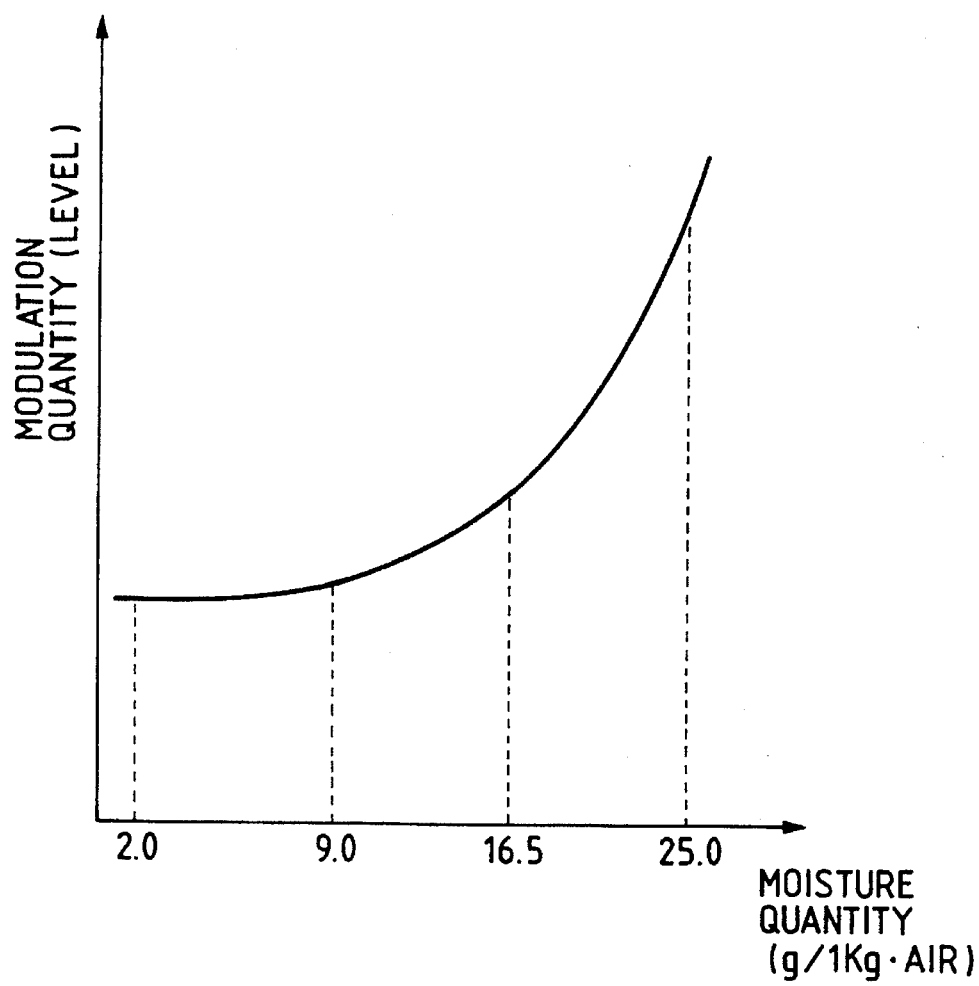
FIG. 19 is a graph showing the relationship between the modulation quantity and the moisture quantity according to the second embodiment.
Figure 20:
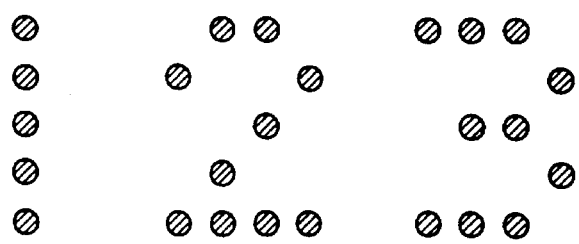
FIG. 20 is a view showing a machine number pattern according to the second embodiment.

FIG. 19 is a graph showing the relationship between the modulation quantity and the moisture quantity according to the second embodiment, and FIG. 20 shows a machine pattern according to the second embodiment.

An image luminance signal is obtained by the CCD 2105 and converted into a digital luminance signal by the A/D conversion circuit 2106. Sensitivity variations of the respective CCD elements which are represented by the digital luminance signal are corrected by the shading circuit 2012. The corrected luminance signal is converted into a density signal by the LOG conversion circuit 2013.

The density signal is then converted by the LUT 2014 such that the γ characteristics of the printer in initialization of the original image density coincide with those of the output image.

On the other hand, the machine number pattern generation circuit 2015 generates a pattern unique to the machine. In this case, the machine number pattern generation circuit 2015 has a modulation quantity table of an image signal representing only Y (yellow) having the lowest resolution when viewed with a human eye. This modulation quantity table represents the modulation quantity as a function of a moisture quantity mixing ratio in air calculated on the basis of the temperature and humidity detected by the environmental sensor 2010, as shown in FIG. 19. The modulation quantity is controlled in accordance with this table. This control is performed by the modulation quantity control circuit 2016 in FIG. 17.

The modulated machine number pattern is synthesized by the comparator circuit 2017 for superposing the pattern on the image signal.

The machine number pattern is caused to correspond to a numeric pattern, but is preferably constituted by an encrypted graphic pattern corresponding to the numbers and characters.

The image signal superposed on the machine number pattern is modulated by the pulse width modulation circuit 2018 into a signal representing a laser emission time proportional to the density signal. The modulated signal is sent to the LD driver 2019. The density gradation is expressed as area gradation, thereby forming a gradation image.

The machine number pattern is observed through a 350-nm sharp band filter after a full color image is formed. In this case, the machine number pattern can be identified by separating only a yellow signal. Even if a copy is a counterfeit, a copying machine used to obtain this copy can be specified.

The absolute humidity (i.e., the moisture quantity mixing ratio [g/1 kg. air] in air) corresponding to the temperature and humidity which are detected by the environmental sensor is plotted along the abscissa in FIG. 19, and the modulation quantity which allows reading of a signal at this time and does not cause an image defect is plotted along the ordinate in FIG. 19. The modulation quantity control circuit 2106 controls a modulation quantity in accordance with this relationship using data from the environmental sensor 2010.

An image reproduction capability will be described below.

Figure 21:
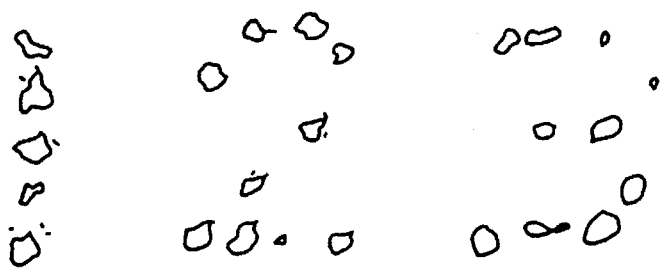
FIG. 21 is a view showing a pattern when image degradation has occurred.

FIG. 21 is a view showing a pattern in image degradation.

In an electrophotographic scheme, the charge amount (tribo-) of a developing agent used in recording is extremely decreased at, e.g., a high temperature and a high humidity, and the developing capability on the photosensitive body is greatly increased. For this reason, a means for adjusting the density is generally used to decrease the contrast potential for development. When this means, however, is used, a difference between the latent potential and the dark potential on the surface of the photosensitive body is decreased to disturb the developing agent particles attracted to the photosensitive body, as shown in FIG. 21. A signal added to an image is concealed by the image and cannot be read. When the moisture quantity is large, as shown in FIG. 19, the modulation quantity of the image signal to be added is increased. In FIG. 19, when the moisture quantity is 15.0 g or less, the modulation quantity is set almost constant because the developing agents used in this embodiment have contract potentials having high reproduction capability in this atmosphere. This condition may not apply to other materials.

As described above, according to the second embodiment, in an image forming apparatus wherein images formed by a plurality of color agents are stacked on each other to form a full color image, and at the same time information unique to this apparatus is superposed on an image having a specific color, the modulation quantity of the superposition pattern is changed in accordance with the values from the environmental sensor, thereby stably forming the information unique to the apparatus on the image.

<Third Embodiment>

In the second embodiment, the modulation quantity control circuit 2016 has the look-up table constituted by the RAM and corresponding to the graph shown in FIG. 19, and the modulation quantity is stored as a function of the moisture quantity. However, in the third embodiment, a low-cost, simple method of reducing the capacity of the RAM constituting the look-up table will be described.

Figure 22:
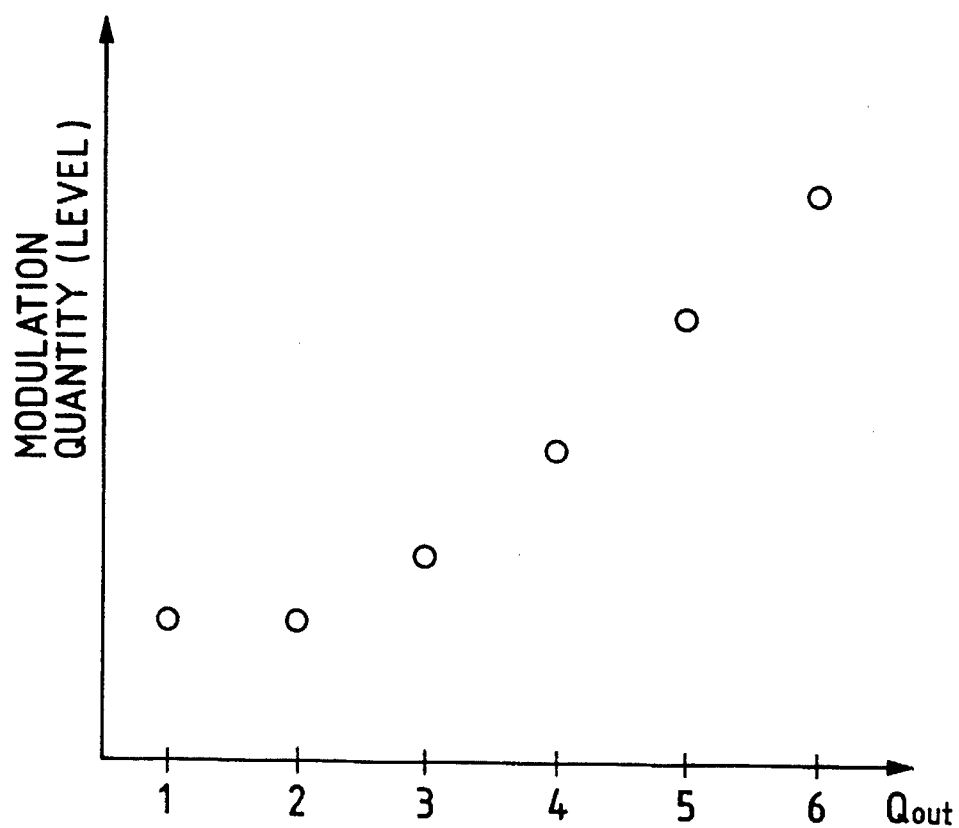
FIG. 22 is a graph showing the relationship between the modulation quantity and the output according to the third embodiment.

FIG. 22 is a graph showing the relationship between the modulation quantity and the output according to the third embodiment.

The relationship between the value of the modulation quantity and the moisture quantity strictly has a one-to-one correspondence. Since sufficient margins in signal reading and image degradation are allowed, the moisture quantities calculated by the temperatures and humidities which are detected by an environmental sensor 2010 are classified into six stages, i.e., 5.0 to 9.0 g, 9.0 to 12.0 g, 12.0 to 16.5 g, 16.5 to 20.0 g, and 20.0 or more and are given as $Q_{out1}$, $Q_{out2}$, $Q_{out3}$, . . . , $Q_{out6}$. The modulation quantities are then discretely controlled, as shown in FIG. 22.

<Fourth Embodiment>

Figure 23:
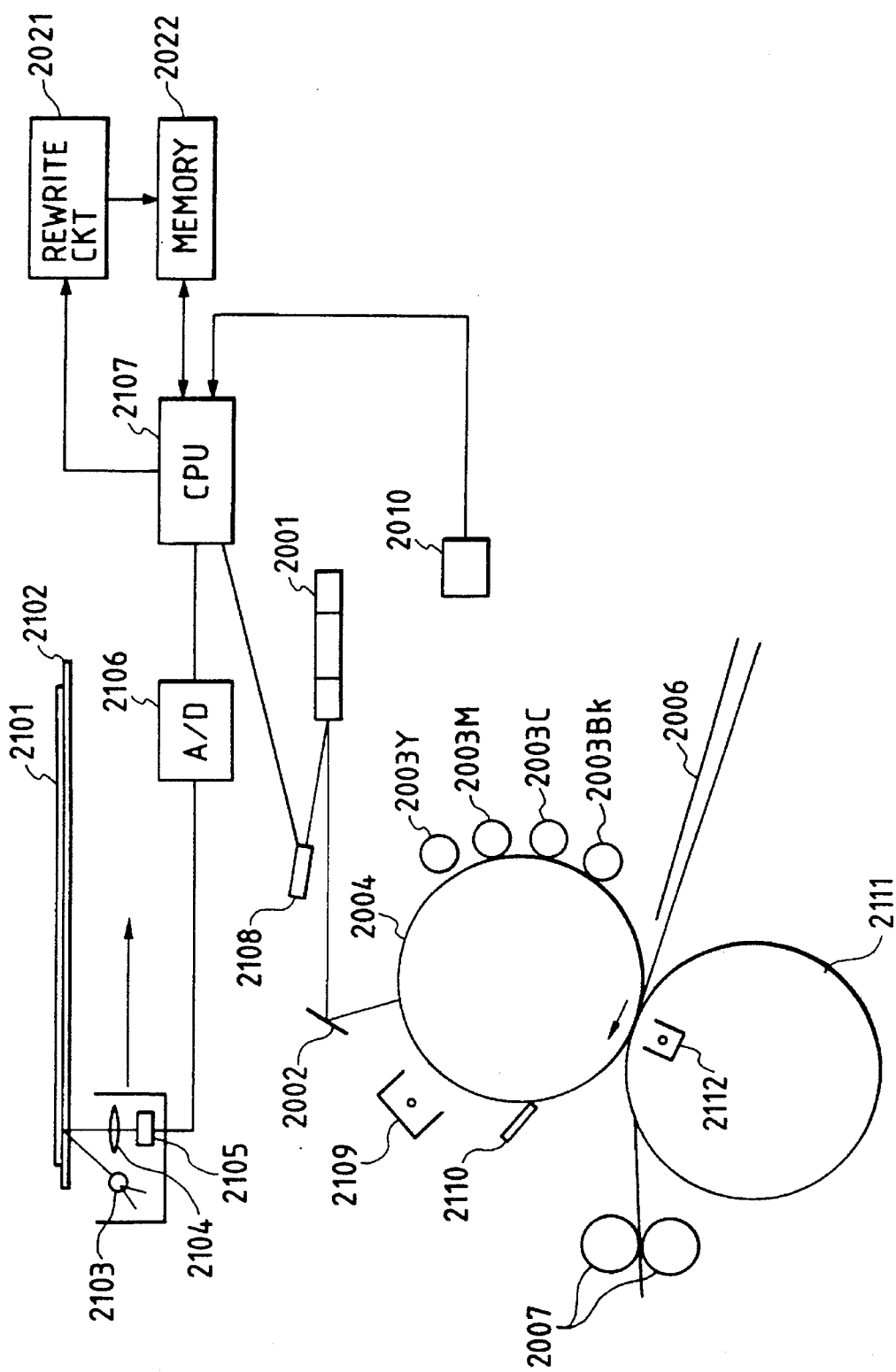
FIG. 23 is a side sectional view showing the arrangement of the main part of a color copying machine according to the fourth embodiment of the present invention.
Figure 25:
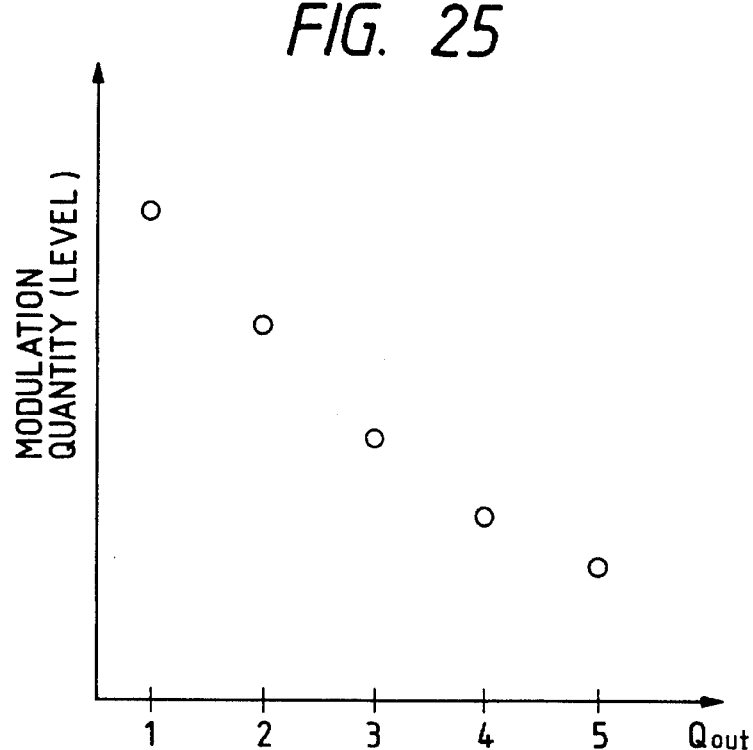
FIG. 25 is a graph showing the relationship between the modulation quantity and the output according to the fourth embodiment.

FIG. 23 is a side sectional view showing the arrangement of the main part of a color copying machine according to the fourth embodiment. The same reference numerals as in the first embodiment in FIG. 18 denote the same parts in the fourth embodiment in FIG. 23, and a detailed description thereof will be omitted. FIG. 25 is a graph showing the relationship between the modulation quantity and the output according to the fourth embodiment.

In the fourth embodiment, in addition to the arrangement in FIG. 18, a memory 2022 serving as a data memory means and a rewrite circuit 2021 are arranged together with the environmental sensor, as shown in FIG. 23 due to the following reason. If great variations occur in the detected temperature and humidity in real-time control, the modulation quantity of an image signal to be superposed is also greatly changed. In practice, the humidity of a material such as a developing agent used in the machine body is adjusted for a long period of time. A modulation quantity is thus obtained on the basis of a series of environmental data obtained every predetermined interval. This modulation quantity has characteristics shown in FIG. 25.

The operation of the fourth embodiment will be described below.

Figure 24:
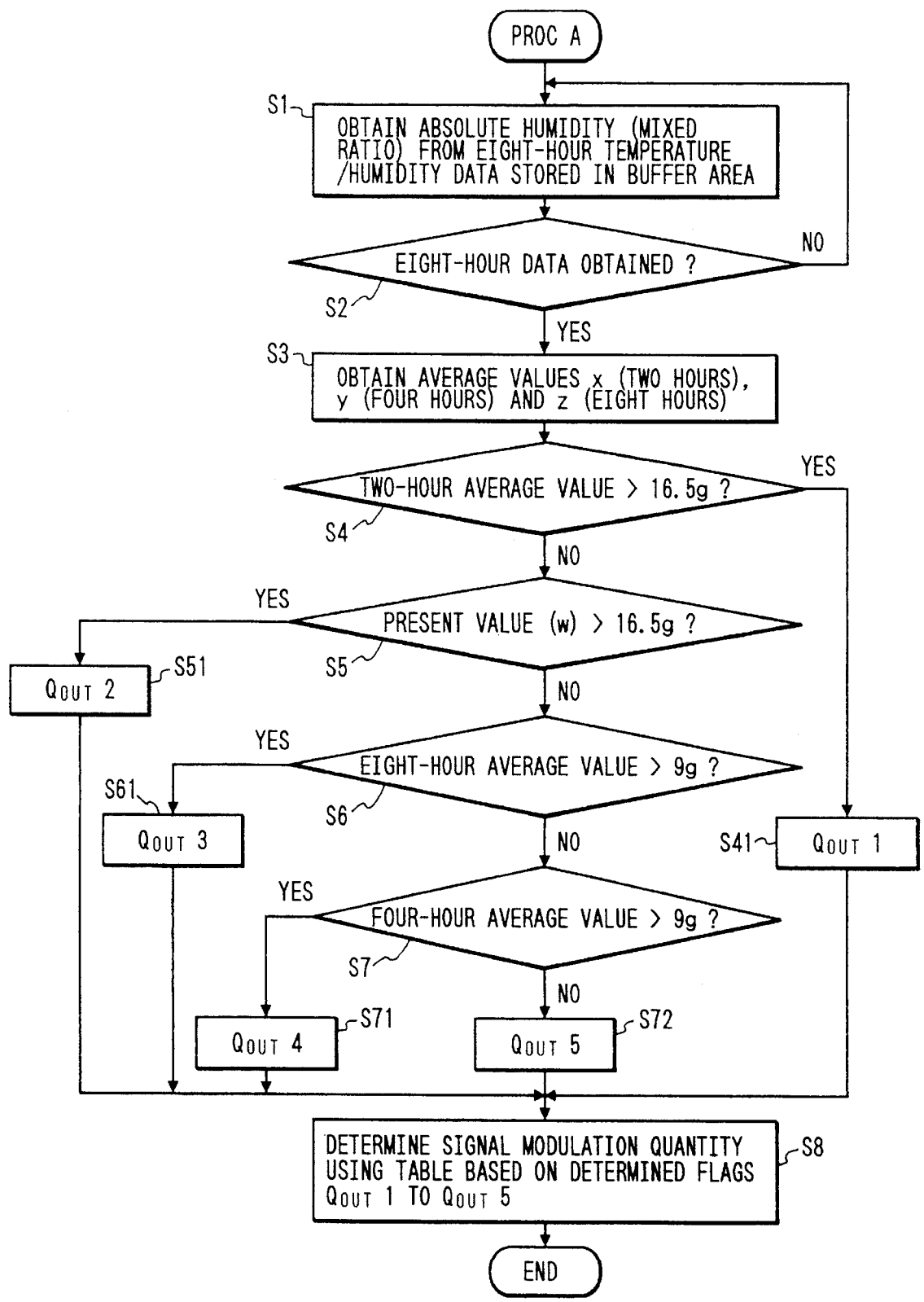
FIG. 24 is a flow chart for explaining a method of calculating a modulation quantity according to the fourth embodiment.

FIG. 24 is a flow chart for explaining a method of calculating a modulation quantity according to the fourth embodiment.

Referring to FIG. 24, the environmental sensor 2019 measures values once per 30 minutes or several times per 30 minutes to obtain an average value. For example, an eight-hour average value is stored in a buffer area of the memory 2022. In step S1, an absolute humidity or a value corresponding thereto, e.g., a mixing ratio, is obtained by a predetermined calculation using the eight-hour environmental data and stored in the memory 2022 because the physical property (particularly, a resistance) of the developing agent greatly depends on the absolute humidity, i.e., the moisture quantity in air. It is determined in step S2 whether the calculation of the absolute humidity (mixing ratio) is performed for eight hours. If eight-hour data is obtained (YES), the flow advances to step S3 to obtain average values x, y, and z of two-, four-, and eight-hour absolute humidities (mixing ratios). The average values x, y, and z are used in the following conditional judgment.

It is determined in step S4 whether the two-hour average value x is a mixing ratio of 16.5 g or more. If YES in step S4, the flag is set to $Q_{out1}$ (step S41). This flag indicates that a high-humidity state has continued for two hours. It is determined in step S5 whether the current value is 16.5 g or more. If YES in step S5, the flag is set to $Q_{out2}$ (step S51). This flag indicates that the humidity is being increased after a low-humidity state for two hours. It is determined in step S6 whether the eight-hour average value z is 9 g or more. If YES in step S6, the flag is set to $Q_{out3}$ (step S61). This flag indicates that an intermediate humidity is maintained for eight or more hours. It is determined in step S7 whether the four-hour average value y is 9 g or more. If YES in step S7, the flag is set to $Q_{out4}$ (step S71). This flag indicates that the humidity is changed from a low humidity to an intermediate humidity. In a case except for the above cases, i.e., when the four-hour average value y is 9 g or less, a low humidity is judged, and the flag is set to $Q_{out5}$ (step S71).

The above process is performed due to a difference between the rate of change from the low humidity to the high humidity and the rate of change from the high humidity to the low humidity. That is, the absorbing state of the developing agent depends on the absolute humidity. This is determined not by the ambient humidity but by the humidity of the developing agent, thereby performing the above judgment.

In step S8, the modulation amount is determined by the judged flags $Q_{out1}$ to $Q_{out5}$ (output flags).

As described above, according to the first to the fourth embodiments of the present invention, in an image forming apparatus wherein images formed by a plurality of color agents are stacked on each other to form a full color image and information unique to the apparatus is superposed on the image of a specific color, the modulation quantity of the superposition pattern is changed in accordance with the values of the environmental sensor, thereby stably forming information unique to the image forming apparatus.

The environmental state is not limited to the temperature and humidity, but can be replaced with an air pressure or the like.

<Fifth Embodiment>

Figure 27:
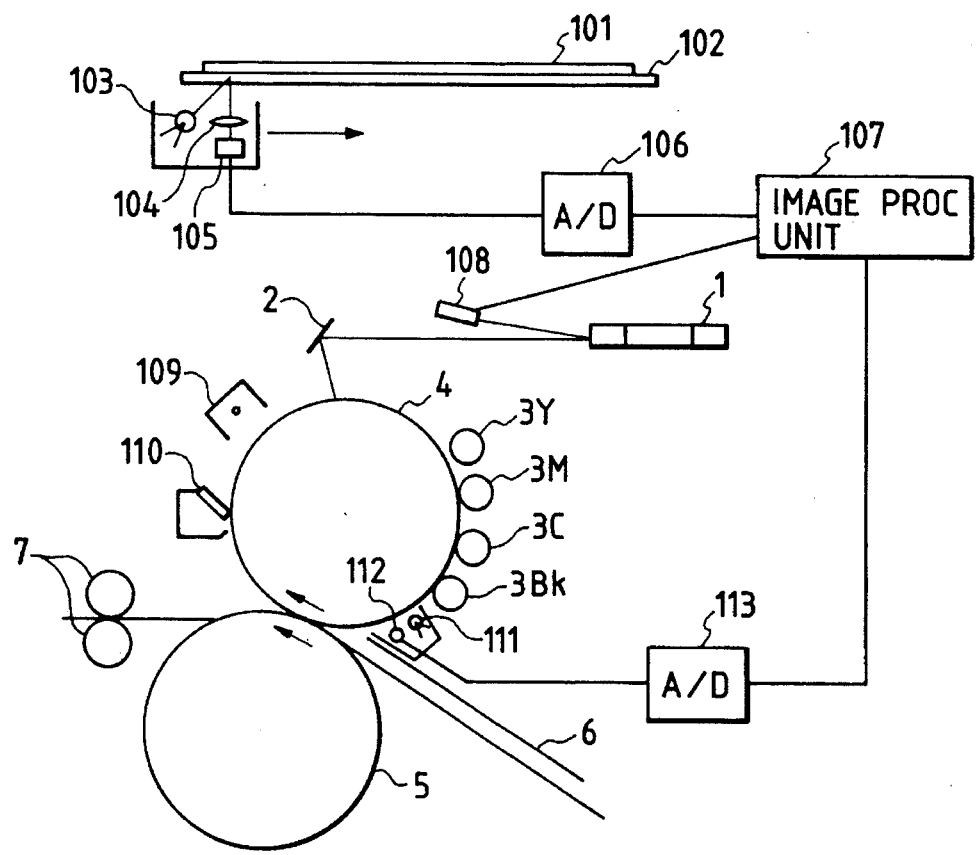
FIG. 27 is a view showing the arrangement of an image forming apparatus.

FIG. 27 is a view showing the arrangement of the fifth embodiment.

A method of forming a color image according to the fifth embodiment will be described below.

Referring to FIG. 27, an original 101 placed on an original glass table 102 is focused on a CCD sensor 105 by a light source 103 and an optical lens 104 and is converted into an image signal corresponding to an amount of light received by the CCD sensor 105.

An image signal is converted into a digital value by an A/D conversion circuit 106 and is processed by an image processing unit 107. The processed image data is used as a signal for driving a laser source 108.

An emitted laser beam is reflected by a polygon mirror 1 and a mirror 2 and is radiated on a photosensitive drum 4.

The surface of the photosensitive drum 4 is cleaned by a cleaning blade 110 in advance so as not to leave residual toners on the surface of the photosensitive drum 4. The surface of the photosensitive drum 4 is then uniformly charged with a charger 109.

The photosensitive drum 4 on which a latent image is formed upon laser beam scan using a Y (yellow) image signal first is rotated in a direction indicated by an arrow in FIG. 27.

The latent image is then developed with a developing unit 3Y.

The photosensitive drum 4 is further rotated to attract a recording medium 6 to a transfer drum 6, and a toner image formed on the photosensitive drum 4 is transferred to the recording medium 6 by a transfer charger 112.

Latent image formation and development are performed in accordance with an M (magenta) image signal, and the M image is transferred on the Y image on the recording medium at the image registration position.

Similarly, C and Bk images are formed and transferred on the Y and M images. The recording medium is separated from the transfer drum 5, and the images on the recording medium are fixed by a fixing roller pair 7, thereby obtaining a color image print.

In addition, a sensor unit for causing an LED 111 to emit light to the toner image developed on the photosensitive drum 4 and for causing a photodiode 112 to receive light reflected by the toner image is arranged between the developing units and the transfer unit. An A/D converter 113 converts an analog signal from the photodiode 112 into a digital signal.

In this embodiment, the LED 111 emits an infrared ray having a wavelength of 950 nm.

The yellow toner as a target object has characteristics for reflecting light in this wavelength range, while the photosensitive drum has characteristics for performing balanced reflection.

Figure 28:
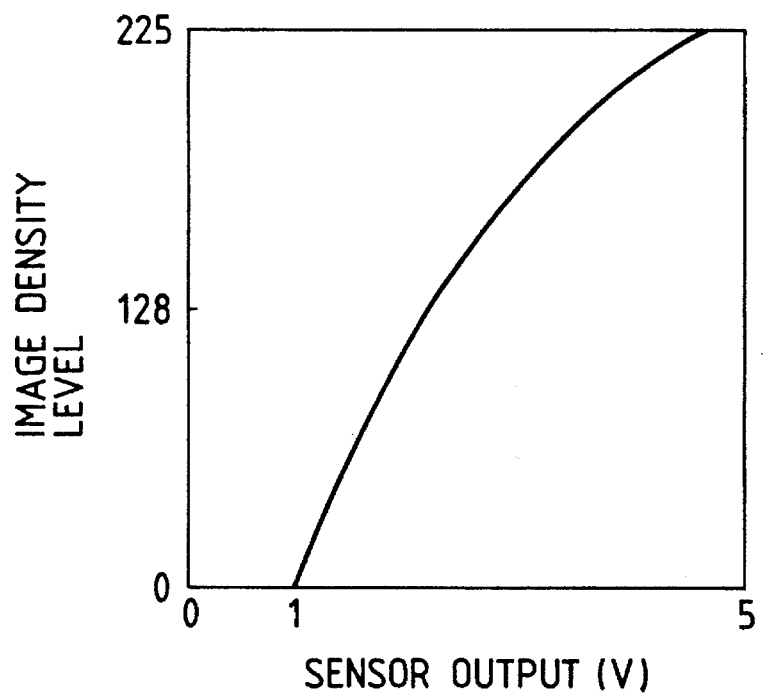
FIG. 28 is a graph showing the relationship between the sensor output and the image density.

FIG. 28 is a graph showing the correspondence between the sensor output and the image density level.

FIG. 26 is a block diagram showing the arrangement of the image processing unit 107.

An image luminance signal is obtained by the CCD sensor 105 and converted into a digital luminance signal by the A/D conversion circuit 106.

The sensitivity variations of the CCD elements which are contained in the resultant luminance signal are corrected by a shading circuit 12. The corrected luminance signal is converted into a density signal by a LOG conversion circuit 13.

An LUT (look-up table) 14 performs conversion such that the γ characteristics of the printer in initialization for the original image density coincide with those for the output image.

Figure 29:
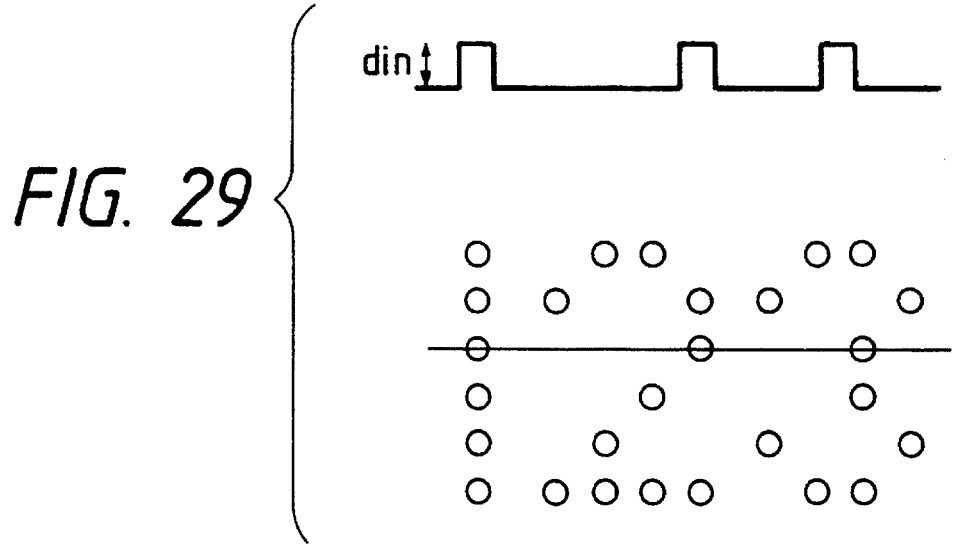
FIG. 29 is a view showing a pattern unique to the image forming apparatus.

On the other hand, a machine number pattern generation circuit 15 generates a pattern unique to the machine. As in the first embodiment, a pattern shown in FIG. 29 is superposed on only a Y (yellow) image signal having a lowest resolution to the human eye.

An optimal modulation quantity of a pattern to be superposed is calculated by a CPU 18 on the basis of the value obtained by the CCD sensor 112 for measuring the quantity of light reflected by a patch pattern on the drum. A calculation result is sent to a modulation quantity control circuit 16. The modulation quantity control circuit 16 performs modulation on the basis of a pattern signal from the machine number pattern generation circuit 15.

The modulated machine number pattern is synthesized with the image signal from the LUT 14 by a comparator circuit 19.

A reference pattern generation circuit 22 generates halftone data for forming a reference patch pattern for determining an image forming condition on the drum.

The apparatus of this embodiment having the above arrangement will be operated as follows.

(1) A multigradation reference pattern is generated by the reference pattern generation circuit 22 and is PWM-modulated by a pulse width modulation circuit 20. A toner image having a multigradation reference pattern is formed on the photosensitive drum 4 by a laser driver 21.

(2) The reference pattern formed on the photosensitive drum 4 is irradiated with the LED 111, and light reflected by the reference pattern is converted into an electrical signal by the photodiode 112. The electrical signal is then A/D converted by the A/D conversion circuit 113. The digital signal is then input to the CPU 18 in the image processing unit 107.

(3) The CPU 18 sends a control signal for controlling the modulation quantity of the image in the comparator circuit 19 to the modulation quantity control circuit 16 on the basis of the digital signal obtained by reading the reference pattern. At the same time, the CPU 18 controls the γ-conversion performed by the LUT 14 in a manner to be described later. Control of the γ-conversion characteristics is performed by rewriting the contents of the LUT 14 by the CPU 18.

(4) The synthesis characteristics of predetermined information and the image forming characteristics of the image forming means are optimized as described above. Image data input from the CCD 105 is processed under the optimal condition.

In addition to the control of the γ-conversion characteristics described above, the charge quantity of a charger 109, the developing bias voltages of the developing units (3Y, 3M, 3C, and 3Bk), and the light quantity and emission time of the exposure unit (laser source 108) may be controlled to optimize the image forming condition.

The machine number pattern is caused to correspond to a numeric pattern, as shown in FIG. 4, in the above embodiment, but is preferably constituted by an encrypted shape pattern corresponding to the numbers and characters.

The image signal superposed with the machine number pattern is modulated by the pulse width modulation circuit 20 to obtain a laser emission time proportional to the density signal. The signal from the pulse width modulation circuit 20 is sent to the laser driver 21. The density gradation is expressed as area modulation, thereby forming a gradation image.

The machine number pattern is observed through a 350-nm sharp band filter after a full color image is formed. In this case, the machine number pattern can be identified by separating only a yellow signal. Even if a copy is a counterfeit, a copying machine used to obtain this copy can be specified.

Figure 30:
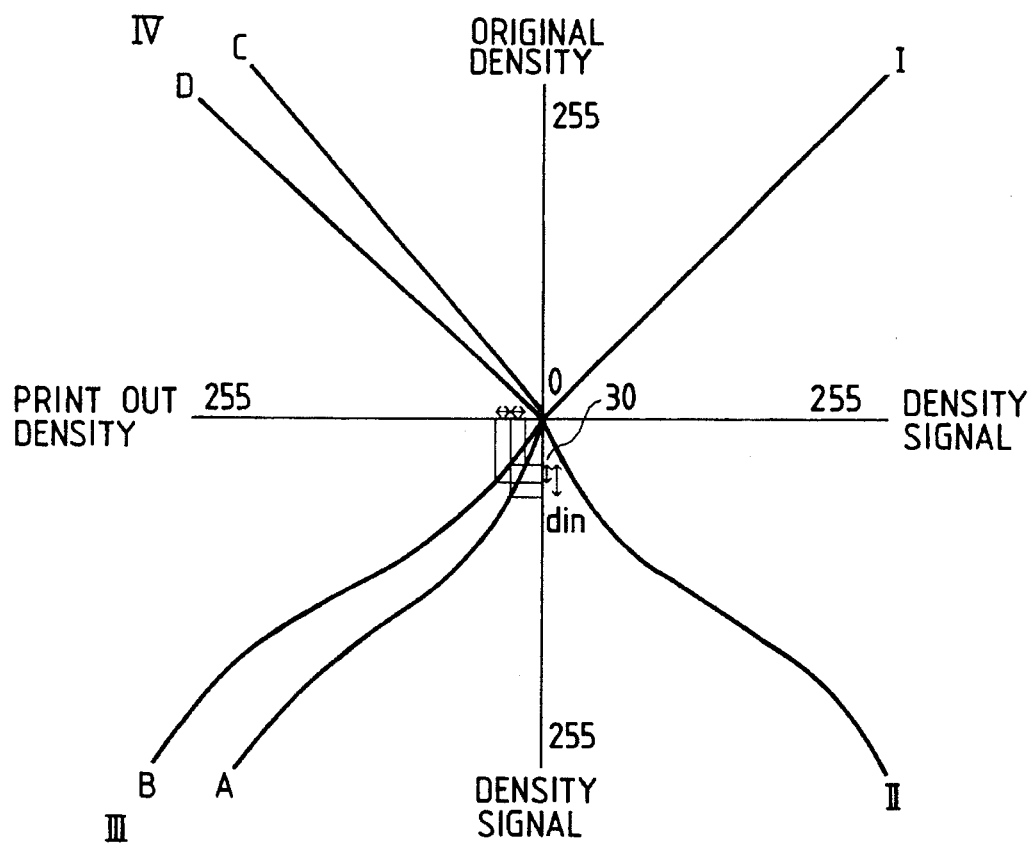
FIG. 30 is a four-quadrant chart showing gradation characteristic conversion.

FIG. 30 is a four-quadrant chart showing gradation reproduction.

A quadrant I represents the reader characteristics for converting the original density into the density signal, a quadrant II represents the characteristics of the LUT for converting the density image into the laser output signal, a quadrant III represents printer characteristics for converting the laser output signal into the output density, and a quadrant IV represents total gradation characteristics of the image forming apparatus which represent the relationship between the original density and the output density.

The number of gradation levels is 256 because input data is processed using an 8-bit digital signal.

The printer characteristics of the quadrant III are known to have various shapes depending on the characteristics of the photosensitive body, the laser spot diameter, and the developing characteristics.

An S-shaped characteristic curve is exemplified here.

It is important to faithfully reproduce a full color image such that the total gradation characteristics representing the relationship between the original density and the output density in the quadrant IV become linear. For this purpose, the LUT characteristic curve in the quadrant III must be an S-shaped curve, as shown in FIG. 30.

The printer characteristics may be fluctuated like curves A and B in the quadrant III in accordance with changes in characteristics caused by environmental changes such as changes in temperature and humidity and changes in photosensitive characteristics caused by the fatigue and wear of the photosensitive body. The total characteristics in the quadrant IV correspond to curves C and D, so that linearity of the gradation can be maintained.

The modulated signal of the machine number pattern upon LUT conversion in the quadrant III is obtained by adding din to the image density signal (a description will be made with reference to the level "30").

Figure 31:
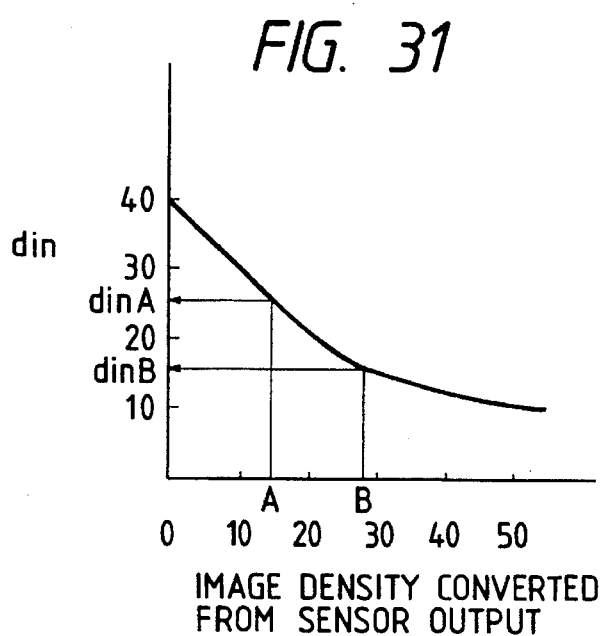
FIG. 31 is a graph for obtaining din from an image density signal.

An output reflected by the toner of a 30-level toner on the drum is measured by a sensor and an image density signal obtained based on this measured value is used to determine the din, as shown in FIG. 31.

In this embodiment, this control is performed by automatically starting the system after the main power switch is turned on and a warm-up operation is completed. However, this control may be performed during pre- or post-rotation when the variation quantity of data from the temperature/humidity sensor exceeds a predetermined value.

In this embodiment, the 30-level image density is exemplified. However, this level may be optimally selected in accordance with variations in printer characteristics.

By this control, values dinA and dinB are obtained in the characteristic curves A and B, respectively.

By this control, an output density step dout is kept constant. Therefore, although the printer characteristics vary, a drawback that the machine number pattern cannot be read due to an extremely low density or is noticed due to an extremely high density can be prevented.

<Sixth Embodiment>

Figure 32:
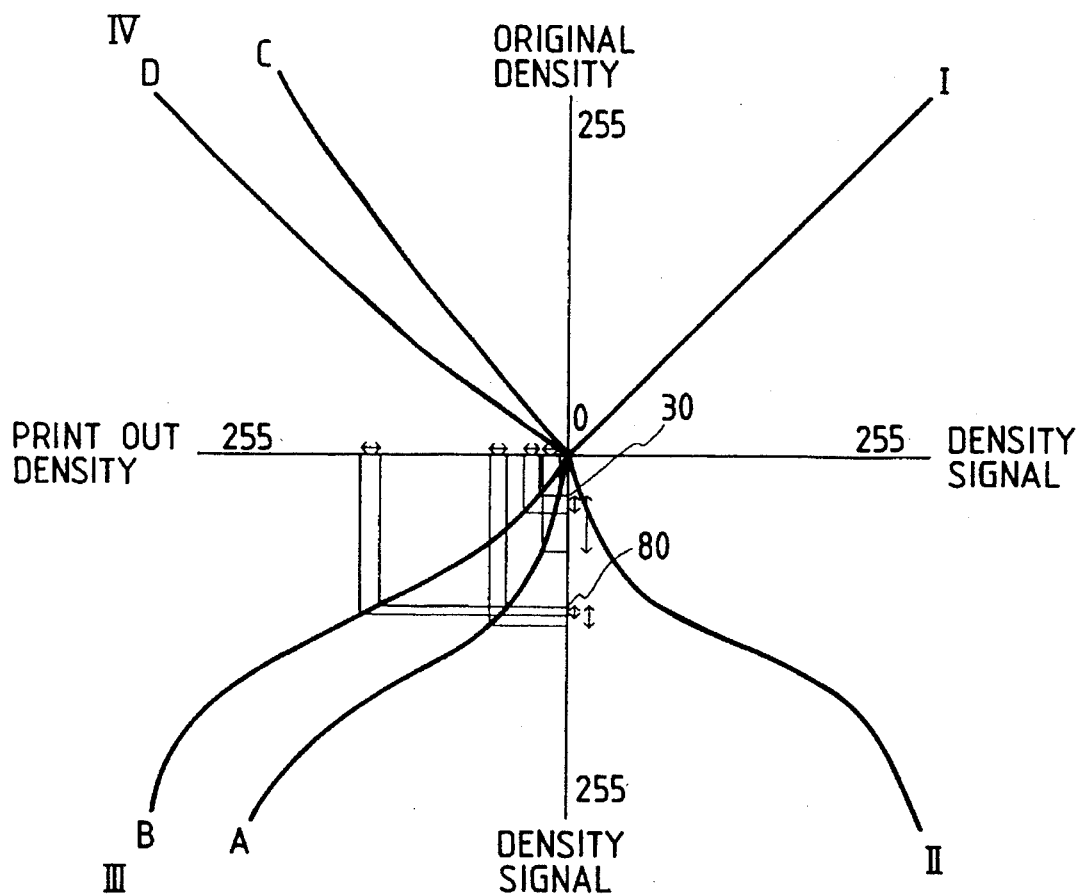
FIG. 32 is a four-quadrant chart showing gradation characteristic conversion according to the sixth embodiment.

The density step level din is judged by one point as level "30" of the density signal. However, as indicated in the quadrant III in FIG. 32, when the printer characteristics are typically represented by an S-shaped curve, γ-correction values of the printer have different gradients in the range from the low-density region to the intermediate-density region. Optimal density step levels din vary depending on density regions.

Figure 33:
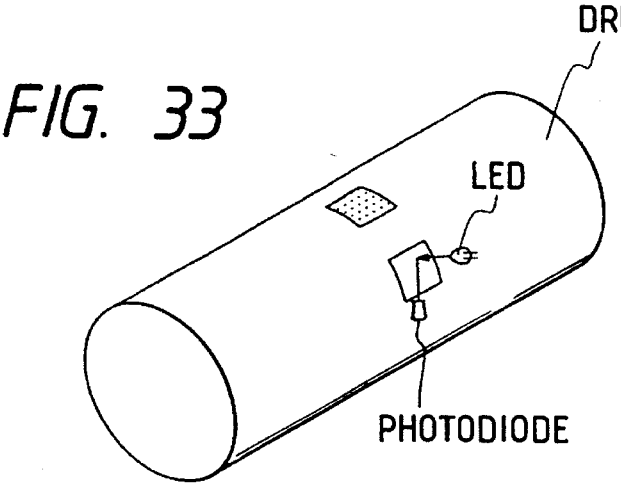
FIG. 33 is a view for measuring the quantity of light reflected by a patch pattern on a drum.
Figure 34:
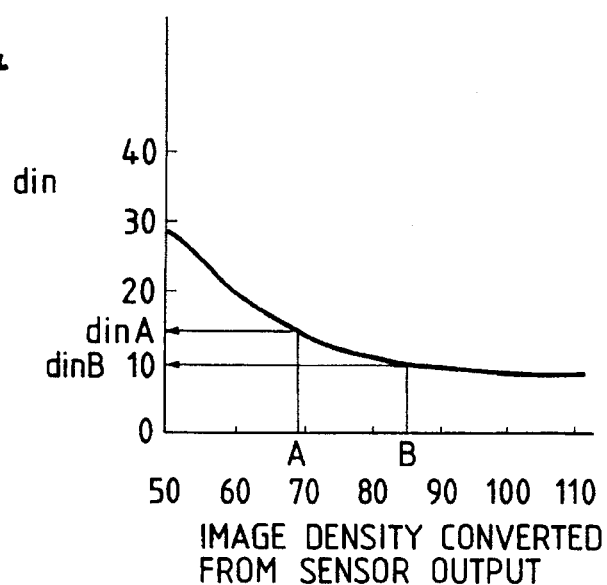
FIG. 34 is a graph for obtaining din from an image density signal.

In this embodiment, as shown in FIG. 33, patches having two different density levels, i.e., levels "30" and "80" are formed on the drum. Light quantities of light components reflected by these patches are measured by a reflected light quantity sensor to obtain corresponding image density signals. In this case, din30 is obtained for level "30" by a converting means shown in FIG. 32, and din80 is obtained for level "80" by a converting means shown in FIG. 34.

Figure 35:
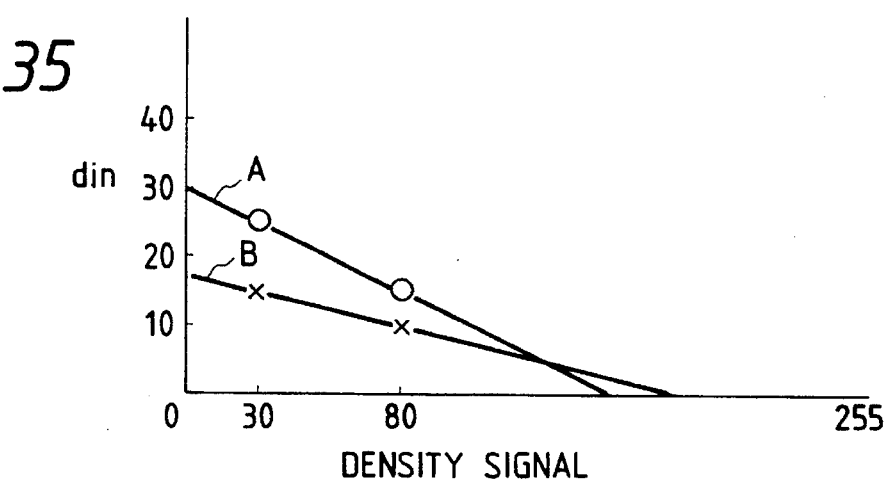
FIG. 35 is a graph showing the relationship between the image density signal and din.
Figure 36:
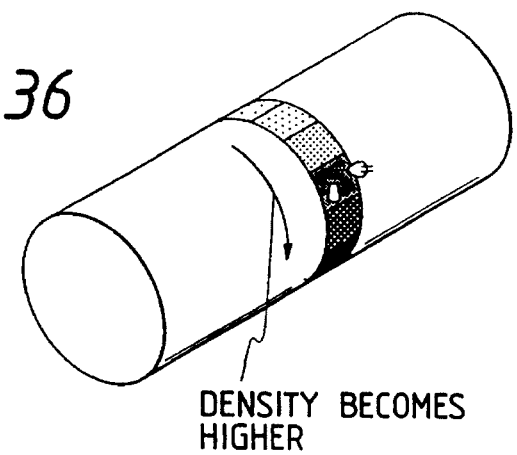
FIG. 36 is a view for measuring the quantity of light reflected by a patch pattern on a drum.

The values din30 and din80 obtained as shown in FIG. 35 are obtained by interpolating the values din of the remaining density levels to obtain an optimal machine number pattern in the entire density range.

In this embodiment, the low-density region and the intermediate-density region are taken as an example, so that levels "30" and "80" are sampled to perform linear interpolation. However, a large number of points may be sampled, and higher-degree interpolation or spline interpolation may be performed.

<Seventh Embodiment>

Figure 37:
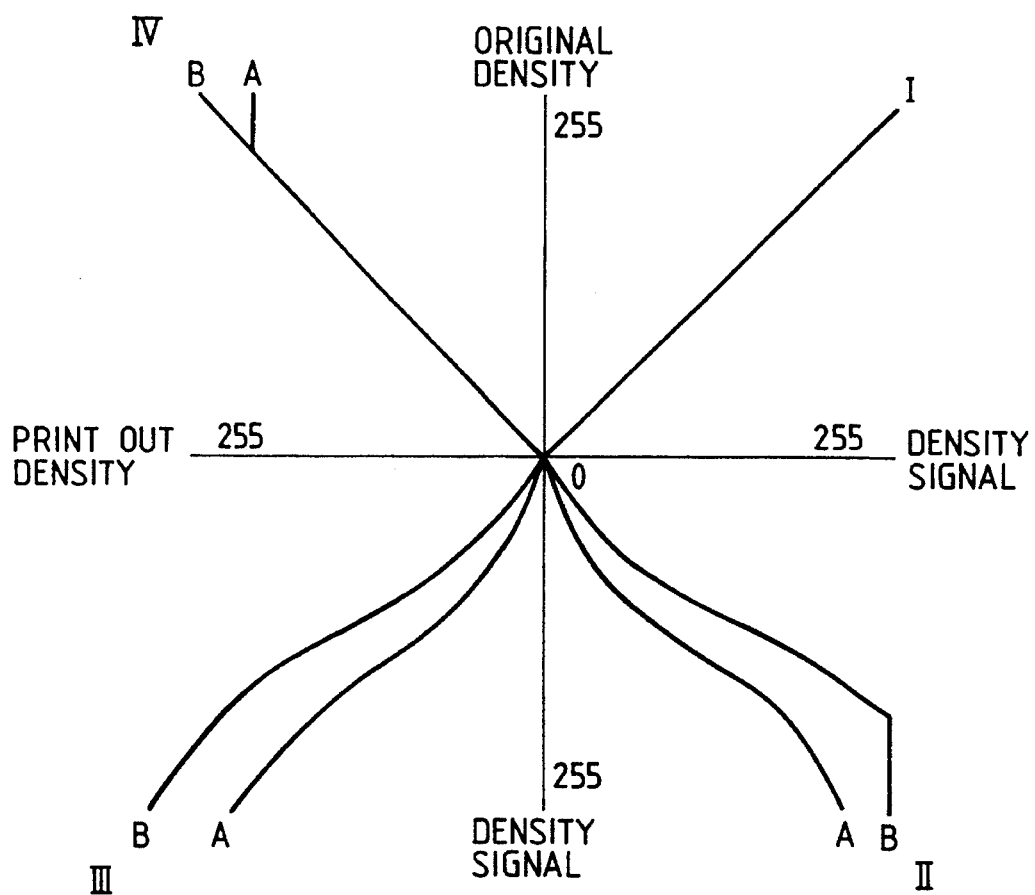
FIG. 37 is a four-quadrant chart showing gradation characteristic conversion according to the seventh embodiment.

In a conventional technique, a multigradation patch pattern is formed on a photosensitive drum, a reflected light quantity corresponding to the gradation patch is measured with the reflected light quantity sensor for this patch pattern, the reflected light quantity is converted into an image density, and then corresponding printer characteristics are obtained. From this characteristic data, the LUT on the gradient II is obtained, as shown in FIG. 37, and the total gradation characteristics on the quadrant I are kept constant.

According to this embodiment, image density signals obtained during the control are stored in a memory. Control of the first and second embodiments is performed on the basis of the stored signals, thereby satisfying both stable gradation control and machine number pattern formation control.

<Eighth Embodiment>

Figure 38:
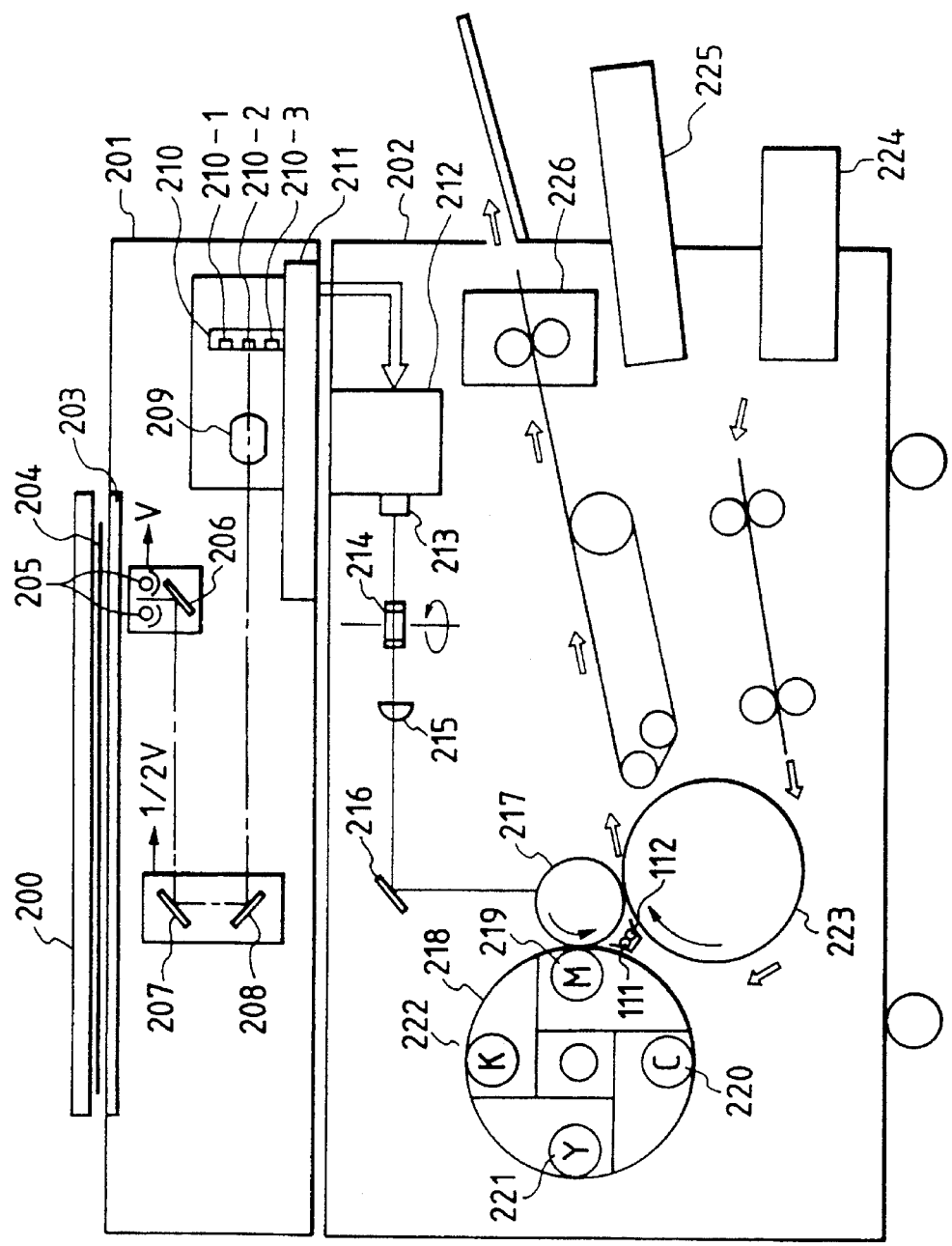
FIG. 38 is a view showing the schematic arrangement according to the eighth embodiment of the present invention.

FIG. 38 is a schematic view showing an apparatus according to the eighth embodiment of the present invention.

The same reference numerals as in FIG. 2 denote the same parts in FIG. 38.

Referring to FIG. 38, the apparatus includes an LED 111 and a photodiode 112. A reference pattern generation circuit 22 (FIG. 39) for generating halftone data for forming a reference patch pattern on a drum is arranged in a signal processing unit 211.

In this embodiment, the reference pattern generation circuit 22 generates halftone data, and the multigradation reference pattern formed on a photosensitive drum 2217 is read by the photodiode 112 on the basis of the generated halftone data to detect the characteristics of an image forming means including the photosensitive drum. A CPU 1411 controls a value set in a register 831 (FIG. 45) on the basis of the detected characteristics.

[Image Scanner]

Figure 39:
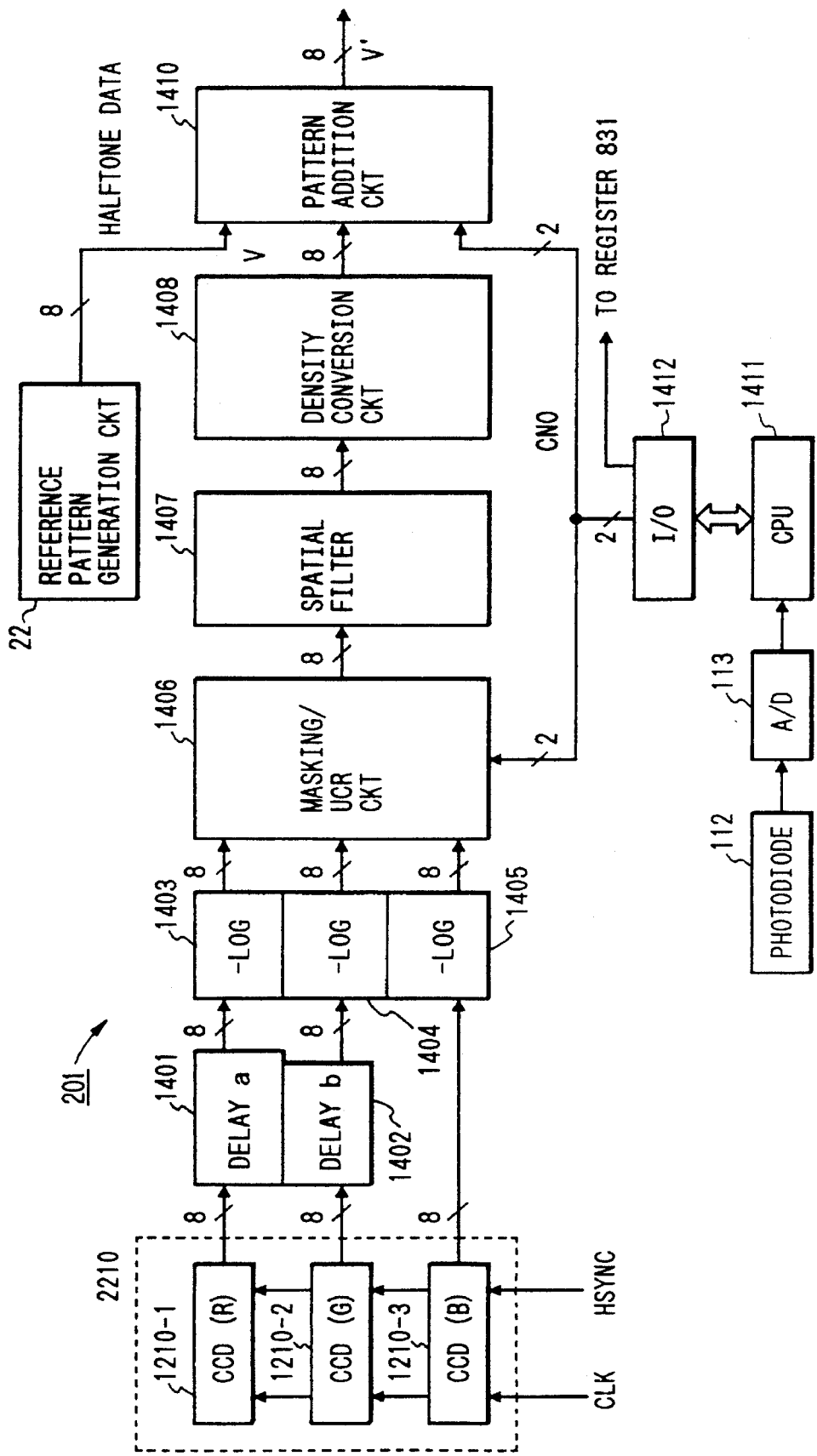
FIG. 39 is a block diagram showing the arrangement of an image scanner according to the eighth embodiment.

FIG. 39 is a block diagram showing the arrangement of an image scanner 201.

The image scanner 201 comprises CCD sensors (solid-state image pickup elements) 1210-1 to 1210-3 having R, G, and B spectral sensitivity characteristics. The CCD sensors 1210-1 to 1210-3 are incorporated in the 3-line sensor 210 shown in FIG. 38 and output 8-bit digital signals. Each of the R, G, and B color components represents a value falling within the range of 0 to 255 in accordance with a measured light intensity.

The CCD sensors 1210-1 to 1210-3 in this embodiment are spaced apart from each other at a predetermined interval, so that their spatial shifts are corrected using delay elements 1401 and 1402.

LOG converters 1403 to 1405 are constituted as ROM or RAM look-up tables and convert the image data sent from the 3-line sensor 2210 from the luminance signal into the density signal. A masking/UCR (undercolor removal) circuit 1406 is a known circuit, and a detailed description thereof will be omitted. The masking/UCR circuit 1406 receives three input signals and surface-sequentially outputs M, C, Y and Bk signals in a predetermined bit length, e.g., in the form of 8 bits every time the read operation is performed.

A spatial filter circuit 1407 is a known circuit for performing correction of the spatial frequency of an output signal. A density conversion circuit 1408 corrects the density characteristics of a printer 2202 and is constituted by a ROM or RAM as in the LOG converters 1403 to 1405.

A pattern addition circuit 1410 adds a pattern to an output image.

A CPU 1411 controls the apparatus of this embodiment, and an I/O port 1412 is connected to the CPU 1411.

An input signal CNO input to the masking/UCR circuit 1406 and the pattern addition circuit 1410 is a 2-bit output color selection signal shown in FIG. 16. The signal CNO is generated from the CPU 1411 through the I/O port 1412 and controls the order of four transfer operations. The signal CNO switches the operating conditions of the masking/UCR circuit 1406 and the pattern addition circuit 1410.

The CPU 1411 rewrites the value of the register 831 for setting a pattern modulation quantity in accordance with data from the photodiode 112.

[Pattern Addition Method]

A pattern addition method according to this embodiment will be described below.

Figure 40:
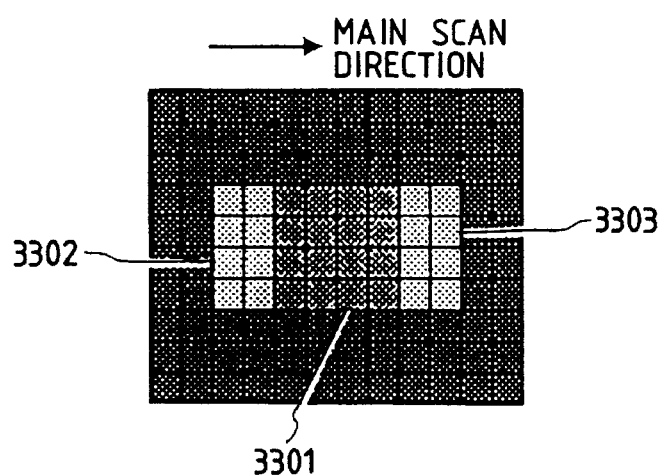
FIG. 40 is a view for explaining an additional pattern.

FIG. 40 is a view for explaining an additional pattern in this embodiment.

Referring to FIG. 40, the gradation level of 4×4 pixels contained in an area 3301 is modulated to +α. The gradation level of 2×4 pixels contained in each of areas 3302 and 3303 is modulated to −α. The pixels in an area except for the areas 3301 to 3303 are not modulated. 8×4 pixels contained in the areas 3301 to 3033 are defined as a unit dot for the additional pattern. The 8×4 pixels are defined as a unit of the additional pattern because the printer 2202 of this embodiment performs printing at 200 dpi (dots per inch), and the additional pattern is often difficult to read when the unit of the additional pattern is one pixel.

Figure 41:
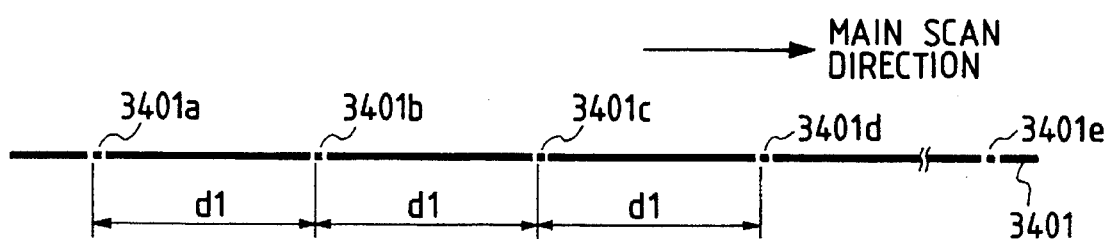
FIG. 41 is a view showing add-on lines.
Figure 42:
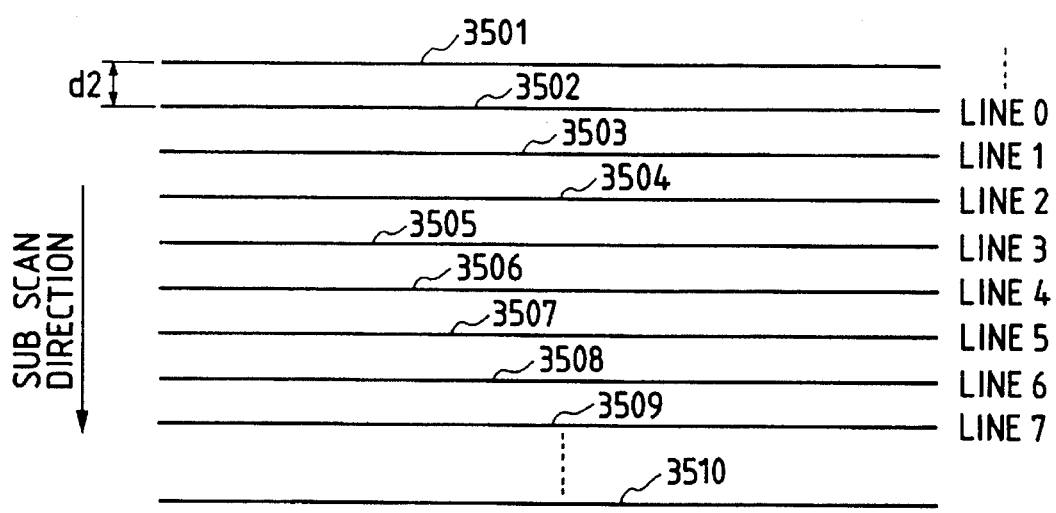
FIG. 42 is a view showing add-on lines.

FIGS. 41 and 42 are views showing add-on lines of this embodiment.

Referring to FIG. 41, an add-on line 3401 has, e.g., a 4-pixel width. Dots 3401a to 3401e are unit dots shown in FIG. 40. Each unit dot consists of, e.g., 8×4 pixels. The unit dots 3401a to 3401e are arranged in the main scan direction at an almost constant period d1 (e.g., 128 pixels).

Referring to FIG. 42, add-on lines 3501 to 3510 have, e.g., a 4-pixel width. The add-on lines are arranged in the sub scan direction at an almost constant period d2 (e.g., 16 pixels). For example, one add-on line represents 4-bit information, as will be described later in detail. The eight add-on lines 3502 to 3509 constitute a set which can represent 32-bit additional information. Note that the add-on lines are repeatedly formed in the sub scan direction. These add-on lines represent the same information as that of the add-on lines 3501 to 3509 shown in FIG. 42.

Figure 43:
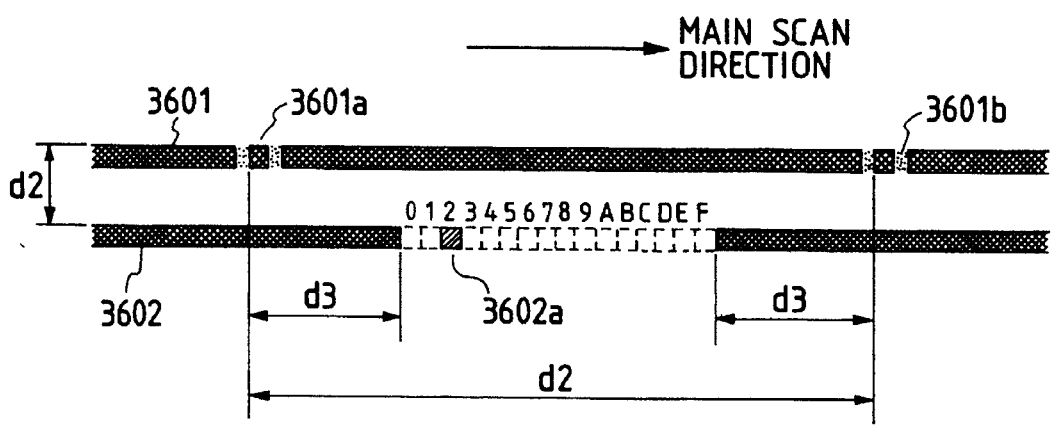
FIG. 43 is a view showing a method of expressing information using the add-on lines.
Figure 44A:
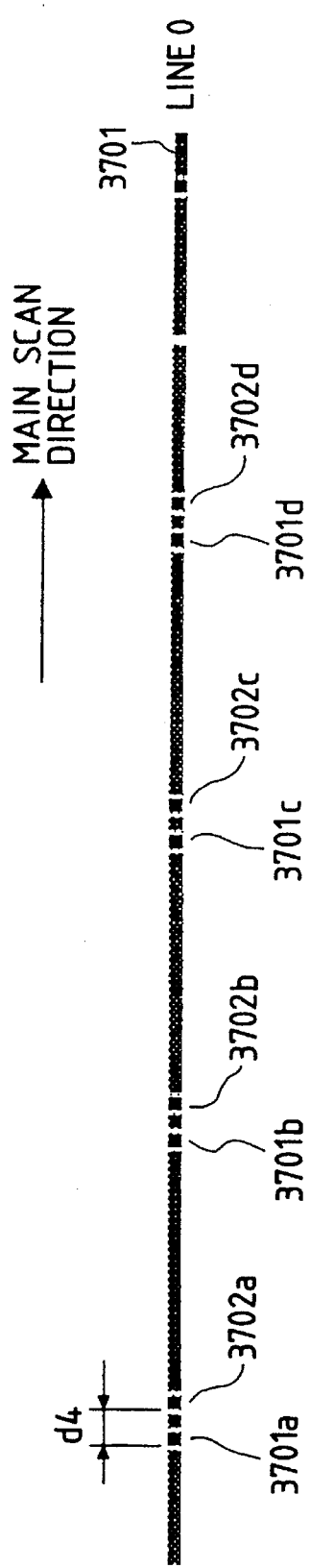
FIGS. 44A and 44B are views for explaining a method of expressing information using add-on lines.
Figure 44B:
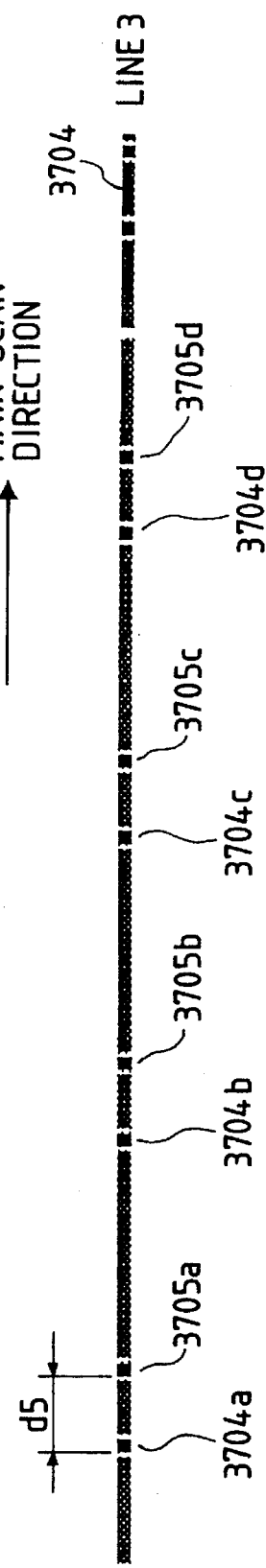

FIG. 43 and FIGS. 44A and 44B show a method of expressing information by add-on lines.

Referring to FIG. 43, add-on lines 3601 and 3602 are adjacent to each other in the sub scan direction. Dots 3601a, 3601b, and 3602a are unit dots. To prevent the unit dots of the add-on lines from being noticed with the human eye, the unit dots of the adjacent add-on lines are spaced apart from each other by an interval of at least d3 (e.g., 32 pixels) in the main scan direction.

Data represented by the unit dot is determined by a phase difference between the unit dot 3602a and the unit dot 3601a. FIG. 43 shows that the unit dot represents 4-bit information. The unit dot 3602a represents data "2". For example, when the unit dot 3602a is located at the left end, it represents data "0". When the unit dot 3602a is located at the right end, it represents data "F".

Of all the add-on lines constituting the set representing all additional information, FIG. 44A represents a first add-on line Line0, and FIG. 44B represents a fourth add-on line Line3.

As shown in FIGS. 44A and 44B, dots 3702a to 3702d are added all to the right of the original unit dots 3701a to 3701d on the first add-on line Line0 at an interval d4 (e.g., 16 pixels). Dots 3705a to 3705d are added all to the right of the original dots 3704a to 3704d on the fourth add-on line Line3 at an interval d5 (e.g., 32 pixels). These additional dots serve as a marker for specifying an add-on line number to which they are added. Note that the markers are added to the two add-on lines, respectively, because the top and bottom in the sub scan direction can be confirmed even from an output image.

In addition, for example, a pattern to be added is added with a Y (yellow) toner because the human eye has a low identification capability for a pattern drawn with the Y toner. This control is performed by the signal CNO shown in FIG. 16.

A dot interval in the main scan direction of an additional pattern and a repetition interval of all additional information in the sub scan direction must be determined such that all information can be properly added in a uniform area having a low density enough to properly identify the dots in a specific original as a target object. As a criterion for this, pitch information at ½ or less the width of the low-density, uniform area can be added to the specific original as the target object so as to properly identify the dots.

[Pattern Addition Circuit]

A pattern addition circuit according to this embodiment will be described below.

Figure 45:
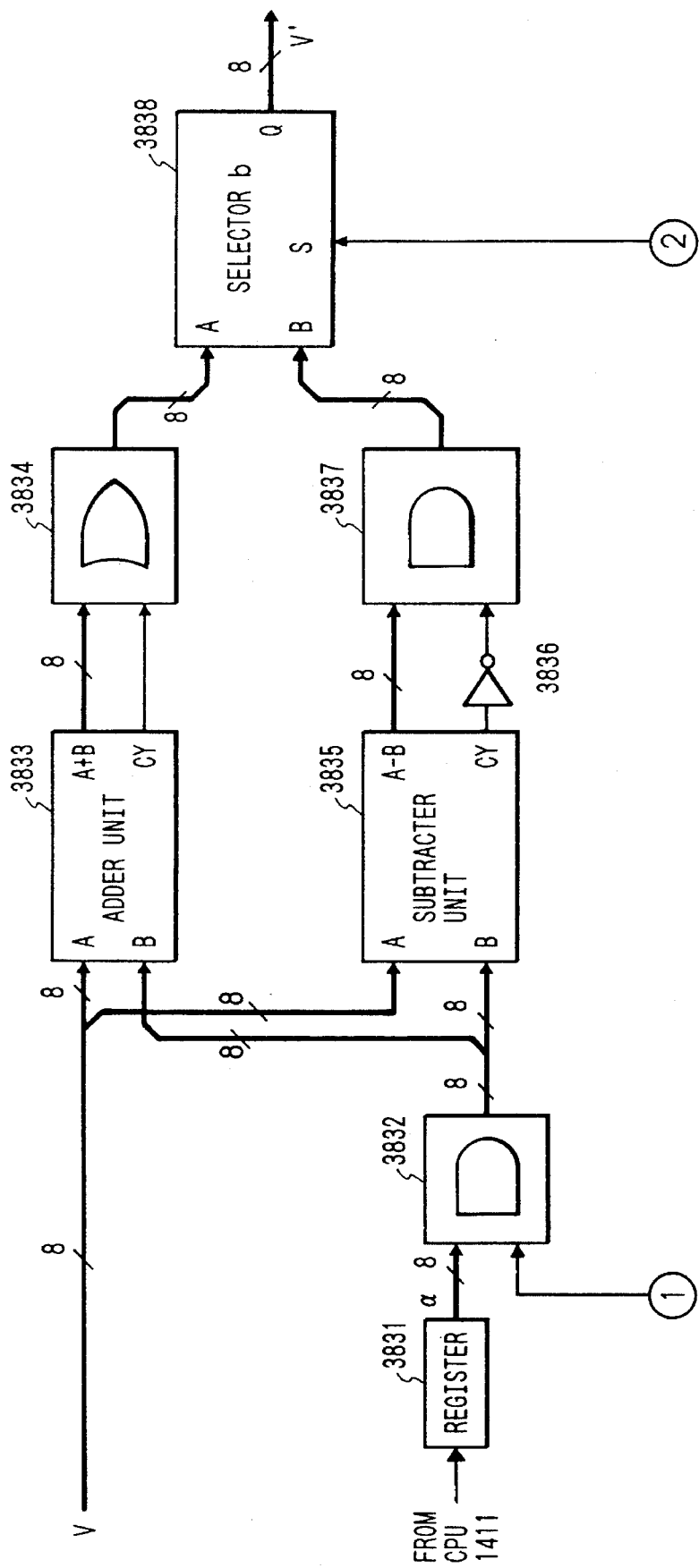
FIGS. 45, 46 and 47 are block diagrams showing the arrangement of a pattern addition circuit.
Figure 46:
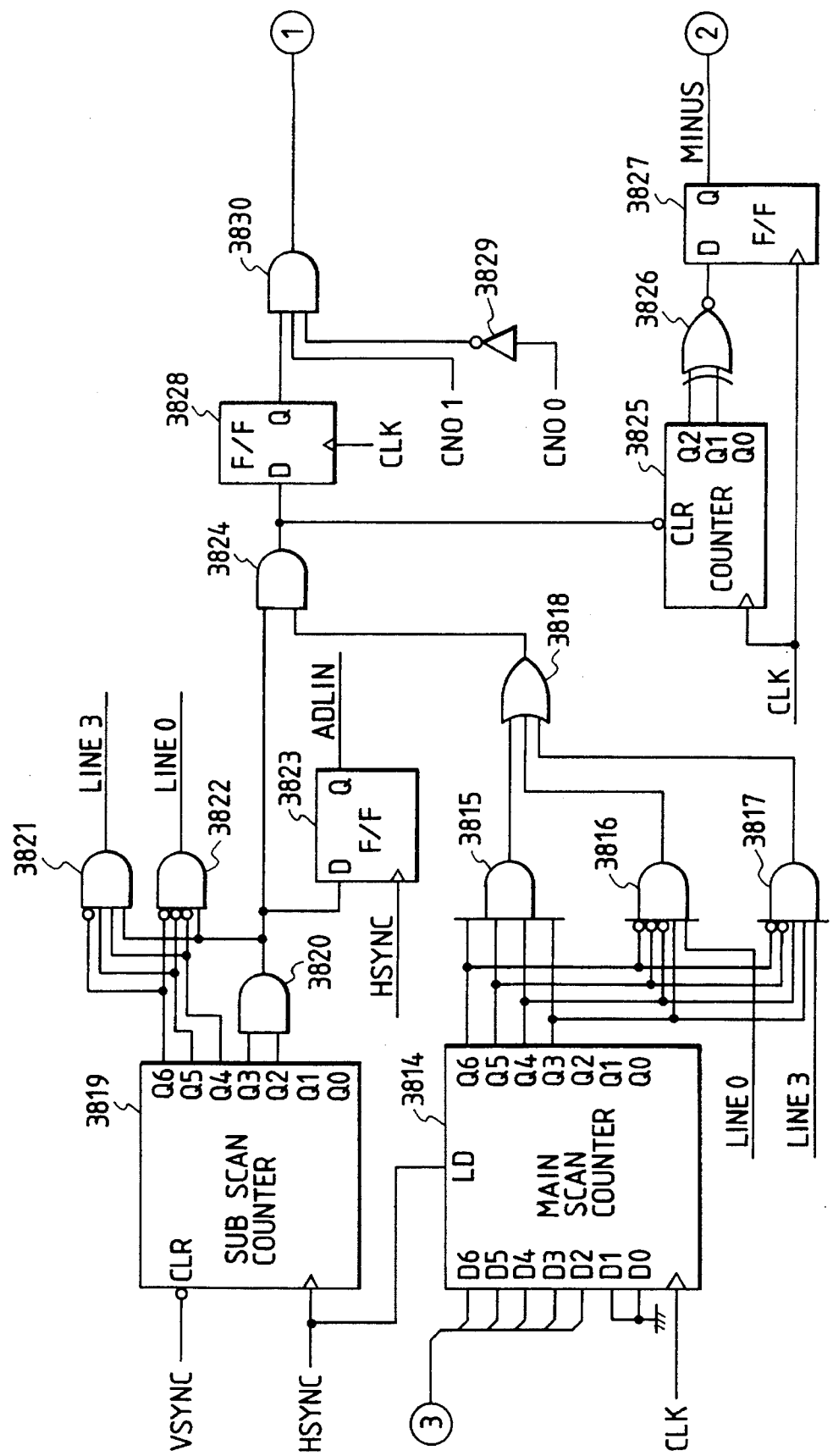
Figure 47:
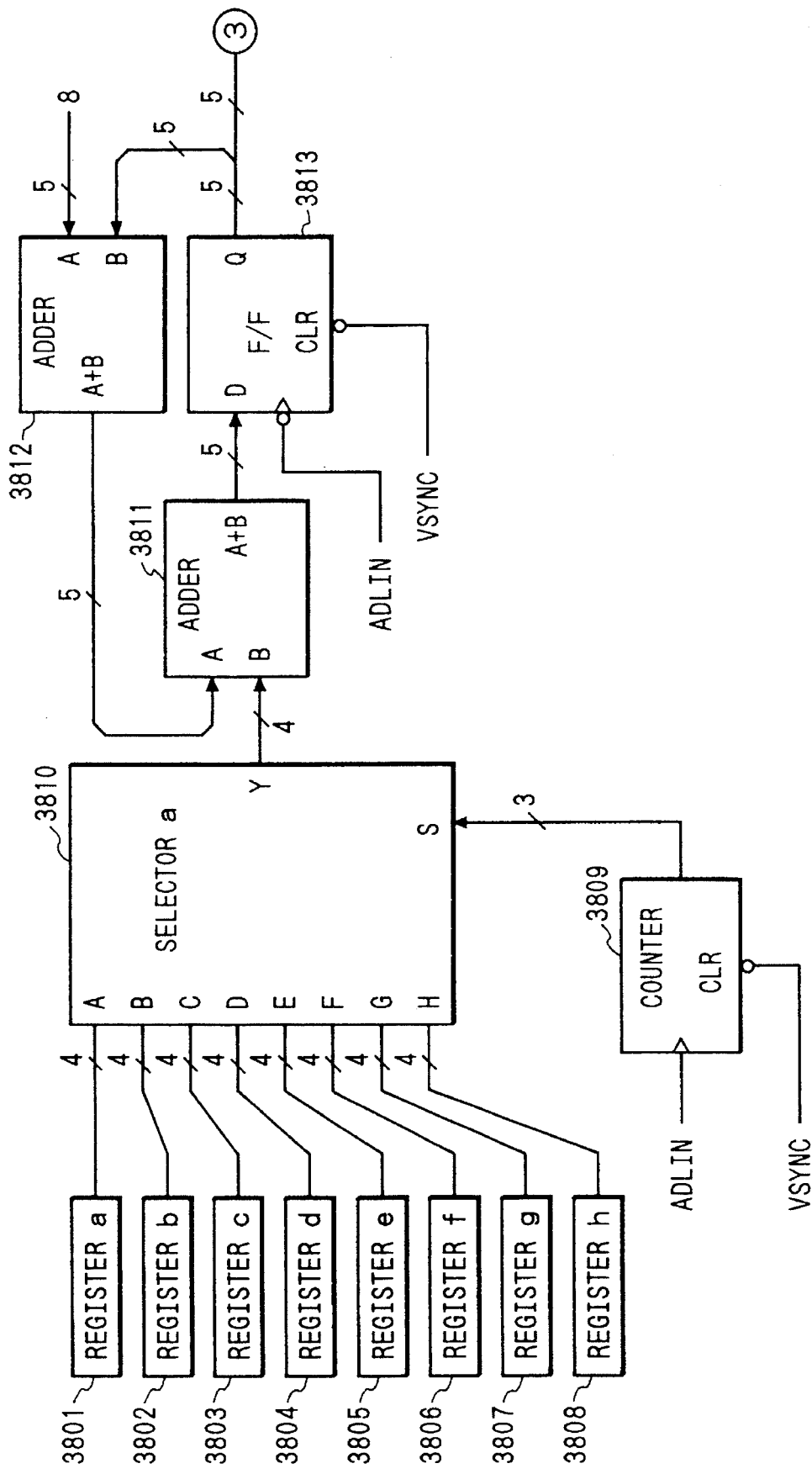

FIGS. 45, 46, and 47 are block diagrams showing the arrangement of the pattern addition circuit 1410.

Referring to FIG. 46, a sub scan counter 3819 and a main scan counter 3814 count a main scan sync signal HSYNC and a pixel sync signal CLK, respectively, at a 7-bit width, i.e., at a period of 128 lines or pixels. An AND gate 3820 connected to outputs Q2 and Q3 of the sub scan counter 3819 outputs a signal of logic "H" when both bits 2 and 3 of the sub scan counter 3819 are set at logic "H". That is, an output from the AND gate 3820 goes to "H" level for a 4-line period every 16 lines in the sub scan direction. This output signal serves as an add-on line enable signal.

The output from the AND gate 3820 and the upper three bits (Q4 to Q6) of the sub scan counter 3819 are added to gates 3822 and 3821, so that the gates 3822 and 3821 generate an enable signal LINE0 for add-on line 0 and an enable signal LINE3 for add-on line 3, respectively.

On the other hand, an initial value is loaded in the main scan counter 3814 by HSYNC, as will be described in detail later. Gates 3815 to 3817 receive upper four bits (Q3 to Q6) of the main scan counter 3814, respectively. An output from the AND gate 3815 goes to "H" for an 8-pixel interval every 128 pixels and serves as a dot enable signal. The gates 3816 and 3817 receive the signal LINE0 and LINE3 in addition to the upper four bits of the main scan counter 3814 to generate enable signals for the marks of lines 0 and 3. All these dot and mark enable signals are input to an OR gate 3818. An output from the OR gate 3818 and the output from the AND gate 3820 are logically ANDed by an AND gate 3824. As a result, dot and mark enable signals which go to "H" level on only add-on lines are generated.

An output from the AND gate 3824 is synchronized with the pixel sync signal CLK in an F/F 3828. An output from the F/F 3828 is logically ANDed with the 2-bit output color selection signal CNO by an AND gate 3830. Bit 0 of the output color selection signal CNO is inverted by an inverter 3829, and the inverted signal is input to the AND gate 3830. Bit 1 of the output color selection signal CNO is directly input to the AND gate 3830. Therefore, the signal CNO= "10" is obtained. That is, the dot and mark enable signals become valid only during printing of a Y color image.

The output from the AND gate 3824 is also connected to a clear terminal CLR of a counter 3825. When the output from the AND gate 3824 is set at "H" level, i.e., only when the add-on line dot is enabled, the counter 3825 counts the pixel sync signal CLK. Bits 1 and 2 of an output from the counter 3825 are input to an Ex-NOR gate 3826. An output from the Ex-NOR gate 3826 is set at "L" level for an intermediate 4-CLK period in an add-on line dot period (8 CLKs). An output from the Ex-NOR gate 3826 is synchronized with the pixel sync signal CLK by an F/F 3827 and output as a signal MINUS. When this signal MINUS goes to "L" level, the add-on line dot is modulated to +α.

Note that the F/F 3827 is arranged to remove a glitch contained in the signal MINUS and phase-lock this signal with the add-on line dot enable signal.

The signal MINUS is input to a selection terminal S of a selector 3838.

An AND circuit 3832 receives, e.g., an 8-bit modulation amount α from a register 3831 and the output from the AND gate 3830. Since the output from the AND gate 3830 goes to "H" level at the timing of an add-on line dot period, the AND circuit 3832 outputs the modulation amount α at the timing of the add-on line dot period. Therefore, pixels except for the add-on line dot are not modulated because the modulation amount represented by the output from the AND circuit 3832 is set at 0.

For example, an 8-bit image signal V is input to a terminal A of each of an adder unit 3833 and a subtracter unit 3835. The modulation amount α output from the AND circuit 3832 is input to a terminal B of each of the adder unit 3833 and the subtracter unit 835. An output from the adder unit 3833 is input to an OR gate 3834, and an output from the subtracter unit 3835 is input to an AND gate 3837.

When an addition result V+α from the adder unit 3833 overflows to output a carry signal CY, the OR gate 3834 forcibly sets the operation result to 255. When a subtraction result V −α from the subtracter unit 3835 underflows to output a carry signal CY, the AND gate 3837 forcibly sets the operation result to, e.g., 0 using a carry signal CY inverted by an inverter 3836.

The operation results V+α and V−α are input to the selector 3838 and are selectively output from the selector 3838 in response to the signal MINUS.

The above circuit arrangement performs dot modulation shown in FIG. 40.

The value loaded in the main scan counter 3814 is generated as follows.

An F/F 3813 and a counter 3809 are reset in response to the sub scan sync signal VSYNC, and 0 is set as the initial value of the main scan counter 3814 for the first add-on line.

A signal ADLIN input to the clock terminals of the counter 3809 and the F/F 3813 is obtained by causing an F/F 3823 to synchronize the output as an add-on line enable signal from the AND gate 3820 with the main scan sync signal HSYNC.

In response to, e.g., a 3-bit signal input to the select terminal S of a selector 3810, the selector 3810 selects one of registers 3801 to 3808 for storing, e.g., 4-bit values of eight add-on lines. The selector 3810 outputs the value set in the selected register.

A select signal input to the selector 3810 is generated by the counter 3809 for counting the signal ADLIN. At the timing of the first add-on line, the counter 3809 is cleared by the sub scan sync signal VSYNC, and the select signal is set at "0". In this case, the selector 3810 selects the register 3801. When the signal ADLIN rises, the count value of the counter 3809 is incremented by one, and the selector 3810 selects the register 3802. Subsequently, the selector 3810 repeatedly selects the register from the registers 3803 to 3808 in synchronism with the signal ADLIN.

An output from the selector 3810 is added to an output from an adder 3812 by an adder 3811. The sum from the adder 3811 is input to the F/F 3813. Input data is latched in the F/F 3813 at the trailing edge of the signal ADLIN and is input to the main scan counter 3814.

An output from the F/F 3813 is sent to the main scan counter 3814 and is also input to a terminal B of the adder 3812. The output from the F/F 3813 is added by the adder 3812 to a predetermined value, e.g., "8" input to a terminal A of the adder 3812. The sum from the adder 3812 is sent to the adder 3811. This represents an offset value for causing the add-on line dot position to be spaced apart from the dot position of the immediately preceding add-on line in the sub scan direction.

[Copying Result]

Figure 48:
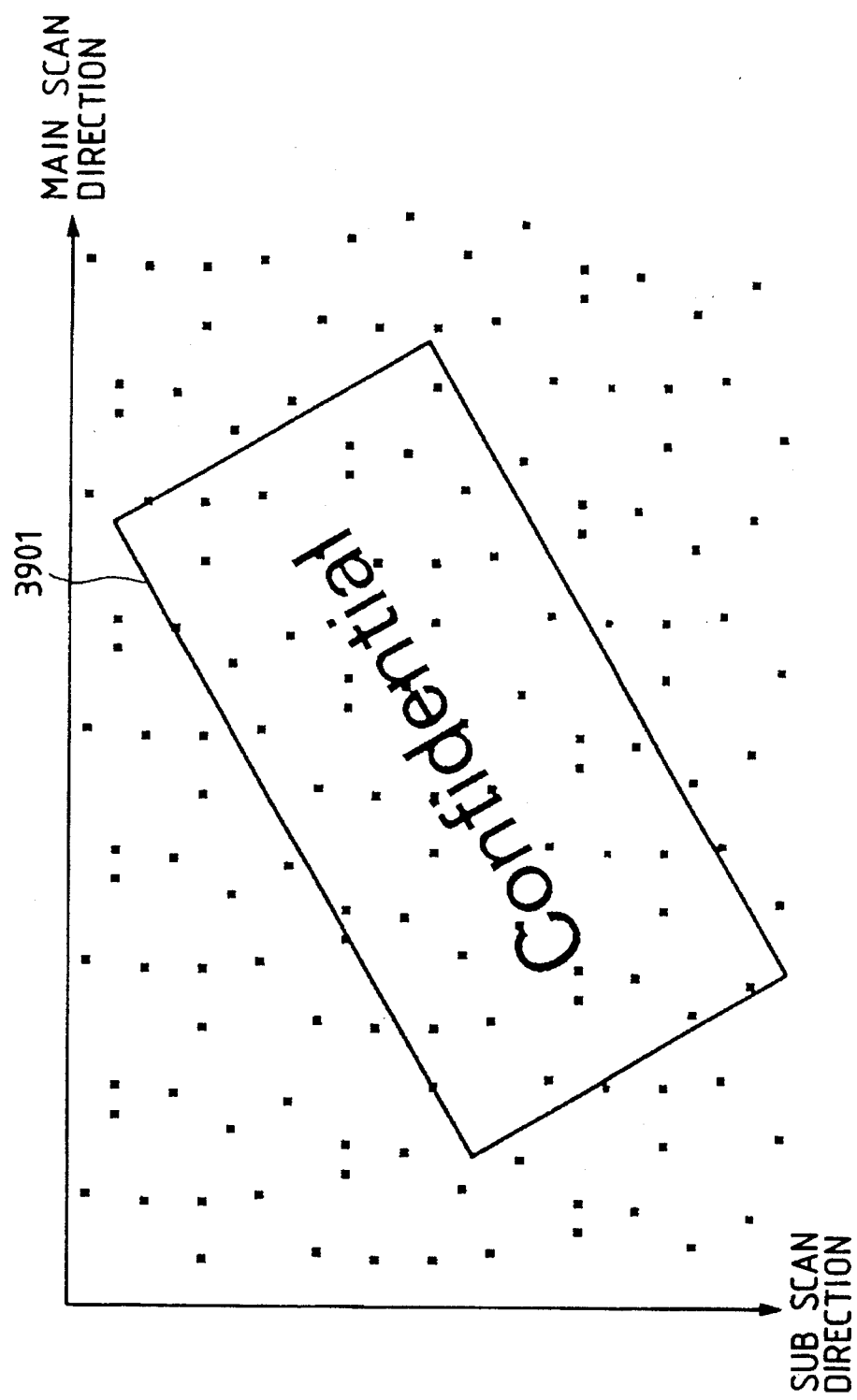
FIG. 48 is a view showing a copying result.

FIG. 48 is a view showing a copying result of this embodiment. Only the arrangement of unit dots of add-on lines is illustrated in this copying result.

Referring to FIG. 48, an image 3901 is, e.g., a specific original image. The unit dot of an add-on line is represented by a black square.

As described above, according to this embodiment, the manufacturing number unique to a copying machine or a code or symbol of the manufacturing number is represented by an additional pattern. When the apparatus of this embodiment is used in illegal copying, an illegal copy can be checked to specify the copying apparatus used in this illegal copying.

When a pattern is to be added to an output image, complementary image signal modulation operations are combined in small areas to preserve the overall density and prevent degradation of image quality without any change in color tone.

When complementary image signal modulation is performed to check additional pattern in a microscopic viewpoint, the additional pattern can be easily found, and reading of the additional information can be properly read.

<Ninth Embodiment>

Figure 49:
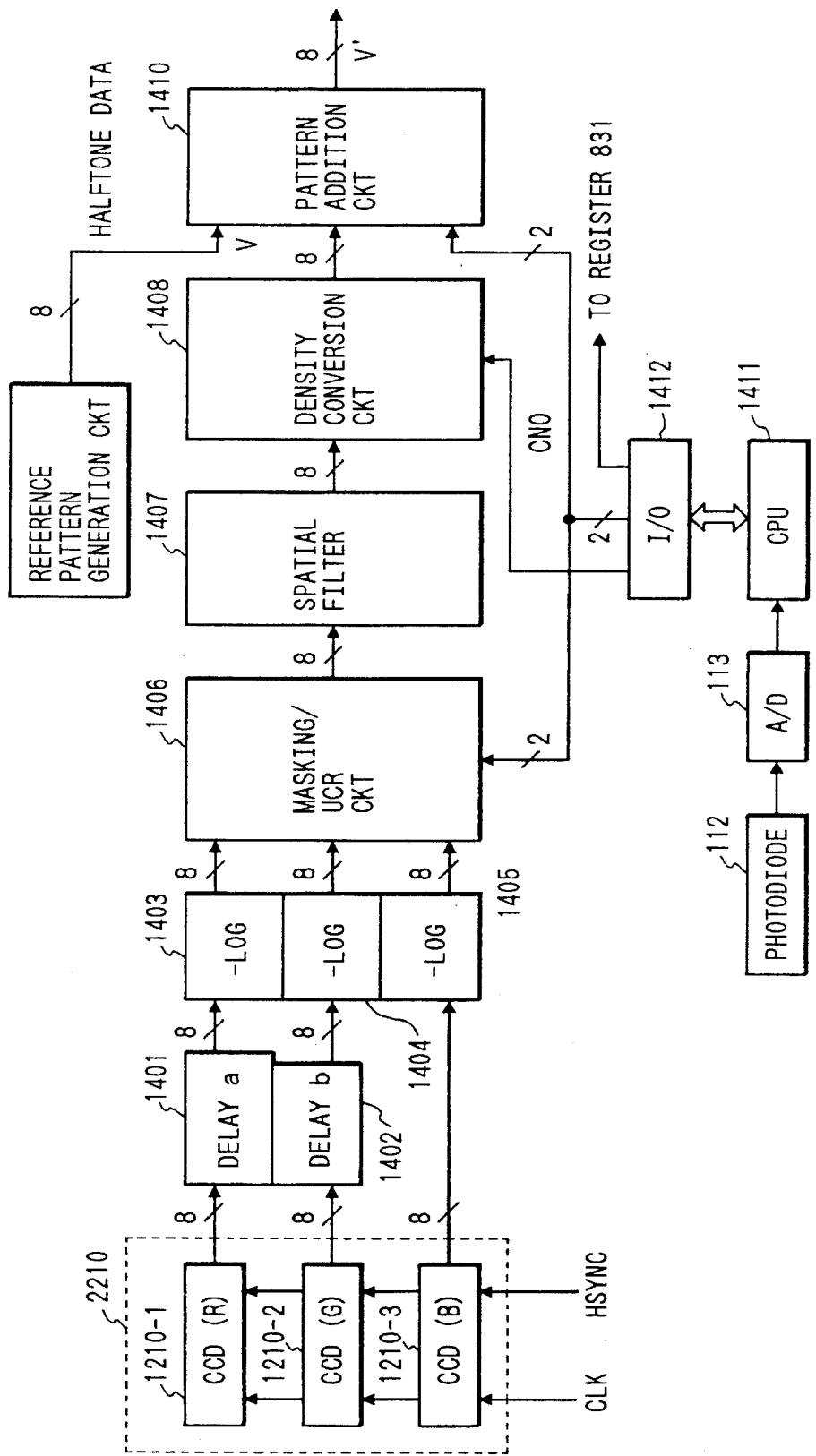
FIG. 49 is a block diagram showing the ninth embodiment of the present invention.

FIG. 49 is a view for explaining the ninth embodiment of the present invention.

This embodiment is a modification of the eighth embodiment. More specifically, in the ninth embodiment, halftone data generated by a reference pattern generation circuit 22 is pattern-modulated by a pattern addition circuit 1410, and a reference pattern is then formed on a photosensitive drum. The density of the reference image to be formed has been changed by pattern modulation. This pattern is read by a photodiode 112 to detect an image forming state of an image forming means and is used as data for judging density conversion characteristics of a density conversion circuit 1408. For example, the density conversion table is rewritten by this data.

According to this embodiment described above, the image forming means can be optimized in consideration of a change in density by the additional pattern.

According to the fifth to ninth embodiments of the present invention, image quality in superposition of information unique to an apparatus on image information can be improved.

<Tenth Embodiment>

Figure 55:
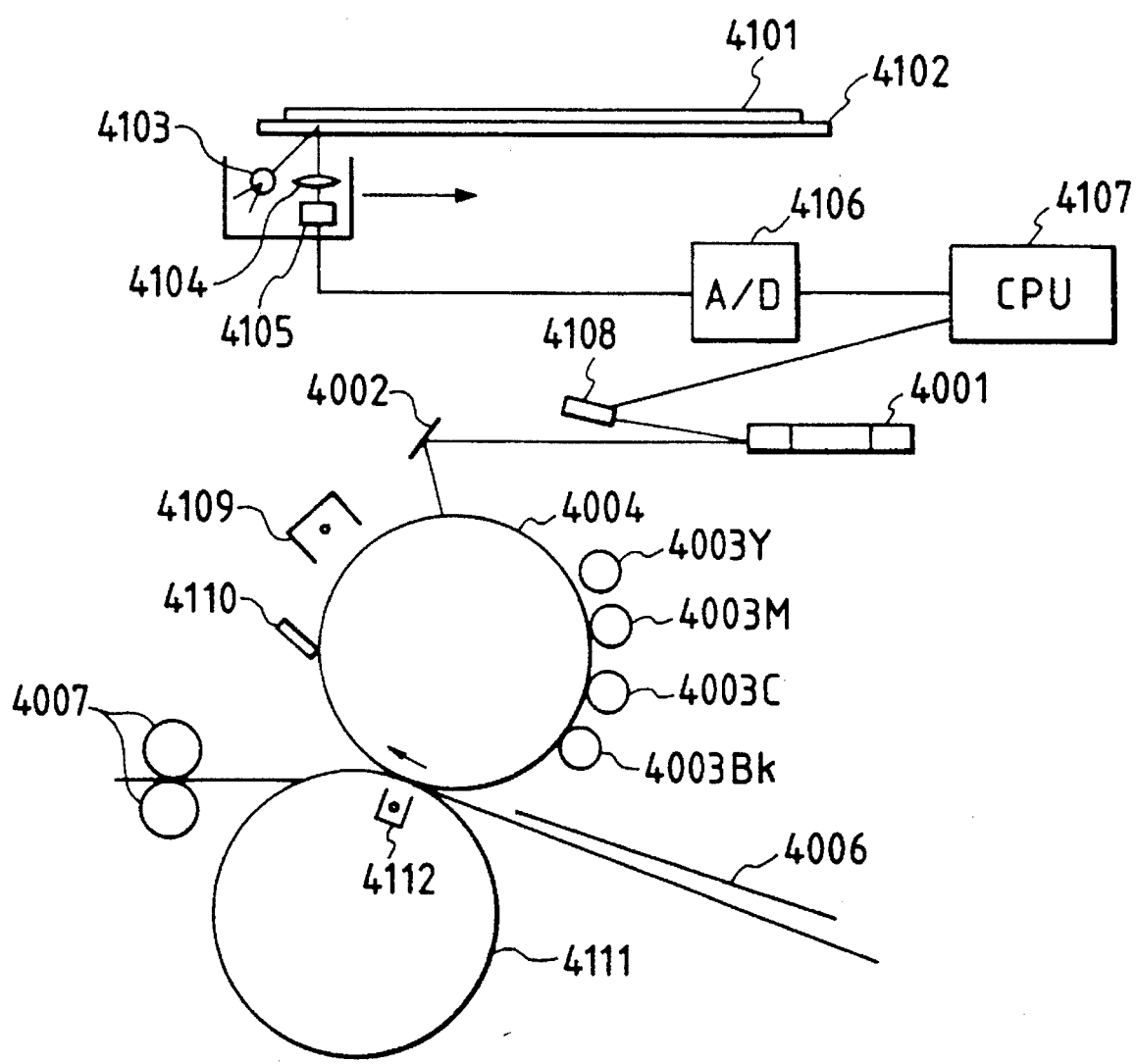
FIG. 55 is a view showing the arrangement of the image forming apparatus.

FIG. 55 is a view showing the arrangement of a color copying apparatus.

First of all, a method of forming a color image will be described below.

Referring to FIG. 55, an original 4101 placed on an original glass table 4102 is focused on a CCD 4105 by a light source 4103 and an optical lens 4104 and is converted into an image signal corresponding to an amount of light received by the CCD 4105.

An image signal is converted into a digital value by an A/D conversion circuit 4106 and is processed by a CPU 4107 to drive a laser source 4108.

An emitted laser beam is reflected by a polygon mirror 4001 and a mirror 4002 and is radiated on a photosensitive drum 4004.

The surface of the photosensitive drum 4004 is cleaned by a cleaning blade 4110 in advance so as not to leave residual toners on the surface of the photosensitive drum 4004. The surface of the photosensitive drum 4004 is then uniformly charged with a charger 4109.

The photosensitive drum 4004 on which a latent image is formed upon laser beam scan using a Y (yellow) image signal first is rotated in a direction indicated by an arrow in FIG. 55. The latent image is then developed with a developing unit 4003Y.

The photosensitive drum 4004 is further rotated to attract a recording medium 4006 to a transfer drum 4111, and a toner image formed on the photosensitive drum 4004 is transferred to the recording medium 4006 by a transfer charger 4112.

Latent image formation and development are performed in accordance with an M (magenta) image signal, and the M image is transferred on the Y image on the recording medium at the image registration position.

Similarly, C and Bk images are formed and transferred on the Y and M images. The recording medium is separated from the transfer drum 4111, and the images on the recording medium are fixed by a fixing roller pair 4007, thereby obtaining a color image print.

Figure 54:
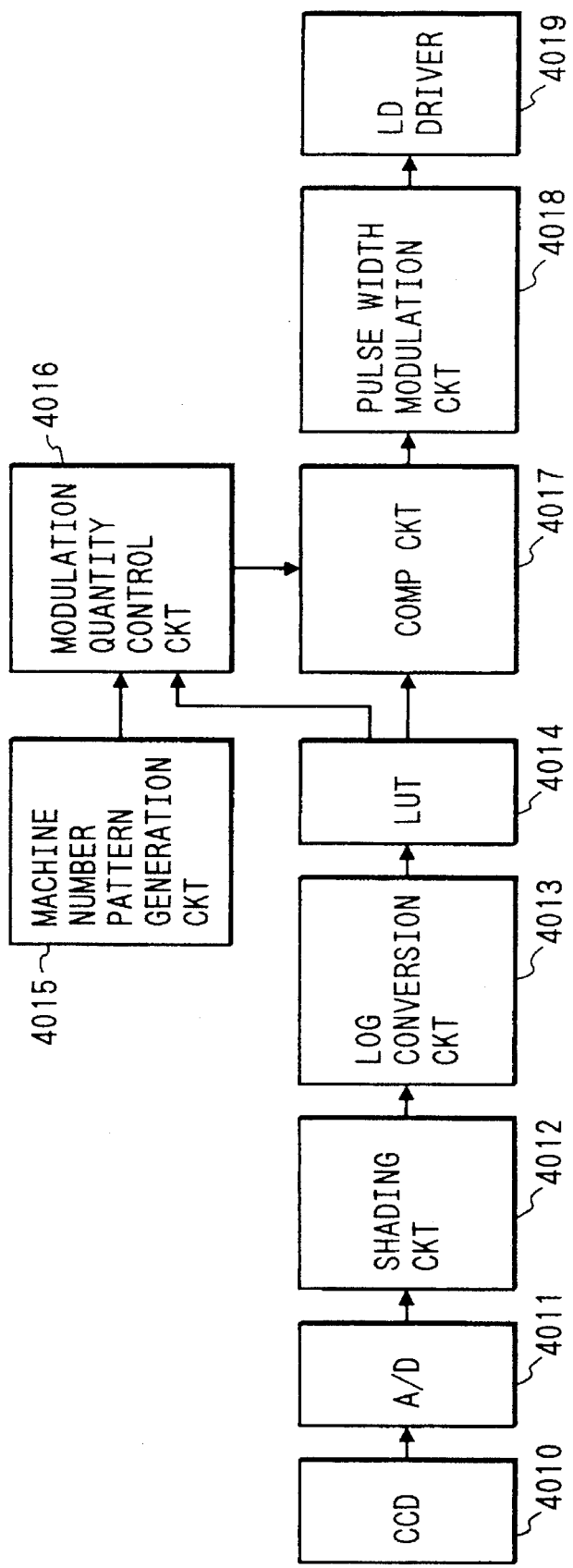
FIG. 54 is a block diagram for explaining the tenth embodiment of the present invention.

FIG. 54 is a block diagram showing an image signal processing unit for obtaining a gradation image.

An image luminance signal is obtained by the CCD line sensor 4010 and converted into a digital luminance signal by the A/D conversion circuit 4011.

The sensitivity variations of the CCD elements which are contained in the resultant luminance signal are corrected by a shading circuit 4012. The corrected luminance signal is converted into a density signal by a LOG conversion circuit 4013.

An LUT (look-up table) 4014 performs conversion such that the γ characteristics of the printer in initialization for the original image density coincide with those for the output image.

Figure 56:
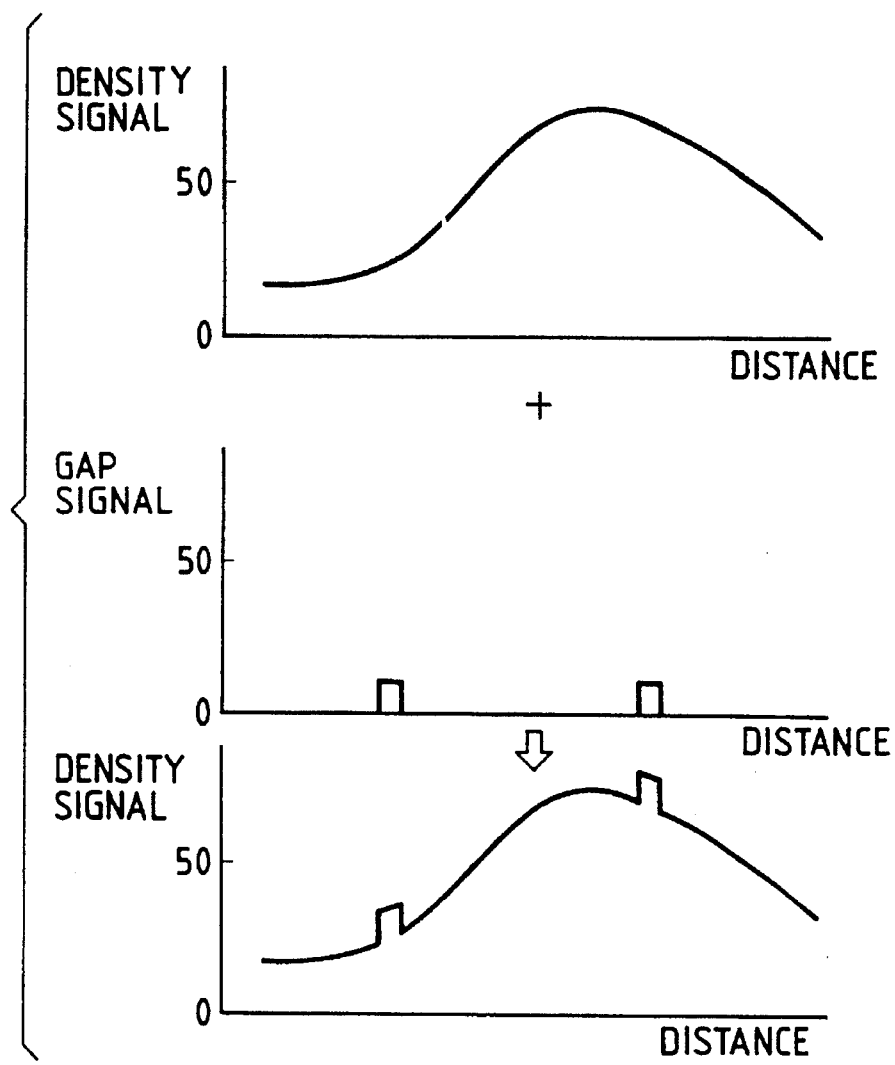
FIG. 56 shows graphs for superposing a signal unique to the image forming apparatus.

On the other hand, a machine number pattern generation circuit 4015 generates a pattern unique to the machine. The modulation quantity of only a Y (yellow) image signal having a lowest resolution to the human eye is changed in accordance with the magnitude of the density signal, as shown in FIG. 56. This control is performed by a modulation control circuit 4016 in FIG. 54.

The modulated machine number pattern is synthesized with the image signal by a comparator circuit 4017.

Figure 57:
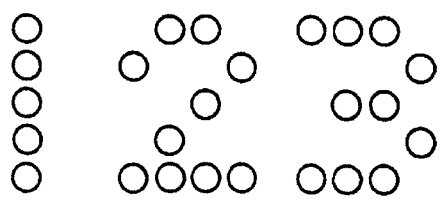
FIG. 57 is a pattern unique to the image forming apparatus.

The machine number pattern is caused to correspond to a numeric pattern, as shown in FIG. 57 in the above embodiment, but is preferably constituted by an encrypted shape pattern corresponding to the numbers and characters.

The image signal superposed with the machine number pattern is modulated by a pulse width modulation circuit 4018 to obtain a laser emission time proportional to the density signal. The signal from the pulse width modulation circuit 20 is sent to the laser driver 4019. The density gradation is expressed as area modulation, thereby forming a gradation image.

The machine number pattern is observed through a 350-nm sharp band filter after a full color image is formed. In this case, the machine number pattern can be identified by separating only a yellow signal. Even if a copy is a counterfeit, a copying machine used to obtain this copy can be specified.

Figure 58:
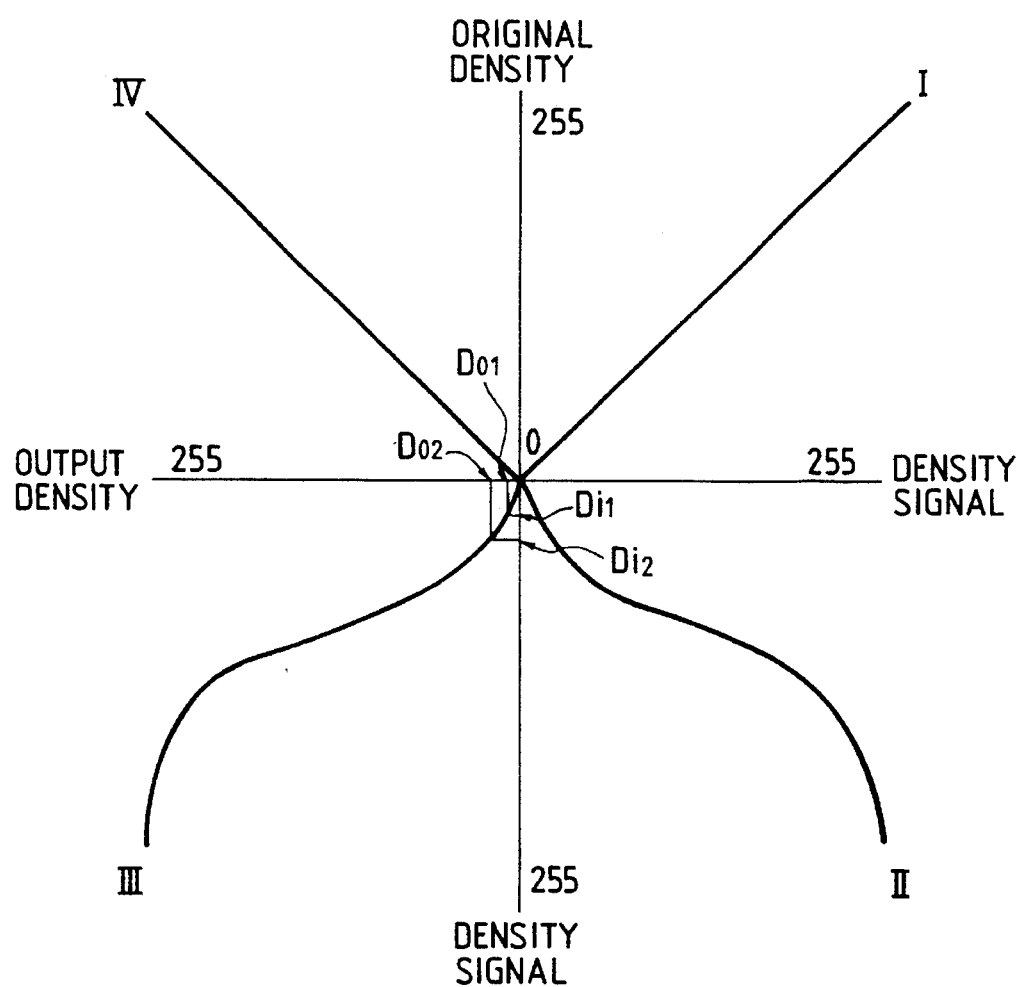
FIG. 58 is a four-quadrant chart showing gradation characteristic conversion.
Figure 59:
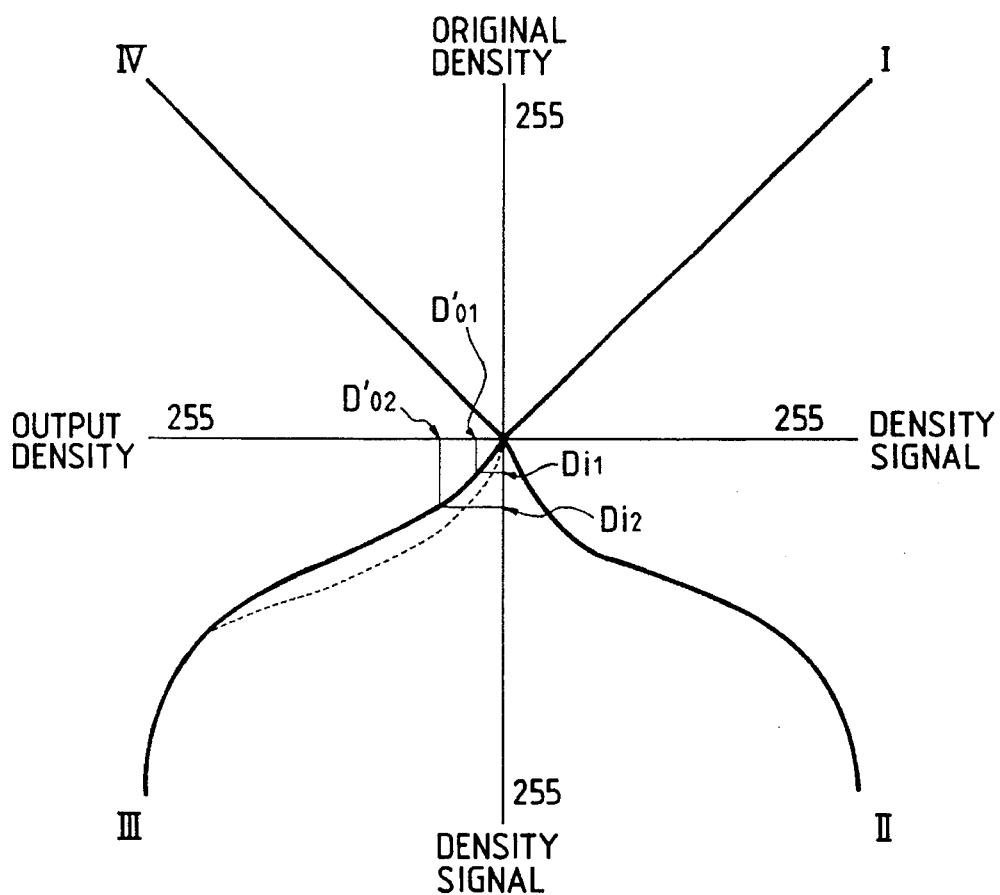
FIG. 59 is a four-quadrant chart showing gradation characteristic conversion after use for a long period of time.

FIG. 58 is a four-quadrant chart showing gradation reproduction.

A quadrant I represents the reader characteristics for converting the original density into the density signal, a quadrant II represents the characteristics of the LUT for converting the density image into the laser output signal, a quadrant III represents printer characteristics for converting the laser output signal into the output density, and a quadrant IV represents total gradation characteristics of the image forming apparatus which represent the relationship between the original density and the output density.

The number of gradation levels is 256 because input data is processed using an 8-bit digital signal.

The printer characteristics of the quadrant III are known to have various shapes depending on the characteristics of the photosensitive body, the laser spot diameter, and the developing characteristics.

An S-shaped characteristic curve is exemplified here.

It is important to faithfully reproduce a full color image such that the total gradation characteristics representing the relationship between the original density and the output density in the quadrant IV become linear. For this purpose, the LUT characteristic curve in the quadrant III must be an S-shaped curve, as shown in FIG. 54.

The modulated signal of the machine number pattern is set (i.e., $Di_2$) by adding $\Delta D1$ to the image signal from $Di_1$ upon LUT operation in the quadrant III.

However, since the symbol ΔDi unique to the image forming apparatus is set to be unnoticeable in accordance with the initial printer characteristics in FIG. 54. When the image forming apparatus is used for a long period of time, the photosensitive drum 4004 is worn by the cleaning blade 4110 to cause a change in printer characteristics, as indicated in the quadrant III. Therefore, patterns are gradually noticeable in a highlighted portion.

In an image forming apparatus in which images formed by a plurality of color agents are stacked on each other and information unique to the image forming apparatus is superposed on an image of a specific color, the use state of the image forming apparatus is detected to variably set a superposition pattern.

This will be described in detail below.

Figure 50:
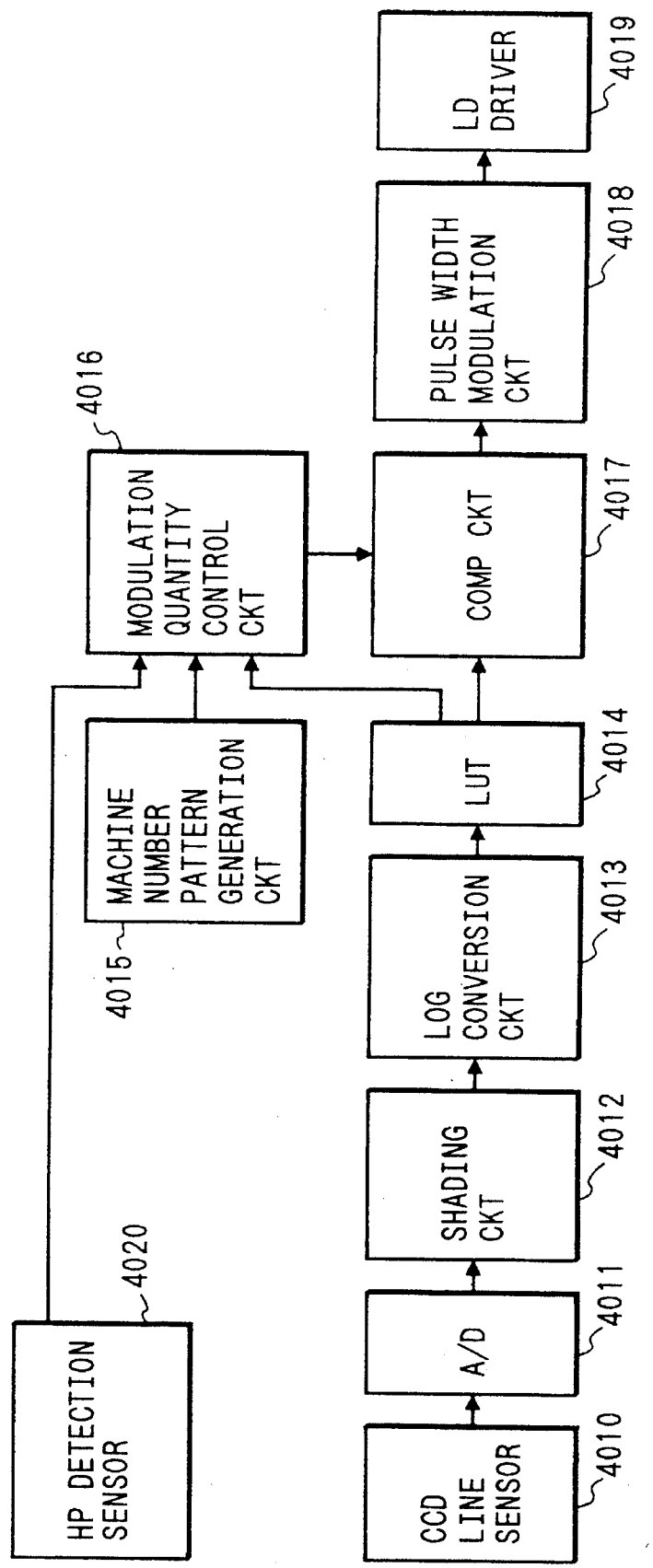
FIG. 50 is a block diagram showing the tenth embodiment of the present invention.
Figure 51:
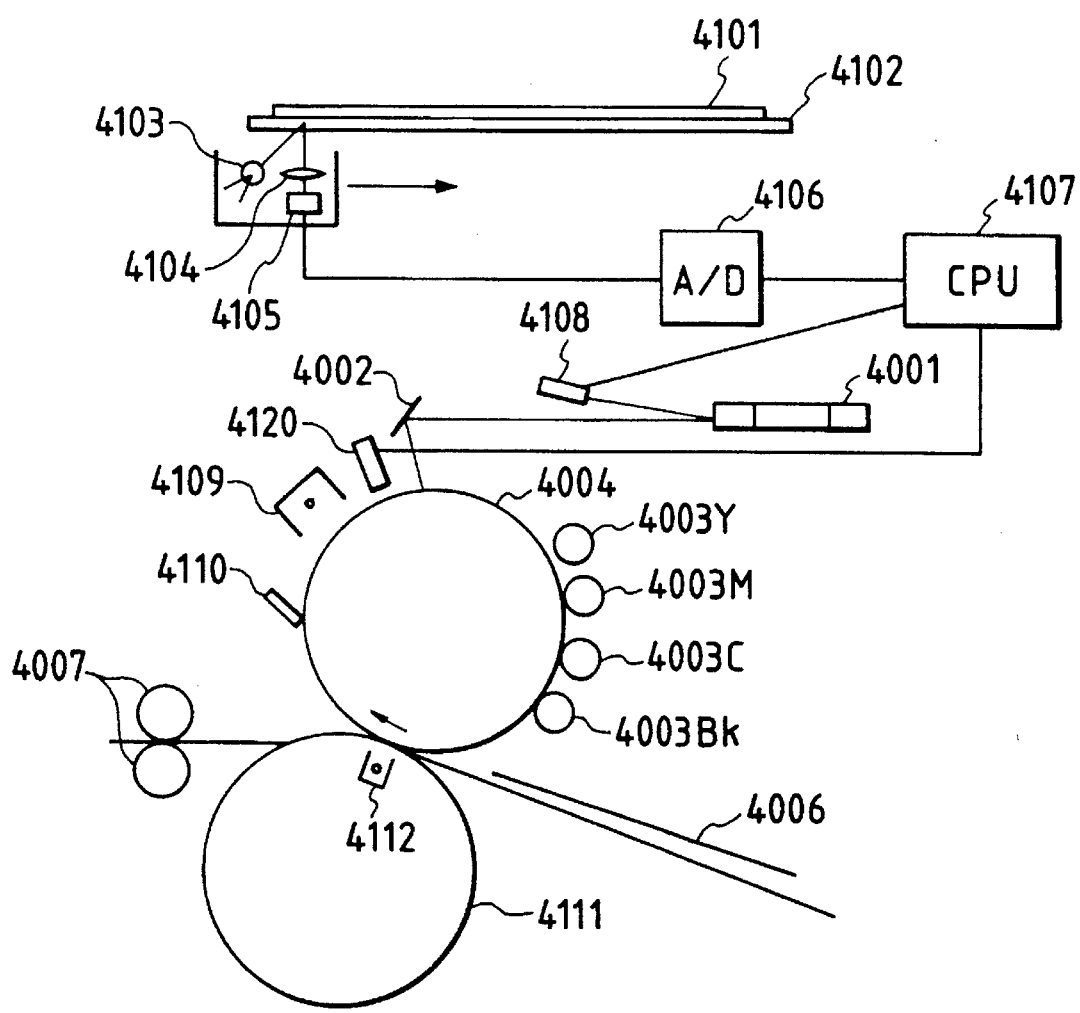
FIG. 51 is a view showing the arrangement of an image forming apparatus according to the tenth embodiment of the present invention.

FIG. 51 is a view showing the arrangement of the full color image forming apparatus of an electrophotographic scheme, and FIG. 50 is a block diagram showing an image processing unit thereof.

Referring to FIG. 51, an HP (home position) sensor 4120 counts the rotation amount of the photosensitive drum. A method of forming a color image is performed in the same manner as in the conventional technique.

Referring to FIG. 50, an original image luminance signal is obtained by the line sensor CCD 4010, and sensitivity variations of the CCD elements are corrected by the shading circuit 4012. The corrected luminance signal is converted into a density signal by the LOG conversion circuit 4013.

The LUT (look-up table) 4014 performs conversion such that the γ characteristics of the printer in initialization for the original image density coincide with those for the output image.

On the other hand, the machine number pattern generation circuit 4015 generates a pattern unique to the apparatus. The density signal is modulated by a modulation quantity control circuit 4016 in accordance with the modulation quantity corresponding to the rotation amount (cumulative rotation amount) of the photosensitive drum which is detected by the HP detection sensor 4020.

The modulated machine number pattern is synthesized with the image signal by the comparator circuit 4017 for superposing the pattern on the image signal.

The image signal superposed with the machine number pattern is modulated by the pulse width modulation circuit 4018 to have a laser emission time proportional to the density signal. The modulated signal is sent to the laser driver 4019 to express the density gradation into area gradation, thereby forming a gradation image.

The machine number pattern is observed through a 350-nm sharp band filter after a full color image is formed. In this case, the machine number pattern can be identified by separating only a yellow signal. Even if a copy is a counterfeit, a copying machine used to obtain this copy can be specified.

Figure 52:
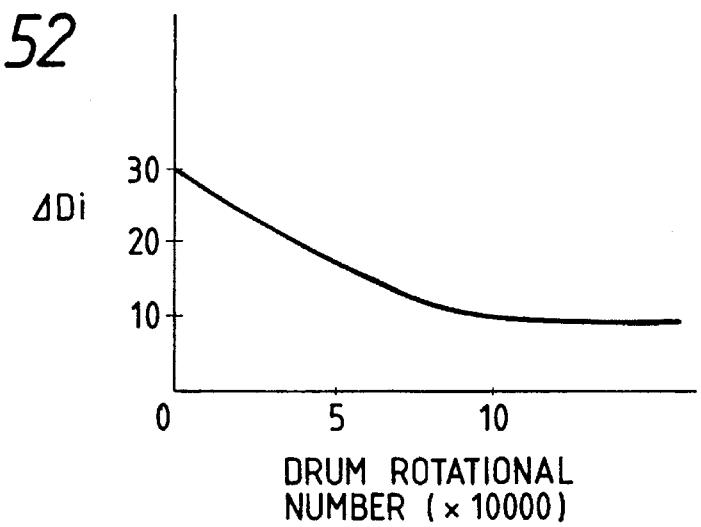
FIG. 52 is a graph showing gradation characteristics changed with durability variations according to the tenth embodiment.

FIG. 52 shows the modulation quantity corresponding to the rotation amount of the photosensitive drum for $Di_t$ in FIG. 58.

Figure 53:
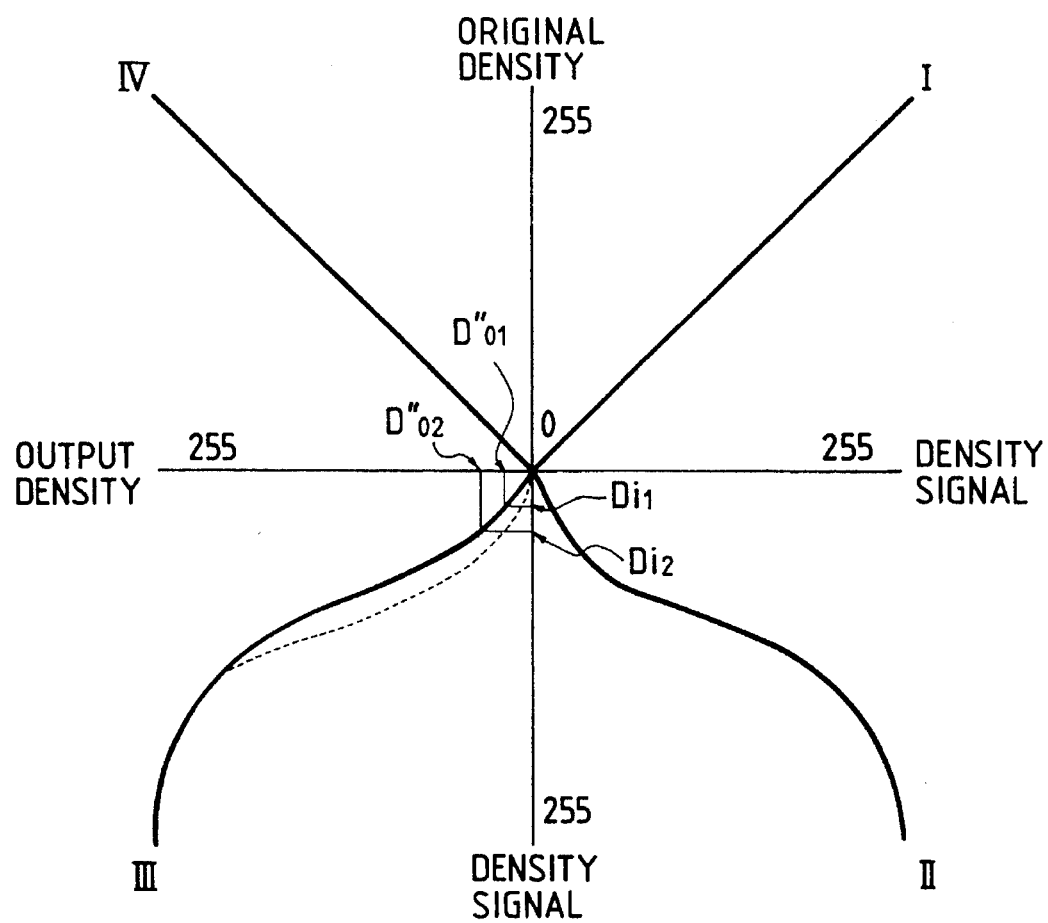
FIG. 53 is a four-quadrant chart showing gradation characteristic conversion according to the tenth embodiment of the present invention.

Even if the image forming apparatus is degraded, the density step $\Delta D_0$ of the output is kept constant, as shown in FIG. 53. Therefore, the patterns can be kept unnoticeable in a highlighted portion.

When the photosensitive drum is replaced with a new one, the rotation amount of the photosensitive drum is set to zero.

<Eleventh Embodiment>

Figure 60:
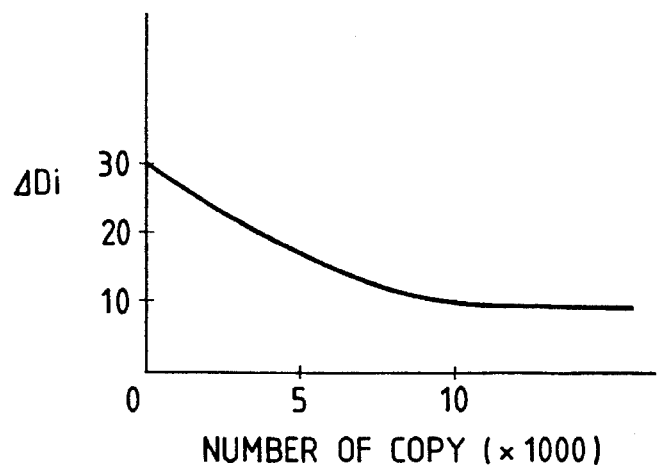
FIG. 60 is a graph for explaining the eleventh embodiment according to the present invention.

In full-color image formation, the photosensitive drum is rotated by eight revolutions/copy. The same effect as in the tenth embodiment can be obtained even if a modulation quantity (FIG. 60) is used in correspondence with a cumulative copy count.

A cumulative copy counter is arranged in place of the HP detection sensor 4020.

Full color copying is performed in this embodiment, but the present invention is equally applicable to a monochrome copying machine.

<Twelfth Embodiment>

Figure 61:
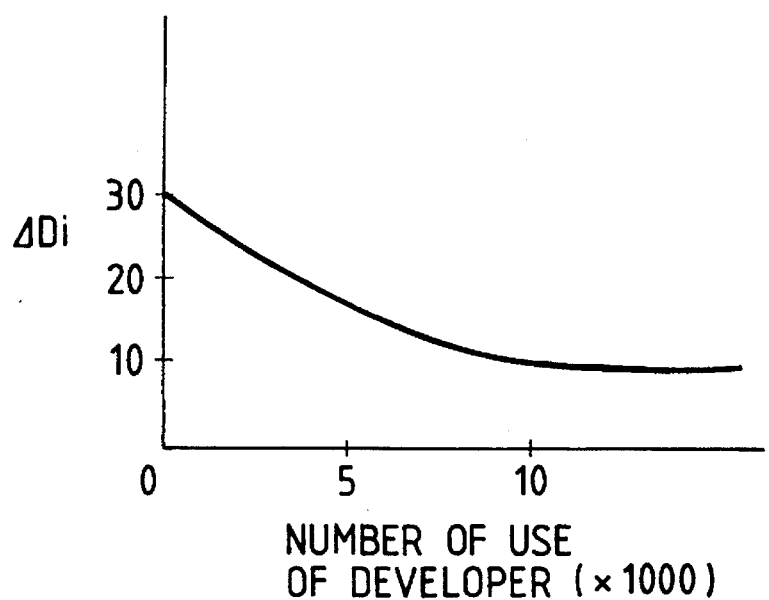
FIG. 61 is a graph for explaining the twelfth embodiment of the present invention.

A modulation quantity may be controlled in accordance with a rotation amount of a developing unit in place of the rotation amount of the photosensitive drum (FIG. 61).

<Thirteenth Embodiment>

The present invention is also applicable to a cumulative time in which a power switch is kept on. A full color copying machine is normally kept operated all day long, and an average copy count per month is about 2,000. Therefore, the rotation amount of the photosensitive drum can be roughly known.

Figure 62:
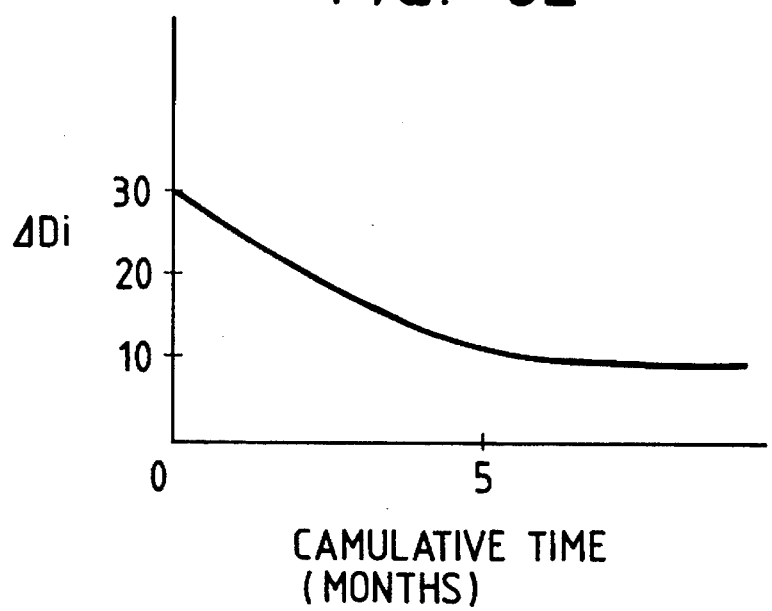
FIG. 62 is a graph for explaining the thirteenth embodiment of the present invention.

A timer for counting a cumulative power-ON time may be arranged in place of the HP detection sensor 4020 to control the modulation quantity (FIG. 62) in accordance with the count value of this timer.

The present invention is applicable when a parameter representing the state of the photosensitive drum is calculated.

A superposition pattern may be changed in accordance with another image forming means such as a charger or a developing unit in place of the photosensitive drum.

In an image forming apparatus in which images formed by a plurality of color agents are stacked on each other and information unique to the image forming apparatus is superposed on an image of a specific color, the use state of the image forming apparatus is detected to variably set a superposition pattern, thereby making the superposed symbol unique to the image forming apparatus unnoticeable regardless of the state of the apparatus.

As described above, according to the tenth to thirteenth embodiments of the present invention, image quality can be improved in superposition of the information unique to the apparatus on the image information.

<Fourteenth Embodiment>

The fourteenth embodiment is an improvement of the first embodiment shown in FIGS. 1 to 16.

First of all, a method of forming a color image will be described.

Figure 64:
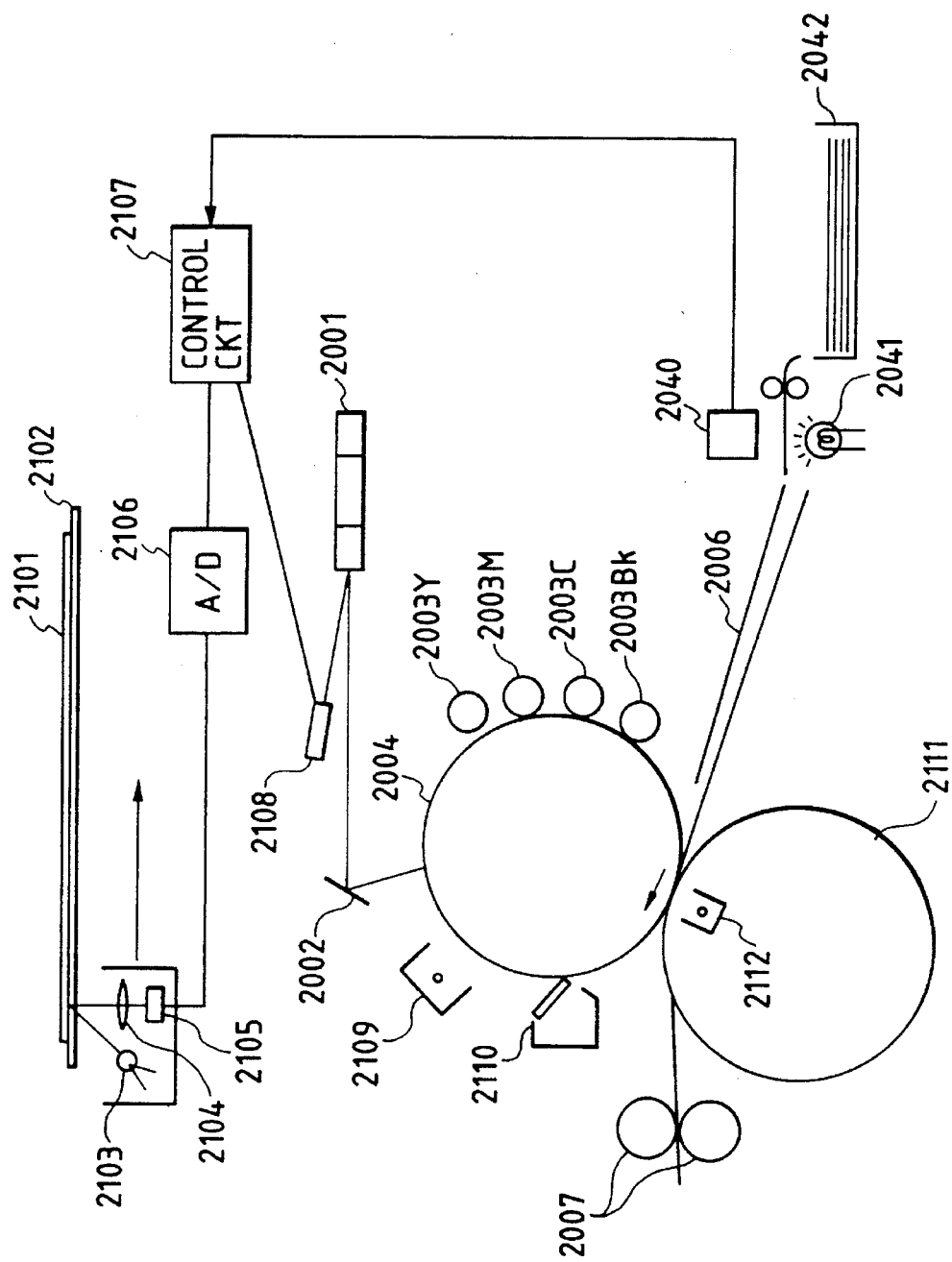
FIG. 64 is a side sectional view showing the arrangement of the main part of the color copying machine according to the fourteenth embodiment of the present invention.

FIG. 64 is a side sectional view showing the arrangement of the main part of a color copying machine according to the second embodiment of the present invention.

Referring to FIG. 64, an original 2101 placed on an original glass table 2102 is focused on a CCD line sensor 2105 by a light source 2103 and an optical lens 2104 and is converted into an image signal corresponding to an amount of received light.

The image signal is converted into a digital value by an image signal A/D conversion circuit 2106 and is image-processed by a control circuit 2107. The processed image is used to drive a laser light source 2108. An emitted laser beam is reflected by a polygon mirror 2001 and a mirror 2002, and the reflected light beam is radiated on a photosensitive drum 2004.

The surface of the photosensitive drum 2004 is cleaned by a cleaning blade 2110 to be free from residual toners. The surface of the photosensitive drum 2004 is uniformly charged with a charger 2109.

First, the photosensitive drum 2004 formed with a latent image upon laser beam scan using a Y (yellow) image signal is rotated in a direction indicated by an arrow in FIG. 64. The latent image is then developed by a developing unit 2003Y.

The photosensitive drum 2004 is further rotated to cause a recording medium 2006 to attract to a transfer drum 2004. At the same time, a toner image formed on the photosensitive drum 2004 is transferred to the recording medium by a transfer charger 2112.

Latent image formation and development using an M (magenta) image signal are performed. At the registered position of the image, the magenta image is superposed on the Y image on the recording medium.

Similarly, C and Bk images are formed and are transferred on the preceding color images. The recording medium is then separated from the transfer drum 2111 and is fixed by a fixing roller pair 2007, thereby obtaining a color image print.

In this embodiment, a lamp 2041 and a record sheet detection sensor 2040 are arranged near a cassette 2042 which stores record sheets. Operations of these elements will be described laster.

An image process for obtaining a gradation image according to this embodiment will be described below.

Figure 63:
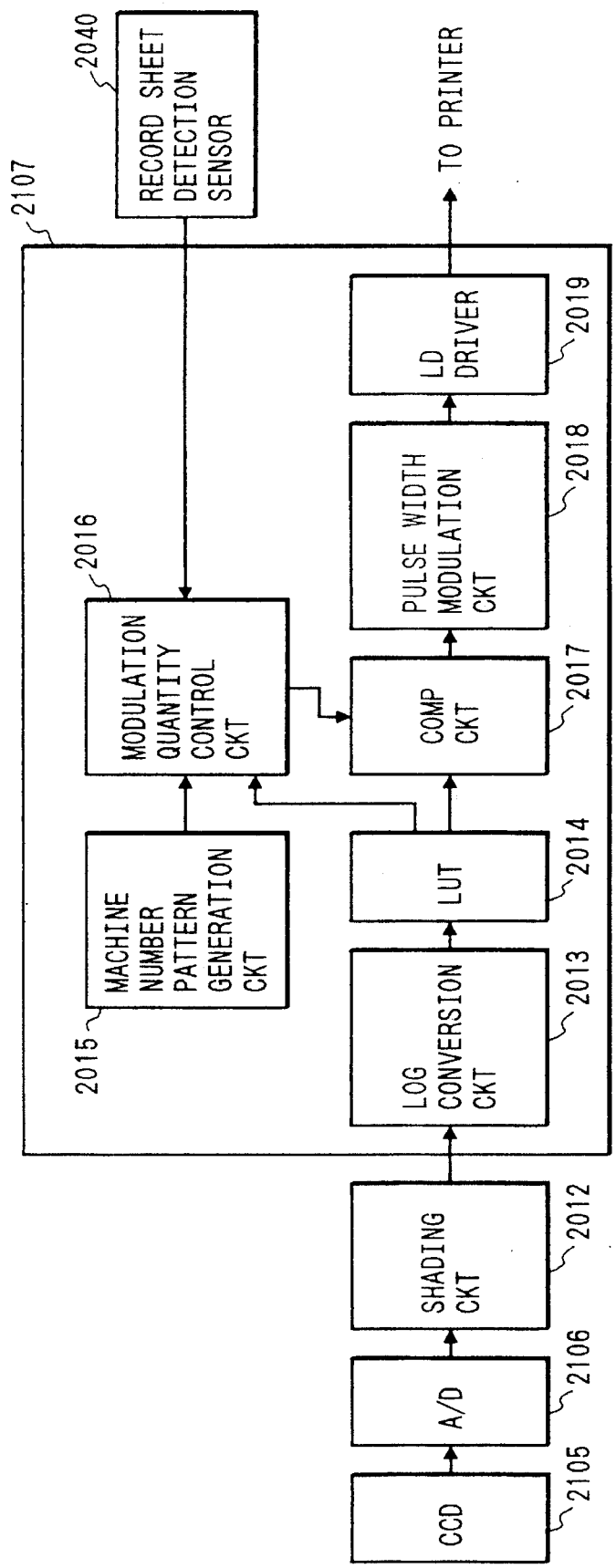
FIG. 63 is a block diagram showing the schematic circuit arrangement of a color copying machine according to the fourteenth embodiment.

FIG. 63 is a block diagram showing the schematic circuit arrangement of the color copying machine according to the second embodiment. A shading circuit 2012 corrects shading of the digital signal from the A/D conversion circuit 2106. The control circuit 2107 comprises a LOG conversion circuit 2013, an LUT (look-up table) 2014, a machine number pattern generation circuit 2015, a modulation quantity control circuit 2016, a comparator circuit 2017, a pulse width modulation circuit 2018, and an LD driver 2019.

The operation of the above arrangement will be described below.

Figure 66:
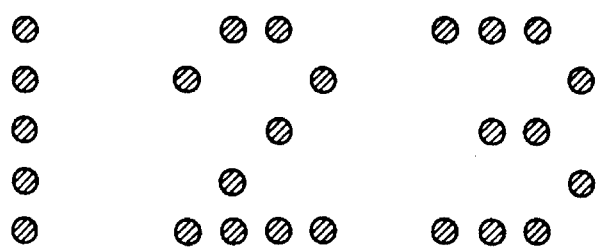
FIG. 66 is a view showing a machine pattern according to the fourteenth embodiment.

FIG. 66 is a view showing a machine number pattern according to the fourteenth embodiment.

An image luminance signal is obtained by the CCD line sensor 2105 and is then converted into a digital luminance signal by the A/D conversion circuit 2106. The sensitivity variations of the respective CCD elements of the resultant luminance signal are corrected by the shading circuit 2012. The corrected luminance signal is converted into a density signal by the LOG conversion circuit 2013.

The LUT 2014 performs conversion such that the γ characteristics of the printer in initialization for the original image density coincide with those for the output image.

On the other hand, the machine number pattern generation circuit 2015 generates a machine number pattern. In this case, an image signal consisting of only Y (yellow) having the lowest resolution with respect to a human eye is generated, and its modulation quantity is changed on the basis of a signal from the record sheet detection sensor 2040. This control is performed by the modulation quantity control circuit 2016 shown in FIG. 63. The modulated machine number pattern is synthesized by a comparator circuit 2017 for superposing the pattern on the image signal.

The machine number pattern is caused to correspond to a numeric pattern, as shown in FIG. 66 in the above embodiment, but is preferably constituted by an unnoticeable pattern corresponding to the numbers and characters.

The image signal superposed with the machine number pattern is modulated by the pulse width modulation circuit 2018 to have a laser emission time proportional to the density signal. The modulated signal is sent to the laser driver 2019 to express the density gradation into area gradation, thereby forming a gradation image.

The machine number pattern is observed through a 350-nm sharp band filter after a full color image is formed. In this case, the machine number pattern can be identified by separating only a yellow signal. Even if a copy is a counterfeit, a copying machine used to obtain this copy can be specified.

A method of detecting a material will be described below.

Figure 65:
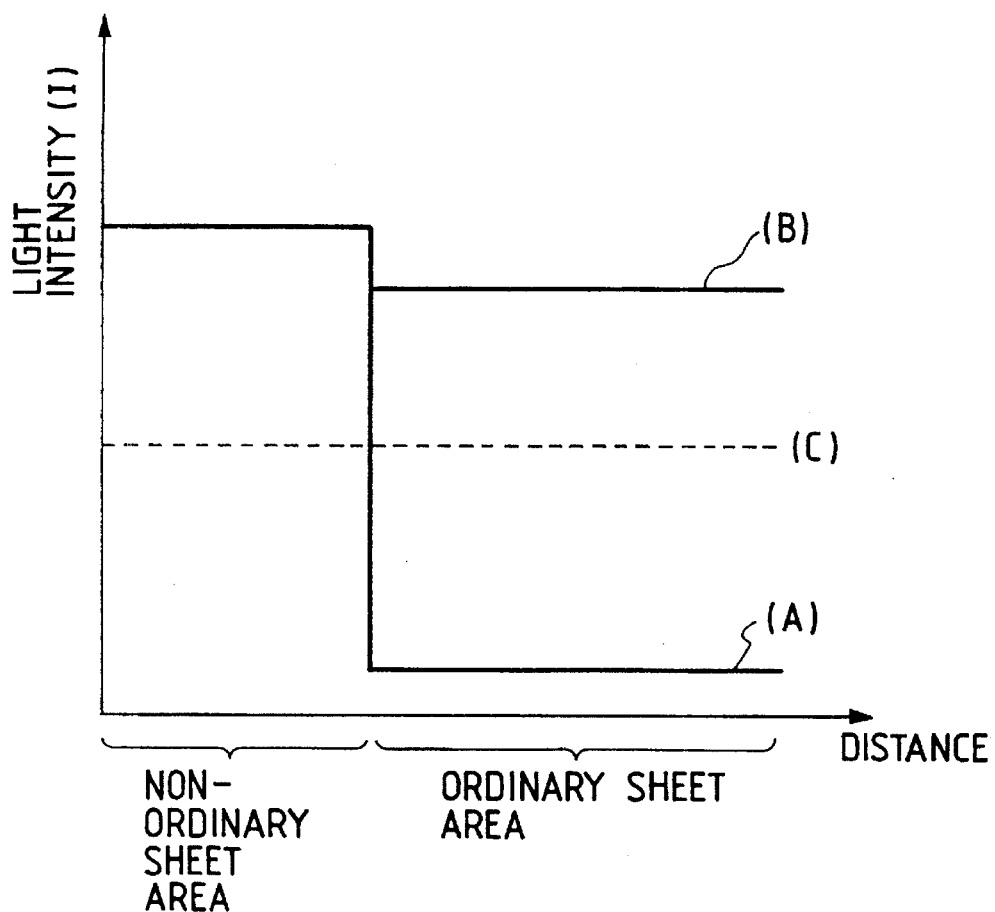
FIG. 65 is a graph for explaining a method of detecting a material according to the fourteenth embodiment.

FIG. 65 is a graph for explaining a method of detecting a material in the fourteenth embodiment.

Ordinary paper is distinguished from an OHP film used in a transmission projector in this embodiment. In this case, an optical detection scheme is employed. In FIG. 64, when a material is fed from the cassette 2042, and light from a light source 2011 to the record sheet detection sensor 2010 is shielded, the intensity of light incident on a light-receiving portion of the sensor 2010 has a level indicated by (A) in FIG. 65. At this time, it is found that a material having a low transmittance, such as ordinary paper, has passed. When a transparent material such as an OHP film has passed, the intensity of light transmitted through the material almost remains the same, as indicated by a level indicated by (B) in FIG. 65. These judging operations are performed by setting a threshold value (C) in FIG. 65.

If a detection level is higher than that of the threshold value (C), i.e., if the level (B) is detected, the material is judged as a transparent material such as an OHP film. On the other hand, if the detection level is lower than that of the threshold value (C), i.e., if the level (A) is detected, the material is judged as a material having a low transmittance, such as ordinary paper. If the detection level is almost equal to that of the threshold value (C), this level is determined in advance so as to belong to one of the levels (B) and (C).

In this embodiment, the transmittance of the material is detected using the optical sensor. The material may be detected by its resistivity or thickness. In addition, a selection mode may be variably selected upon operation of a set button by a user.

Figure 67A:
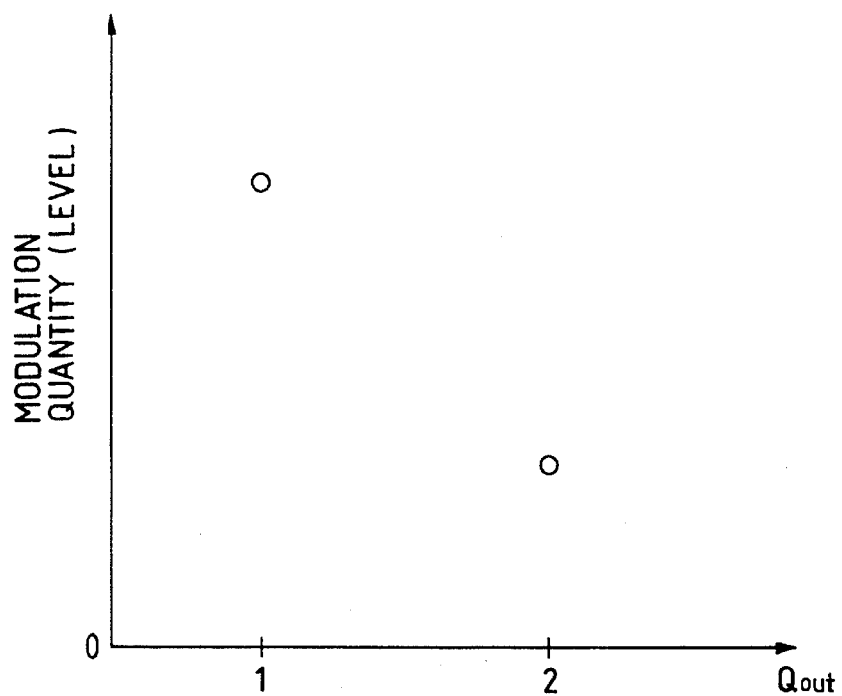
FIGS. 67A and 67B are graphs showing the relationships between the modulation quantities and the outputs according to the fourteenth embodiment.
Figure 67B:
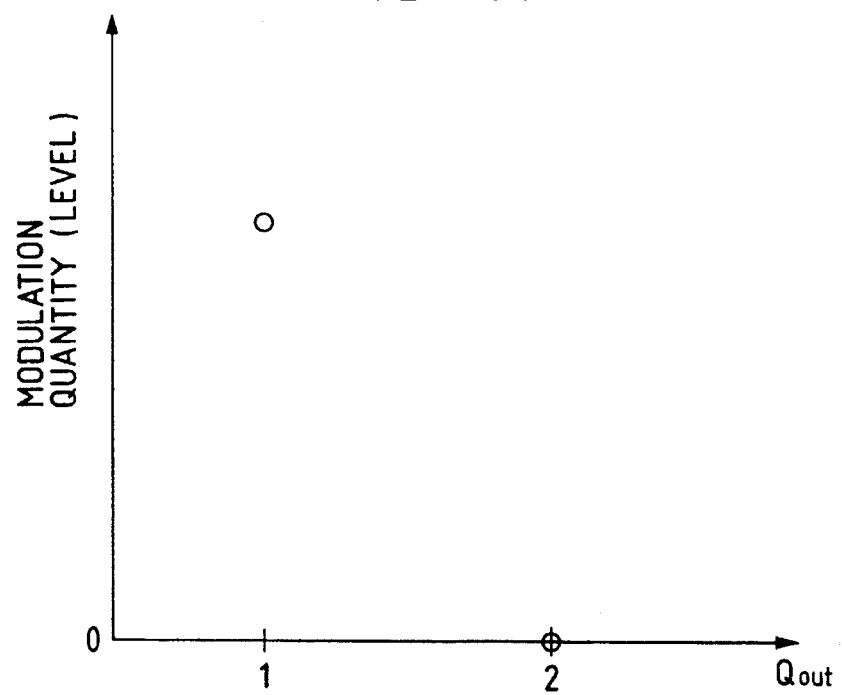

$Q_{out1}$ and $Q_{out2}$ are set for the detected different materials (A) and (B), and the corresponding outputs are shown in FIGS. 67A and 67B.

As shown in FIG. 67A, when an OHP film is detected, the modulation value is reduced to eliminate degradation of image quality upon optical projection. A level which provides good readability can be set.

Even if banknotes and securities are copied on OHP films, the resultant counterfeits cannot be used in practice. Therefore, modulation may be set in an OFF state, as shown in FIG. 67B.

In an image forming apparatus in which images formed by a plurality of color agents are stacked on each other and information unique to the image forming apparatus is superposed on an image of a specific color, the modulation quantity of the superposition pattern or the pattern signal is changed in accordance with the type of material used. The information unique to the image forming apparatus can be stably formed on the image. A pattern which is unnoticeable with a human eye but can be read by a specific reader can be superposed on the output image.

<Fifteenth Embodiment>

A method of forming a pattern free from degradation of image quality in reading the pattern will be described according to the fifteenth embodiment.

Figure 68:
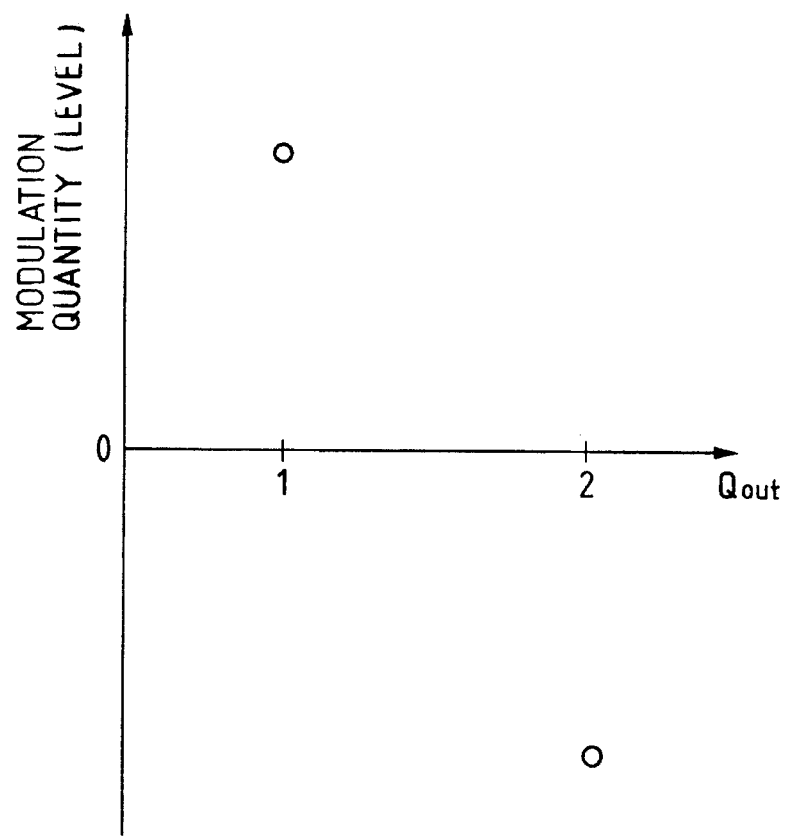
FIG. 68 is a graph showing the relationship between the modulation quantity and the output according to fifteenth embodiment.
Figure 69:
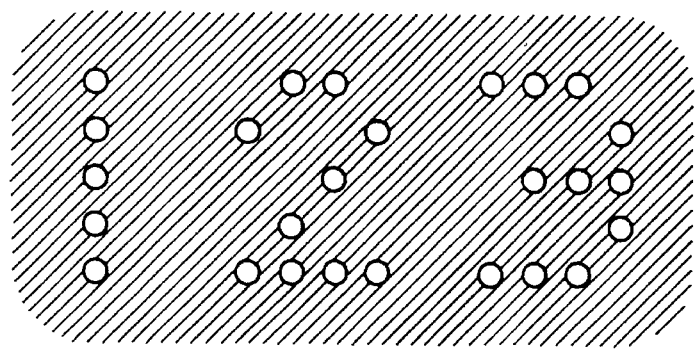
FIG. 69 is a view showing a machine pattern according to the fifteenth embodiment.

FIG. 68 is a graph showing the relationship between the modulation quantity and the output according to the fifteenth embodiment, and FIG. 69 is a view showing a machine number pattern according to the fifteenth embodiment.

According to the fourteenth embodiment, the modulation quantity is reduced or set in the OFF state upon detection of an OHP film. The fifteenth embodiment describes a method of reducing degradation of image quality. Degradation of image quality in a transparent film is caused such that dots constituting an image form a shadow in the transmission projector. In the fifteenth embodiment, the modulation quantity is set to be (–), and a signal is reduced for a specific pattern, as shown in FIG. 69. Therefore, a pattern free from degradation of image quality in reading the pattern can be formed.

<Sixteenth Embodiment>

Addition of a modulation signal which is rarely degraded in image quality will be described according to the sixteenth embodiment.

A superposed signal generally becomes noticeable to degrade image quality by the background portion of the material which has no image signal. The color of the background portion of the material is detected, and the detected signal is filtered through a sharp band filter to add (superpose) a signal representing a color similar to the background color but distinguishable from the background color. That is, a CCD is used as a record sheet detection sensor 2040 to detect the spectral characteristics of the material, and a color closest to these spectral characteristics is selected to achieve the above effect. For example, if the background color is white or yellow, then a Y toner is effectively used; blue or green, then a C toner; and pink or red, then an M toner.

In this embodiment, a color is designated within the range of M, C, Y, and Bk contributing to image formation. However, any other color may be used, as a matter of course.

The present invention may be applied to a system constituted by a plurality of equipments or an apparatus constituted by one equipment. The present invention can be achieved when a program is supplied to the system or apparatus.

Each embodiment described above exemplifies a laser bean printer. However, the present invention is not limited to this. The present invention is applicable to an ink-jet printer or a thermal transfer printer. The present invention is particularly applicable to a so-called bubble-jet printer using a head for injecting liquid droplets utilizing film boiling with thermal energy. In each embodiment described above, a color to be added is yellow. The present invention is not limited to this. The color to be added may be an unnoticeable color such as yellowish green or gray, or a color having a high lightness, such as light purple or green.

In each embodiment described above, an original image is input by an image scanner. However, the present invention is not limited to this. An image may be input using a still video camera or a video camera or may be prepared using computer graphics.

As has been described above, according to the fourteenth to sixteenth embodiments of the present invention, in an image forming apparatus in which images formed by a plurality of color agents are stacked on each other and information unique to the image forming apparatus is superposed on an image of a specific color, the modulation quantity of the superposition pattern or the pattern signal is changed in accordance with the type of material used. The information unique to the image forming apparatus can be stably formed on the image. A pattern which is unnoticeable with a human eye but can be read by a specific reader can be superposed on the output image.

The present invention is not limited to the particular embodiments described above. Various changes and modifications may be made within the scope of the appended claims. In particular, the concepts of the above embodiments can be arbitrarily combined.

What is claimed is:

1. An image forming apparatus comprising:

input means for inputting image data representing an image;

synthesizing means for synthesizing a predetermined information with the image represented by the image data;

forming means for forming an image in accordance with the image synthesized data;

detecting means for detecting a condition relating to an image forming by said forming means; and controlling means for controlling the synthesis by said synthesizing means based on the detection result of said detecting means.

2. An apparatus according to claim 1, wherein said synthesizing means synthesizes the predetermined information to be unnoticeable with respect to human eyes.

3. An apparatus according to claim 2, wherein said synthesizing means synthesizes the predetermined information as a yellow pattern.

4. An apparatus according to claim 1, wherein said predetermined pattern is information unique to the apparatus.

5. An apparatus according to claim 4, wherein said predetermined information is a manufacturing number of the apparatus.

6. An apparatus according to claim 1, wherein said condition is an environmental state of the apparatus.

7. An apparatus according to claim 6, wherein said environmental state is a temperature or a humidity.

8. An apparatus according to claim 6, wherein said condition is an image forming characteristic of said forming means.

9. An apparatus according to claim 8, wherein said image forming characteristic is a $\gamma$ characteristic.

10. An apparatus according to claim 8, further comprising reference pattern generating means for causing said forming means to form a reference pattern.

11. An apparatus according to claim 10, for further comprising means for controlling at least one of a charge quantity of a charger, a developing bias of a developing unit, and a light quantity and an emission time of an exposure unit, said charger, said developing unit, and said exposure unit being included in said forming means.

12. An apparatus according to claim 1, wherein said condition is a use condition of the apparatus.

13. An apparatus according to claim 12, wherein said detecting means detects image reproducibility of said forming means.

14. An apparatus according to claim 12, wherein said use condition is a cumulative rotation amount of an image carrier.

15. An apparatus according to claim 12, wherein said use condition is a cumulative copy count.

16. An apparatus according to claim 12, wherein said use condition is a cumulative use count of a developing unit.

17. An apparatus according to claim 12, wherein said use condition is a cumulative power-ON time.

18. An image forming method comprising steps of:

input step of inputting image data representing an image;

synthesizing step of synthesizing a predetermined information with the image represented by the image data;

forming step of forming an image in accordance with the image data;

detecting step of detecting a condition relating to an image forming in said forming step; and controlling step of controlling the synthesis in said synthesizing step based on the detection result of said detecting step.

\* \* \* \* \*

UNITED STATES PATENT AND TRADEMARK OFFICE
CERTIFICATE OF CORRECTION

PATENT NO. : 5,557,412

DATED : September 17, 1996

INVENTOR(S) : Rie Saito

It is certified that error appears in the above-identified patent and that said Letters Patent is hereby corrected as shown below:

Column 9, line 62, change "dural-port" to --dual-port--.

Column 11, line 21, change "Judgement" to --judgement--.

Column 13, line 35, change "contract" to --contrast--.

Column 18, line 66, change "2217" to --217--.

Column 21, line 65, change "835." to --3835.--.

Column 22, line 4, change V -$\alpha$" to --V-$\alpha$--.

Column 24, line 64, change "FIG. 54" to --FIG. 53--.

Column 25, line 1, delete "since"; and
line 3, change "FIG. 54" to --FIG. 53--.

UNITED STATES PATENT AND TRADEMARK OFFICE
CERTIFICATE OF CORRECTION

PATENT NO. : 5,557,412

DATED : September 17, 1996

INVENTOR(S) : Rie Saito

It is certified that error appears in the above-identified patent and that said Letters Patent is hereby corrected as shown below:

```
Column 27, line 18, change "laster" to --lasts--.

Column 29, line 32, change "bean" to --beam--.

Column 30, line 5, change "image synthesized" to
--synthesized image--.
```

Signed and Sealed this

Twenty-ninth Day of April, 1997

Attest:

BRUCE LEHMAN

Attesting Officer

Commissioner of Patents and Trademarks